United States Patent
Kusashima et al.

(10) Patent No.: US 9,948,443 B2
(45) Date of Patent: Apr. 17, 2018

(54) TERMINAL DEVICE, BASE STATION DEVICE, COMMUNICATION METHOD, AND INTEGRATED CIRCUIT

(71) Applicant: Sharp Kabushiki Kaisha, Osaka-shi, Osaka (JP)

(72) Inventors: Naoki Kusashima, Osaka (JP); Kazuyuki Shimezawa, Osaka (JP); Toshizo Nogami, Osaka (JP); Shoichi Suzuki, Osaka (JP); Kimihiko Imamura, Osaka (JP); Alvaro Ruiz Delgado, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 26 days.

(21) Appl. No.: 14/910,748

(22) PCT Filed: Aug. 8, 2014

(86) PCT No.: PCT/JP2014/070994
§ 371 (c)(1),
(2) Date: Feb. 8, 2016

(87) PCT Pub. No.: WO2015/020190
PCT Pub. Date: Feb. 12, 2015

(65) Prior Publication Data
US 2016/0205669 A1    Jul. 14, 2016

(30) Foreign Application Priority Data
Aug. 9, 2013 (JP) ................. 2013-166165

(51) Int. Cl.
*H04L 5/00* (2006.01)
*H04W 72/04* (2009.01)
(Continued)

(52) U.S. Cl.
CPC .............. *H04L 5/0092* (2013.01); *H04L 1/00* (2013.01); *H04W 72/042* (2013.01); *H04L 5/0053* (2013.01); *H04L 5/1469* (2013.01)

(58) Field of Classification Search
None
See application file for complete search history.

(56) References Cited

U.S. PATENT DOCUMENTS

2012/0320806 A1    12/2012  Ji et al.
2015/0029910 A1*   1/2015  He .................. H04W 76/02
                                               370/280
(Continued)

FOREIGN PATENT DOCUMENTS

WO    2012/169815 A2   12/2012

OTHER PUBLICATIONS

Official Communication issued in International Patent Application No. PCT/JP2014/070994, dated Oct. 21, 2014.
(Continued)

*Primary Examiner* — Diane Lo
(74) *Attorney, Agent, or Firm* — Keating & Bennett, LLP

(57) ABSTRACT

A terminal device which communicates with a base station device includes a reception unit that decodes a PDCCH having a DCI format 1C accompanying a CRC which is scrambled by using a TDD reconfiguration RNTI. The DCI format 1C includes an instruction of an uplink-downlink configuration for a plurality of serving cells. Thus, a mobile station device and the base station device can efficiently communicate with each other.

16 Claims, 23 Drawing Sheets

(51) Int. Cl.
H04L 1/00 (2006.01)
H04L 5/14 (2006.01)

(56) References Cited

U.S. PATENT DOCUMENTS

2015/0312936 A1* 10/2015 Nguyen ............... H04L 1/0061
370/280
2017/0111884 A1* 4/2017 Sadeghi ............... H04W 68/02

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0, Jun. 2013, pp. 1-108.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 1-176.

Texas Instruments, "Dynamic signaling of TDD UL/DL Reconfiguration", 3GPP TSG RAN WG1 #74, R1-133167, May 19-23, 2013, pp. 1-4.

Renesas Mobile Europe Ltd, "Signaling mechanisms for TDD eIMTA", 3GPP TSG RAN WG1 #72bis, R1-131369, Apr. 15-19, 2013, 4 pages.

* cited by examiner

FIG. 11

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 14

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |

⇩

|  | 0 | 1 | 2 | 3 | 4 | 5 | 6 | 7 | 8 | 9 |
|---|---|---|---|---|---|---|---|---|---|---|
| MONITORING OF PDCCH-SS | – | – | – | – | – | – | – | – | – | – |
| FIRST MONITORING OF EPDCCH-SS | ○ | ○ | – | – | ○ | ○ | ○ | – | – | ○ |
| SECOND MONITORING OF EPDCCH-SS | – | – | – | ○ | – | – | – | – | ○ | – |

FIG. 15

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |
| EPDCCH SUBFRAME CONFIGURATION | 1 | 0 | 0 | 0 | 1 | 0 | 1 | 0 | 1 | 0 |

⇩

|  | 0 | 1 | 2 | 3 | 4 | 5 | 6 | 7 | 8 | 9 |
|---|---|---|---|---|---|---|---|---|---|---|
| MONITORING OF PDCCH-SS | – | ○ | – | ○ | – | ○ | – | – | – | ○ |
| FIRST MONITORING OF EPDCCH-SS | ○ | – | – | – | ○ | – | ○ | – | – | – |
| SECOND MONITORING OF EPDCCH-SS | – | – | – | – | – | – | – | – | ○ | – |

FIG. 16

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION | D | S | U | U | U | D | S | U | U | U |
| EPDCCH SUBFRAME CONFIGURATION 1 | 1 | 0 | 0 | 0 | 0 | 0 | 1 | 0 | 0 | 0 |
| EPDCCH SUBFRAME CONFIGURATION 2 | 0 | 0 | 0 | 0 | 1 | 0 | 0 | 0 | 1 | 1 |

⇩

|  | 0 | 1 | 2 | 3 | 4 | 5 | 6 | 7 | 8 | 9 |
|---|---|---|---|---|---|---|---|---|---|---|
| MONITORING OF PDCCH-SS | – | ○ | – | – | – | ○ | – | – | – | – |
| FIRST MONITORING OF EPDCCH-SS | ○ | – | – | – | – | – | ○ | – | – | – |
| SECOND MONITORING OF EPDCCH-SS | – | – | – | – | ○ | – | – | – | ○ | ○ |

FIG. 17

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | D | D | S | U | U | D |
| UPLINK-DOWNLINK CONFIGURATION 2 | D | S | U | D | D | D | S | U | D | D |

⇩

|  | 0 | 1 | 2 | 3 | 4 | 5 | 6 | 7 | 8 | 9 |
|---|---|---|---|---|---|---|---|---|---|---|
| FIRST MONITORING OF PDCCH-SS | ○ | ○ | – | – | ○ | ○ | ○ | – | – | ○ |
| SECOND MONITORING OF PDCCH-SS | – | – | – | ○ | – | – | – | – | ○ | – |

FIG. 20

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION | 1 | 0 | 0 | 1 | 1 | 0 | 1 | 0 | 1 | 0 |

⇩

| | 0 | 1 | 2 | 3 | 4 | 5 | 6 | 7 | 8 | 9 |
|---|---|---|---|---|---|---|---|---|---|---|
| MONITORING OF PDCCH-SS1 | – | ○ | – | – | – | ○ | – | – | – | ○ |
| MONITORING OF EPDCCH-SS1 | ○ | – | – | ○ | ○ | – | ○ | – | ○ | – |
| MONITORING OF PDCCH-SS2 | ○ | ○ | – | – | – | ○ | ○ | – | – | – |
| MONITORING OF EPDCCH-SS2 | – | – | – | ○ | ○ | – | – | – | ○ | ○ |

FIG. 21

|  | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION | 1 | 0 | 0 | 1 | 1 | 0 | 1 | 0 | 1 | 0 |

⇩

| | 0 | 1 | 2 | 3 | 4 | 5 | 6 | 7 | 8 | 9 |
|---|---|---|---|---|---|---|---|---|---|---|
| MONITORING OF PDCCH-SS1 | – | ○ | – | – | – | ○ | – | – | – | ○ |
| FIRST MONITORING OF EPDCCH-SS1 | ○ | – | – | – | ○ | – | ○ | – | – | – |
| SECOND MONITORING OF EPDCCH-SS1 | – | – | – | ○ | – | – | – | – | ○ | – |
| MONITORING OF PDCCH-SS2 | ○ | ○ | – | – | – | ○ | ○ | – | – | – |
| MONITORING OF EPDCCH-SS2 | – | – | – | ○ | ○ | – | – | – | ○ | ○ |

FIG. 22

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION 1 | 1 | 0 | 0 | 1 | 0 | 0 | 1 | 0 | 0 | 1 |
| EPDCCH SUBFRAME CONFIGURATION 2 | 0 | 0 | 0 | 0 | 1 | 0 | 0 | 0 | 1 | 1 |

⇩

| | 0 | 1 | 2 | 3 | 4 | 5 | 6 | 7 | 8 | 9 |
|---|---|---|---|---|---|---|---|---|---|---|
| MONITORING OF PDCCH-SS1 | – | ○ | – | – | ○ | ○ | – | – | ○ | – |
| MONITORING OF EPDCCH-SS1 | ○ | – | – | ○ | – | – | ○ | – | – | ○ |
| MONITORING OF PDCCH-SS2 | ○ | ○ | – | ○ | – | ○ | ○ | – | – | – |
| MONITORING OF EPDCCH-SS2 | – | – | – | – | ○ | – | – | – | ○ | ○ |

FIG. 23

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | U |
| UPLINK-DOWNLINK CONFIGURATION 2 | D | S | U | D | D | D | S | U | D | D |
| EPDCCH SUBFRAME CONFIGURATION 1 | 1 | 0 | 0 | 1 | 0 | 0 | 1 | 0 | 0 | 1 |
| EPDCCH SUBFRAME CONFIGURATION 2 | 0 | 0 | 0 | 0 | 1 | 0 | 0 | 0 | 1 | 1 |

⇩

| | 0 | 1 | 2 | 3 | 4 | 5 | 6 | 7 | 8 | 9 |
|---|---|---|---|---|---|---|---|---|---|---|
| MONITORING OF PDCCH-SS1 | – | ○ | – | – | ○ | ○ | – | – | ○ | – |
| FIRST MONITORING OF EPDCCH-SS1 | ○ | – | – | – | – | – | ○ | – | – | – |
| SECOND MONITORING OF EPDCCH-SS1 | – | – | – | ○ | – | – | – | – | – | ○ |
| MONITORING OF PDCCH-SS2 | ○ | ○ | – | ○ | – | ○ | ○ | – | – | – |
| MONITORING OF EPDCCH-SS2 | – | – | – | – | ○ | – | – | – | ○ | ○ |

FIG. 24

| CONTROL CHANNEL | PDCCH | | | | FIRST EPDCCH | | | | SECOND EPDCCH | | | |
|---|---|---|---|---|---|---|---|---|---|---|---|---|
| SEARCH SPACE | CSS | | USS | | CSS | | USS | | CSS | | USS | |
| SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME |
| SI-RNTI | O | — | — | — | O | — | — | — | O | — | — | — |
| P-RNTI | O | — | — | — | O | — | — | — | O | — | — | — |
| RA-RNTI | O | — | — | — | O | — | — | — | O | — | — | — |
| C-RNTI | O | — | O | O | O | O | O | O | O | — | O | O |
| SPS C-RNTI | O | — | O | — | O | — | O | — | O | — | O | — |
| Temporary C-RNTI | O | — | O | — | O | — | O | — | — | — | — | — |
| M-RNTI | O | — | — | — | O | — | — | — | — | — | — | — |
| D-RNTI | O | — | — | — | O | — | — | — | O | — | — | — |

FIG. 25

| CONTROL CHANNEL | PDCCH | | | | FIRST EPDCCH | | | | SECOND EPDCCH | | | |
|---|---|---|---|---|---|---|---|---|---|---|---|---|
| SEARCH SPACE | CSS | | USS | | CSS | | USS | | CSS | | USS | |
| SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME | FIXED SUBFRAME | FLEXIBLE SUBFRAME |
| C-RNTI | O | – | O | – | O | – | O | – | O | – | O | – |
| SPS C-RNTI | O | – | O | – | O | – | O | – | O | – | O | – |
| Temporary C-RNTI | O | – | – | – | O | – | – | – | – | – | – | – |
| TPC-PUCCH-RNTI | O | O | – | – | O | O | – | – | O | O | – | – |
| TPC-PUSCH-RNTI | O | – | – | – | O | – | – | – | O | – | – | – |

FIG. 26

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | D |
| UPLINK-DOWNLINK CONFIGURATION 2 | D | S | U | D | D | D | S | U | D | D |
| EPDCCH SUBFRAME CONFIGURATION | 1 | 0 | 0 | 1 | 1 | 0 | 1 | 0 | 1 | 0 |
| RNTI USED IN MONITORING OF PDCCH-SS1 | — | C-RNTI, SPS C-RNTI, Temporary C-RNTI | — | — | — | C-RNTI, SPS C-RNTI, Temporary C-RNTI | — | — | — | C-RNTI, SPS C-RNTI, Temporary C-RNTI |
| RNTI USED IN MONITORING OF EPDCCH-SS1 | C-RNTI, SPS C-RNTI | — | — | C-RNTI | C-RNTI | — | — | — | C-RNTI | — |
| RNTI USED IN MONITORING OF PDCCH-SS2 | SI-RNTI, P-RNTI, RA-RNTI, C-RNTI, SPS C-RNTI, Temporary C-RNTI, TPC-PUCCH-RNTI, TPC-PUSCH-RNTI | SI-RNTI, P-RNTI, RA-RNTI, C-RNTI, SPS C-RNTI, Temporary C-RNTI, TPC-PUCCH-RNTI, TPC-PUSCH-RNTI | — | — | — | SI-RNTI, P-RNTI, RA-RNTI, C-RNTI, SPS C-RNTI, Temporary C-RNTI, TPC-PUCCH-RNTI, TPC-PUSCH-RNTI | C-RNTI, SPS C-RNTI | — | — | — |
| RNTI USED IN MONITORING OF EPDCCH-SS2 | — | — | — | SI-RNTI, RA-RNTI, C-RNTI, TPC-PUCCH-RNTI | SI-RNTI, RA-RNTI, C-RNTI, TPC-PUCCH-RNTI | — | — | — | SI-RNTI, RA-RNTI, C-RNTI, TPC-PUCCH-RNTI | SI-RNTI, RA-RNTI, C-RNTI, TPC-PUCCH-RNTI |

FIG. 27

| | 0 | 1 | 2 | 3 | 4 | 5 | 6 | 7 | 8 | 9 |
|---|---|---|---|---|---|---|---|---|---|---|
| UPLINK-DOWNLINK CONFIGURATION 1 | D | S | U | U | U | D | S | U | U | D |
| UPLINK-DOWNLINK CONFIGURATION 2 | D | S | U | D | D | D | S | U | D | D |
| EPDCCH SUBFRAME CONFIGURATION | 1 | 0 | 0 | 1 | 1 | 0 | 1 | 0 | 1 | 1 |
| RNTI USED IN MONITORING OF PDCCH-SS1 | — | C-RNTI, SPS C-RNTI, Temporaty C-RNTI | — | — | — | C-RNTI, SPS C-RNTI, Temporaty C-RNTI | — | — | — | — |
| RNTI USED IN MONITORING OF EPDCCH | C-RNTI, SPS C-RNTI | — | — | SI-RNTI, RA-RNTI, C-RNTI, TPC-PUCCH-RNTI | SI-RNTI, RA-RNTI, C-RNTI, TPC-PUCCH-RNTI | — | C-RNTI, SPS C-RNTI | — | SI-RNTI, RA-RNTI, C-RNTI, TPC-PUCCH-RNTI | SI-RNTI, RA-RNTI, C-RNTI, TPC-PUCCH-RNTI |
| RNTI USED IN MONITORING OF PDCCH-SS2 | SI-RNTI, P-RNTI, RA-RNTI, C-RNTI, SPS C-RNTI, Temporaty C-RNTI, TPC-PUCCH-RNTI, TPC-PUSCH-RNTI | SI-RNTI, P-RNTI, RA-RNTI, C-RNTI, SPS C-RNTI, Temporaty C-RNTI, TPC-PUCCH-RNTI, TPC-PUSCH-RNTI | — | — | — | SI-RNTI, P-RNTI, RA-RNTI, C-RNTI, SPS C-RNTI, Temporaty C-RNTI, TPC-PUCCH-RNTI, TPC-PUSCH-RNTI | SI-RNTI, P-RNTI, RA-RNTI, C-RNTI, SPS C-RNTI, Temporaty C-RNTI, TPC-PUCCH-RNTI, TPC-PUSCH-RNTI | — | — | — |

US 9,948,443 B2

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

The present application claims priority based on Japanese Patent Application No. 2013-166165, filed Aug. 9, 2013, the contents of which are incorporated herein by reference.

BACKGROUND ART

A radio access system and a radio network (hereinafter, referred to as "Long Term Evolution: LTE" or "Evolved Universal Terrestrial Radio Access: EUTRA") of cellular mobile communication have been discussed in a 3rd Generation Partnership Project (3GPP). In LTE, a base station device (base station) is also referred to as eNodeB (evolved NodeB), and a mobile station device (mobile station, terminal, terminal device) is referred to as UE (User Equipment). LTE is a cellular communication system where a plurality of areas covered by the base station device are allocated in cells. A single base station device may manage a plurality of cells.

LTE corresponds to frequency division duplex (FDD) and time division duplex (TDD). LTE using the FDD system is referred to as FD-LTE or LTE FDD. TDD is a technique which performs frequency division multiplexing on an uplink signal and a downlink signal, enabling full duplex communication in at least two frequency bands. LTE using the TDD system is referred to as TD-LTE or LTE TDD. TDD is a technique which performs time division multiplexing on an uplink signal and a downlink signal, enabling full duplex communication in a single frequency band. The details of FD-LTE and TD-LTE are disclosed in NPL 1.

A base station can transmit, to a terminal, a reference signal (referred to as RS) which is a known signal between the base station and the terminal. In regards to the reference signal, a plurality of reference signals can be transmitted for various purposes, such as demodulation of signals or channels and reports of channel states. For example, a cell-specific reference signal is transmitted as a reference signal specific to a cell in all downlink subframes. For example, a UE-specific reference signal is transmitted as a reference signal specific to a terminal in a resource to which a data signal to the terminal is mapped. The details of the reference signal are disclosed in NPL 1.

In a communication system, a base station and a terminal can implement communication using control information. In particular, in the downlink of LTE, the base station can notify the terminal of the control information through control channels, such as a PDCCH (Physical Downlink Control Channel) and an EPDCCH (Enhanced Physical Downlink Control Channel). The PDCCH is transmitted in association with a cell-specific reference signal, and the EPDCCH is transmitted in association with a UE-specific reference signal. In the LTE of the related art, the PDCCH can be mapped to a common search space (CSS) which is a region specific to a cell and/or to a UE-specific search space (USS) which is a region specific to a terminal. The EPDCCH can be mapped only to the UE-specific search space. For this reason, for example, when transmitting the control channel using the common search space, the base station notifies of control information through the PDCCH. The details of the control channel are disclosed in NPL 2.

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0 (2013 June).

NPL 2: 3rd Generation Partnership Project; Technical Specification Group Radio Access Network; Evolved Universal Terrestrial Radio Access (E-UTRA); Physical layer procedures (Release 11), 3GPP TS 36.213 V11.3.0 (2013 June).

SUMMARY OF INVENTION

Technical Problem

However, since the PDCCH is transmitted in association with the cell-specific reference signal, the common search space is limited only to a subframe to which the cell-specific reference signal is mapped. This limitation interferes with efficient notification of the control information, leading to significant deterioration in transmission efficiency.

An aspect of the invention has been accomplished in consideration of the above-described problems, and an object of the invention is to provide a terminal device, a base station device, a communication method, and an integrated circuit capable of improving transmission efficiency in a communication system where a base station and a terminal communicate with each other.

Solution to Problem (1) In order to attain the above-described object, one aspect of the invention provides the following means. That is, a terminal device according to one aspect of this embodiment communicates with a base station device and includes a reception unit that decodes a PDCCH having a DCI format 1C accompanying a CRC which is scrambled by using a TDD reconfiguration RNTI, in which the DCI format 1C includes an instruction of an uplink-downlink configuration for a plurality of serving cells.

(2) A terminal device according to one aspect of this embodiment is the terminal device described in (1) and the DCI format 1C has a fixed number of bit fields.

(3) A terminal device according to one aspect of this embodiment is the terminal device described in (1), and the DCI format 1C has a fixed number of bit fields regardless of a number of configured serving cells.

(4) A terminal device according to one aspect of this embodiment is the terminal device described in (1), and one TDD reconfiguration RNTI is configured through dedicated RRC signaling.

(5) A terminal device according to one aspect of this embodiment is the terminal device described in (1), and the reception unit decodes the PDCCH in a subframe configured from a higher layer.

(6) A terminal device according to one aspect of this embodiment is the terminal device described in (5), and the subframe configured from the higher layer is a subframe which is instructed as a downlink subframe or a special subframe by an uplink-downlink configuration included in system information.

(7) A terminal device according to one aspect of this embodiment is the terminal device described in (5), and the subframe configured from the higher layer is notified by using bitmap information.

(8) A terminal device according to one aspect of this embodiment is the terminal device described in (1), and the reception unit decodes the PDCCH in a common search space.

(9) A terminal device according to one aspect of this embodiment is the terminal device described in (1), and the reception unit does not receive the PDCCH for instructing a subframe which is instructed as a downlink subframe or a special subframe by an uplink-downlink configuration included in system information, as an uplink subframe by the uplink-downlink configuration.

(10) A terminal device according to one aspect of this embodiment is the terminal device described in (1), and the reception unit does not receive the PDCCH for instructing a subframe which is instructed as an uplink subframe or a special subframe by a downlink reference UL-DL configuration, as a downlink subframe by an uplink-downlink configuration.

(11) A terminal device according to one aspect of this embodiment is the terminal device described in (10), and the downlink reference UL-DL configuration is configured from a restricted set of uplink-downlink configurations.

(12) A terminal device according to one aspect of this embodiment is the terminal device described in (11), and the uplink-downlink configuration set is restricted based on an uplink reference UL-DL configuration.

(13) A terminal device according to one aspect of this embodiment is the terminal device described in (10), and the downlink reference UL-DL configuration is configured through dedicated RRC signaling, for each serving cell.

(14) A base station device according to one aspect of this embodiment is a base station device which communicates with a terminal device, the base station device including a transmission unit that transmits a PDCCH having a DCI format 1C accompanying a CRC which is scrambled by using a TDD reconfiguration RNTI, in which the DCI format 1C includes an instruction of an uplink-downlink configuration for a plurality of serving cells.

(15) A base station device according to one aspect of this embodiment is the base station device described in (14), and the DCI format 1C has a fixed number of bit fields.

(16) A base station device according to one aspect of this embodiment is the base station device described in (14), and the DCI format 1C has a fixed number of bit fields regardless of a number of configured serving cells.

(17) A base station device according to one aspect of this embodiment is the base station device described in (14), and one TDD reconfiguration RNTI is configured in the terminal device through dedicated RRC signaling.

(18) A base station device according to one aspect of this embodiment is the base station device described in (14), and the transmission unit transmits the PDCCH in a subframe configured from a higher layer.

(19) A base station device according to one aspect of this embodiment is the base station device described in (18), and the subframe configured from the higher layer is a subframe which is instructed as a downlink subframe or a special subframe by an uplink-downlink configuration included in system information.

(20) A base station device according to one aspect of this embodiment is the base station device described in (18), and the subframe configured from the higher layer is notified to the terminal device, by using bitmap information.

(21) A base station device according to one aspect of this embodiment is the base station device described in (14), and the transmission unit transmits the PDCCH in a common search space.

(22) A base station device according to one aspect of this embodiment is the base station device described in (14), and the transmission unit does not transmit the PDCCH instructing a subframe which is instructed as a downlink subframe or a special subframe by an uplink-downlink configuration included in system information, as an uplink subframe by the uplink-downlink configuration.

(23) A base station device according to one aspect of this embodiment is the base station device described in (14), and the transmission unit does not transmit the PDCCH for instructing a subframe which is instructed as an uplink subframe or a special subframe by a downlink reference UL-DL configuration, as a downlink subframe by an uplink-downlink configuration.

(24) A base station device according to one aspect of this embodiment is the base station device described in (23), and the downlink reference UL-DL configuration is configured in the terminal device, from a restricted set of uplink-downlink configurations.

(25) A base station device according to one aspect of this embodiment is the base station device described in (24), and the uplink-downlink configuration set is restricted based on an uplink reference UL-DL configuration.

(26) A base station device according to one aspect of this embodiment is the base station device described in (23), and the downlink reference UL-DL configuration is configured in the terminal device through dedicated RRC signaling, for each serving cell.

(27) A communication method according to one aspect of this embodiment is a communication method of a terminal device which communicates with a base station device, the communication method including a step of decoding a PDCCH having a DCI format 1C accompanying a CRC which is scrambled by using a TDD reconfiguration RNTI, in which the DCI format 1C includes an instruction of an uplink-downlink configuration for a plurality of serving cells.

(28) A communication method according to one aspect of this embodiment is a communication method of a base station device which communicates with a terminal device, and a communication method of the terminal device which communicates with the base station device. The communication method includes a step of transmitting a PDCCH having a DCI format 1C accompanying a CRC which is scrambled by using a TDD reconfiguration RNTI, and the DCI format 1C includes an instruction of an uplink-downlink configuration for a plurality of serving cells.

(29) An integrated circuit according to one aspect of this embodiment is an integrated circuit mounted in a terminal device which communicates with a base station device, in which a function of decoding a PDCCH having a DCI format 1C accompanying a CRC which is scrambled by using a TDD reconfiguration RNTI is realized, and the DCI format 1C includes an instruction of an uplink-downlink configuration for a plurality of serving cells.

(30) An integrated circuit according to one aspect of this embodiment is an integrated circuit mounted in a base station device which communicates with a terminal device, in which a function of transmitting a PDCCH having a DCI format 1C accompanying a CRC which is scrambled by using a TDD reconfiguration RNTI is realized, and the DCI format 1C includes an instruction of an uplink-downlink configuration for a plurality of serving cells.

Advantageous Effects of Invention

According to one aspect of the invention, it is possible to improve transmission efficiency in a radio communication system where a base station and a terminal communicate with each other.

BRIEF DESCRIPTION OF DRAWINGS

FIG. 11 is an example of an uplink-downlink configuration.

FIG. 14 is a diagram showing an example of a subframe configuration and monitoring of control channels.

FIG. 15 is a diagram showing an example of a subframe configuration and monitoring of control channels.

FIG. 16 is a diagram showing an example of a subframe configuration and monitoring of control channels.

FIG. 17 is a diagram showing an example of a subframe configuration and monitoring of control channels.

FIG. 20 is a diagram showing an example of a subframe configuration and monitoring of control channels.

FIG. 21 is a diagram showing an example of a subframe configuration and monitoring of control channels.

FIG. 22 is a diagram showing an example of a subframe configuration and monitoring of control channels.

FIG. 23 is a diagram showing an example of a subframe configuration and monitoring of control channels.

FIG. 24 is a diagram illustrating an example of the type of an RNTI used in decoding processing of a control channel based on the control channel, a search space, and a subframe.

FIG. 25 is a diagram illustrating an example of the type of the RNTI used in the decoding processing of a control channel based on the control channel, a search space, and a subframe.

FIG. 26 is a diagram illustrating an example of an RNTI used in a subframe configuration and monitoring.

FIG. 27 is a diagram illustrating an example of the RNTI used in the subframe configuration and the monitoring.

DESCRIPTION OF EMBODIMENTS

Hereinafter, an embodiment of the invention will be described.

In this embodiment, a plurality of cells is configured in a mobile station device. A technique in which the mobile station device performs communication through a plurality of cells is referred to as cell aggregation or carrier aggregation. The invention may be applied in each of a plurality of cells configured in the mobile station device. The invention may be applied in some of a plurality of configured cells. The cells configured in the mobile station device are referred to as serving cells.

A plurality of configured serving cells includes one primary cell and one or a plurality of secondary cells. The primary cell is a serving cell where an initial connection establishment procedure is performed, a serving cell where a connection re-establishment procedure starts, or a cell which is indicated as a primary cell in a handover procedure. When or after an RRC connection is established, the secondary cells may be configured.

A radio communication system of this embodiment uses a TDD (Time Division Duplex) system. In case of cell aggregation, the TDD system may be applied to all of a plurality of cells. In case of cell aggregation, cells where the TDD system is applied and cells where an FDD (Frequency Division Duplex) system is applied may be put together. When cells where TDD is applied and cells where FDD is applied are put together, the invention can be applied to cells where TDD is applied.

When a plurality of cells where TDD is applied are aggregated, a half-duplex TDD system or a full-duplex TDD system can be applied.

A mobile station device transmits, to a base station device, information representing combinations of bands where carrier aggregation is supported by the mobile station device. The mobile station device transmits, to the base station device, information indicating whether or not simultaneous transmission and reception in the plurality of serving cells in a plurality of different bands are supported for each combination of bands.

In this embodiment, "X/Y" includes the meaning of "X or Y". In this embodiment, "X/Y" includes the meaning of "X and Y". In this embodiment, "X/Y" includes the meaning of "X and/or Y".

Figure 1:
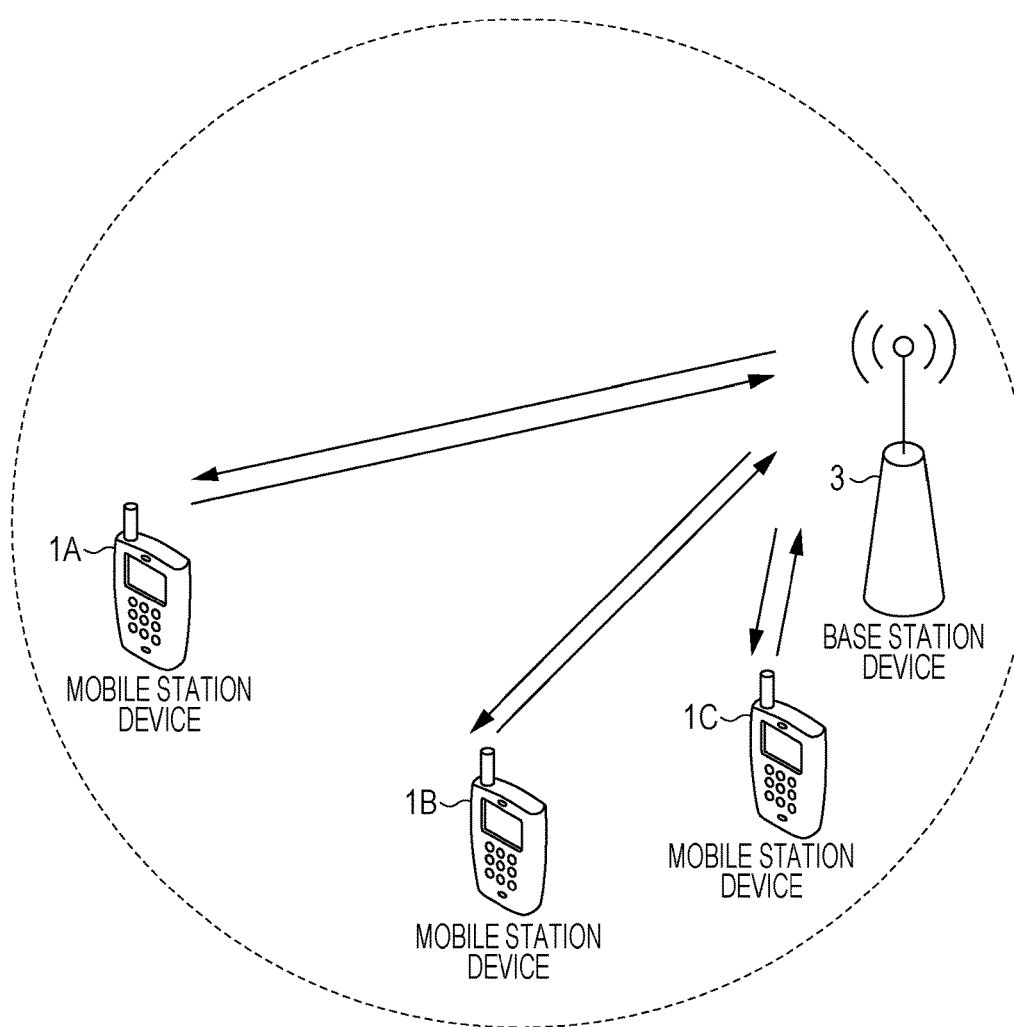
FIG. 1 is a conceptual diagram of a radio communication system of this embodiment.

FIG. 1 is a conceptual diagram of a radio communication system of this embodiment. In FIG. 1, the radio communication system includes mobile station devices 1A to 1C, and a base station device 3. Hereinafter, the mobile station devices 1A to 1C are referred to as mobile station devices 1.

Physical channels and physical signals of this embodiment will be described.

In FIG. 1, in radio communication of an uplink from the mobile station devices 1 to the base station device 3, uplink physical channels are used. The uplink physical channels can be used to transmit information output from a higher layer. The uplink physical channels include a PUCCH (Physical Uplink Control Channel), a PUSCH (Physical Uplink Shared Channel), a PRACH (Physical Random Access Channel), and the like.

The PUCCH is a physical channel which is used to transmit uplink control information (UCI). The uplink control information includes downlink channel state information (CSI), a scheduling request (SR) representing a request of a PUSCH resource, and ACK (acknowledgement)/NACK (negative-acknowledgement) to downlink data (Transport block, Downlink-Shared Channel: DL-SCH). ACK/NACK is referred to as HARQ-ACK, HARQ feedback, or response information.

The PUSCH is a physical channel which is used to transmit uplink data (Uplink-Shared Channel: UL-SCH). The PUSCH may be used to transmit HARQ-ACK and/or channel state information along with uplink data. The PUSCH may be used to transmit only channel state information, or may be used to transmit only HARQ-ACK and channel state information.

The PRACH is a physical channel which is used to transmit a random access preamble. The PRACH has a primary purpose of allowing the mobile station devices 1 to synchronize a time domain with the base station device 3. In addition, the PRACH is used to represent an initial connection establishment procedure, a handover procedure, a connection re-establishment procedure, synchronization to uplink transmission (timing adjustment), and a request of a PUSCH resource.

In FIG. 1, in radio transmission of an uplink, an uplink physical signal is used. The uplink physical signal includes an uplink reference signal (ULRS) or the like. As the uplink reference signal, a DMRS (Demodulation Reference Signal), a SRS (Sounding Reference Signal), or the like is used. The DMRS is associated with the transmission of the PUSCH or the PUCCH. The DMRS is time-multiplexed on the PUSCH or the PUCCH. The base station device 3 uses the DMRS to correct the propagation path of the PUSCH or the PUCCH. Hereinafter, the transmission of both the PUSCH and the DMRS is simply referred to as the transmission of the PUSCH. Hereinafter, the transmission of both the PUCCH and the DMRS is simply referred to as the transmission of the PUCCH. The DMRS of the uplink is referred to as UL-DMRS. The SRS is not associated with the transmission of the PUSCH or the PUCCH. The base station device 3 uses the SRS to measure the channel state of the uplink.

In FIG. 1, in radio communication of a downlink from the base station device 3 to the mobile station devices 1, downlink physical channels are used. The downlink physical channels can be used to transmit information output from a higher layer. The downlink physical channels include a PBCH (Physical Broadcast Channel), a PCFICH (Physical Control Format Indicator Channel), a PHICH (Physical Hybrid automatic repeat request Indicator Channel), a PDCCH (Physical Downlink Control Channel), an EPD-CCH (Enhanced Physical Downlink Control Channel), a PDSCH (Physical Downlink Shared Channel), a PMCH (Physical Multicast Channel), and the like.

The PBCH is used to broadcast of a master information block (MIB, Broadcast Channel: BCH) to be commonly used in the mobile station devices 1. The MIB is updated at an interval of 40 ms. The PBCH is repeatedly transmitted in a period of 10 ms. Specifically, the initial transmission of the MIB is performed in a subframe 0 of radio frames satisfying SFN mod 4=0, and the retransmission (repetition) of the MIB is performed in a subframe 0 of all other radio frames. A SFN (system frame number) is the number of each radio frame. The MIB is system information. For example, the MIB includes information representing the SFN.

The PCFICH is used to transmit information indicating a region (OFDM symbol) for use in transmitting the PDCCH.

The PHICH is used to transmit a HARQ indicator (HARQ feedback, response information) representing ACK (ACKnowledgement) or NACK (Negative ACKnowledgement) to uplink data (Uplink Shared Channel: UL-SCH) received by the base station device 3. For example, when the mobile station devices 1 receive a HARQ indicator representing ACK, corresponding uplink data is not retransmitted. For example, when the mobile station devices 1 receive a HARQ indicator representing NACK, corresponding uplink data is retransmitted. A single PHICH transmits a HARQ indicator to single piece of uplink data. The base station device 3 transmits HARQ indicators to a plurality of pieces of uplink data included in the same PUSCH using a plurality of PHICHs.

The PDCCH and EPDCCH are used to transmit downlink control information (DCI). The downlink control information is referred to as a DCI format. The downlink control information includes a downlink grant and an uplink grant. The downlink grant is referred to as downlink assignment or downlink allocation. The PDCCH is scrambled based on a physical layer cell identifier. The EPDCCH is scrambled based on a parameter in a notification received from a higher layer. The parameter is a parameter (dmrs-ScramblingSequenceInit) used in an initial value of a scrambling sequence of the DMRS.

The downlink grant is used for scheduling of a signal PDSCH in a single cell. The downlink grant is used for scheduling of the PDSCH in the same subframe as a subframe where the downlink grant is transmitted. The uplink grant is used for scheduling of a single PUSCH in a single cell. The uplink grant is used for scheduling of a single PUSCH in four or more subframes after a subframe where the uplink grant is transmitted.

A CRC (Cyclic Redundancy Check) parity bit is appended to the DCI format. The CRC parity bit is scrambled by using a C-RNTI (Cell-Radio Network Temporary Identifier), a SPS C-RNTI (Semi Persistent Scheduling Cell-Radio Network Temporary Identifier), a SI-RNTI (Systemp Information-Radio Network Temporary Identifier), a P-RNTI (Paging-Radio Network Temporary Identifier), a RA-RNTI (Random Access-Radio Network Temporary Identifier), a TPC-PUCCH-RNTI (Transmit Power Control-Physical Uplink Control Channel-Radio Network Temporary Identifier), a TPC-PUSCH-RNTI (Transmit Power Control-Physical Uplink Shared Channel-Radio Network Temporary Identifier), a temporary C-RNTI, or a M-RNTI (MBMS (Multimedia Broadcast Multicast Services)-Radio Network Temporary Identifier). The C-RNTI and the SPS C-RNTI are identifiers for identifying a mobile station device in a cell. The C-RNTI is used to control the PDSCH or the PUSCH in a single subframe. The SPS C-RNTI is used to allocate the resource of the PDSCH or the PUSCH cyclically. A control channel having a CRC which is scramble by using the SI-RNTI is used for controlling a SIB (System Information Block). A control channel having a CRC which is scramble by using the P-RNTI is used for controlling paging. A control channel having a CRC which is scramble by using the RA-RNTI is used for controlling a response to a RACH.

A control channel having a CRC which is scramble by using the TPC-PUCCH-RNTI is used for performing power control of the PUCCH. A control channel having a CRC which is scramble by using the TPC-PUSCH-RNTI is used for performing power control of the PUSCH. A control channel having a CRC which is scramble by using the temporary C-RNTI is used for a mobile station device which is not identified by the C-RNTI. A control channel having a CRC which is scramble by using the M-RNTI is used for controlling the MBMS. The RNTI is not limited to the above-described RNTI, and the DCI format may be scrambled by using a new RNTI. For example, the new RNTI may be an identifier for identifying information of a TDD-reconfiguration (also referred to as D-RNTI, eIMTA-RNTI, UE group RNTI, a TDD uplink-downlink reconfiguration RNTI, or a dynamic TDD configuration RNTI below). For example, as a configuration specific to a group of a plurality of mobile station devices 1, or as a configuration specific to the mobile station device 1, a PDCCH or an EPDCCH is used when the base station device 3 performs signaling of an uplink-downlink configuration or a transmission direction UL-DL configuration to the mobile station device 1. At this time, the CRC parity bit which is scrambled by using the D-RNTI is appended to a DCI transmitted on this PDCCH or EPDCCH.

A control channel having a CRC which is scrambled by using the D-RNTI is used for controlling plural pieces of UE. That is, the D-RNTI is a RNTI which may be commonly configured in the plural pieces of UE. The plural pieces of UE having the same configured D-RNTI are referred to as a UE group. The control channel having a CRC which is scrambled by using the D-RNTI can be used for common control between UE groups. For example, the UE group can be used as a unit separated from a cell and can be configured for each transmission point. The control channel having a CRC which is scrambled by using the D-RNTI can be used for configuring an uplink-downlink configuration. Although details thereof will be described later, a subframe configuration can be configured based on an uplink-downlink configuration 1 and an uplink-downlink configuration 2. The uplink-downlink configuration 1 is obtained by performing configuring with a cell-specific SIB, and the uplink-downlink configuration 2 is obtained by performing configuring through the control channel having a CRC which is scrambled by using the D-RNTI. For example, when a control channel having a CRC which is scrambled by using the D-RNTI is transmitted for each radio frame and the uplink-downlink configuration 2 is configured through the control channel having a CRC which is scrambled by using the D-RNTI, the uplink-downlink configuration 2 can be configured for each radio frame by using the UE group as a unit.

The control channel having a CRC which is scrambled by using the D-RNTI can be mapped with only a prescribed search space. In this case, the predetermined search space is preferably a search space which is commonly configured between pieces of UE which have the same configured D-RNTI. For example, the control channel having a CRC which is scrambled by using the D-RNTI can be mapped with only a common search space. For example, the predetermined search space is preferably a search space which is commonly configured between pieces of UE which have the same configured D-RNTI even when the control channel having a CRC which is scrambled by using the D-RNTI is mapped with a UE-specific search space.

For example, a search space with which only the control channel having a CRC which is scrambled by using the D-RNTI is mapped may be defined, and the control channel having a CRC which is scrambled by using the D-RNTI may be mapped with the defined search space. That is, the control channel having a CRC which is scrambled by using the D-RNTI can be mapped with a search space specific to a UE group.

The base station device 3 maps the control channel having a CRC which is scrambled by using the D-RNTI with the common search space, the UE-specific search space, and/or the search space specific to the UE group. The mobile station device 1 monitors and detects the control channel having a CRC which is scrambled by using the D-RNTI, for the common search space, the UE-specific search space, and/or the search space specific to the UE group. The group in a configuration specific to the UE group may be a group from a viewpoint of the base station device 3, and may be simply a configuration specific to the mobile station device 1 from a viewpoint of the mobile station device 1.

A CRC parity bit which is scrambled with a RNTI by the base station device is appended to the DCI format, and the DCI format is included in the control channel and is transmitted. The mobile station device performs decoding processing of a control channel transmitted from the base station device. The mobile station device descrambles the CRC parity bit appended to the DCI format by using the RNTI of the mobile station device. When the CRC parity bit is successfully descrambled, the DCI format is identified as information for the mobile station device. When the CRC parity bit is not successfully descrambled, the DCI format is identified as not being information for the mobile station device. With the operation, the mobile station device identifies information for the mobile station device, from plural pieces of information transmitted from the base station device. The decoding processing of the control channel by using the RNTI can be reworded to monitoring of the control channel by using the RNTI or monitoring of control information by using the RNTI.

The PDSCH is used to transmit downlink data (Downlink Shared Channel: DL-SCH).

The PMCH is used to transmit multicast data (Multicast Channel: MCH).

In FIG. 1, in the radio communication of the downlink, the following downlink physical signals are used. The downlink physical signals include a synchronization signal (SS), a downlink reference signal (DL RS), and the like.

The synchronization signal is used when the mobile station devices 1 synchronize the frequency domain and the time domain of the downlink. The synchronization signal is mapped in prescribed subframes of a radio frame. For example, in the TDD system, the synchronization signal is mapped in subframes 0, 1, 5, and 6 of a radio frame. In the FDD, the synchronization signal is mapped in subframes 0 and 5 of a radio frame.

The downlink reference signal is used when the mobile station devices 1 correct the propagation path of the downlink physical channels. The downlink reference signal is used when the mobile station devices 1 calculate channel state information of the downlink. The downlink reference signal is used when the mobile station devices 1 measure the geographical positions thereof.

The downlink reference signal includes a CRS (Cell-specific Reference Signal), a URS (UE-specific Reference Signal) associated with the PDSCH, a DMRS (Demodulation Reference Signal) associated with the EPDCCH, NZP CSI-RS (Non-Zero Power Channel State Information-Reference Signal), ZP CSI-RS (Zero Power Channel State Information-Reference Signal), a MBSFN RS (Multimedia Broadcast and Multicast Service over Single Frequency Network Reference signal), a PRS (Positioning Reference Signal), a TRS (Tracking Reference Signal), and the like.

The CRS is transmitted in the entire band of a subframe. The CRS is used to demodulate the PBCH/PDCCH/PHICH/PCFICH/PDSCH. The CRS may be used when the mobile station devices 1 calculate the channel state information of the downlink. The PBCH/PDCCH/PHICH/PCFICH is transmitted through an antenna port for use in transmitting the CRS.

The URS associated with the PDSCH is transmitted in a subframe and a band for use in transmitting the PDSCH with which the URS is associated. The URS is used to demodulate the PDSCH with which the URS is associated.

The PDSCH is transmitted through an antenna port for use in transmitting the CRS or the URS. A DCI format 1A is used for scheduling of the PDSCH which is transmitted through an antenna port for use in transmitting the CRS. A DCI format 2D is used for scheduling of the PDSCH which is transmitted through an antenna port for use in transmitting the URS.

The DMRS associated with the EPDCCH is transmitted in a subframe and a band for use in transmitting the EPDCCH with which the DMRS is associated. The DMRS is used to demodulate the EPDCCH with which the DMRS is associated. The EPDCCH is transmitted through an antenna port for use in transmitting the DMRS. A symbol of the DMRS is scrambled based on a parameter in a notification received from a higher layer. For example, the parameter is the parameter (dmrs-ScramblingSequenceInit) used in the initial value of the scrambling sequence of the DMRS.

The NZP CSI-RS is transmitted in a configured subframe. A resource where the NZPCSI-RS is transmitted is configured by the base station device. The NZPCSI-RS is used when the mobile station devices 1 calculate the channel state information of the downlink. The mobile station devices 1 perform signal measurement (channel measurement) using the NZP CSI-RS.

The resource of the ZP CSI-RS is configured by the base station device 3. The base station device 3 transmits the ZP CSI-RS with zero output. That is, the base station device 3 does not transmit the ZP CSI-RS. The base station device 3 does not transmit the PDSCH and the EPDCCH in the configured resource of the ZP CSI-RS. For example, the mobile station devices 1 can measure interference in a resource, to which the NZP CSI-RS corresponds, in a certain cell.

The MBSFN RS is transmitted in the entire band of a subframe for use in transmitting the PMCH. The MBSFN RS is used to demodulate the PMCH. The PMCH is transmitted through an antenna port for use in transmitting the MBSFN RS.

The PRS is used when the mobile station devices measure the geographical positions thereof.

The TRS can be mapped to prescribed subframes. For example, the TRS is mapped to subframes 0 and 5. The TRS can use the same configuration as a part of the CRS. For example, in each of resource blocks, the position of a resource element to which the TRS is mapped can be the same as the position of a resource element to which a CRS of an antenna port 0 is mapped. A sequence (value) which is used for the TRS can be determined based on information configured through the PBCH, the PDCCH, the EPDCCH, or the PDSCH (RRC signaling). A sequence (value) which is used for the TRS can be determined based on parameters, such as a cell ID (for example, a physical layer cell identifier) and a slot number. A sequence (value) which is used for the TRS can be determined by a method (expression) different from a sequence (value) which is used for the CRS of the antenna port 0.

The downlink physical channels and the downlink physical signal are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is referred to as a transport block (TB) or a MAC PDU (Protocol Data Unit). Control of a HARQ (Hybrid Automatic Repeat reQuest) is performed for each transport block in the MAC layer. The transport block is a unit of data which is delivered to a physical layer by the MAC layer. In the physical layer, the transport block is mapped to a code word, and encoding is performed for each code word.

Hereinafter, the configuration of a radio frame of this embodiment will be described.

Figure 2:
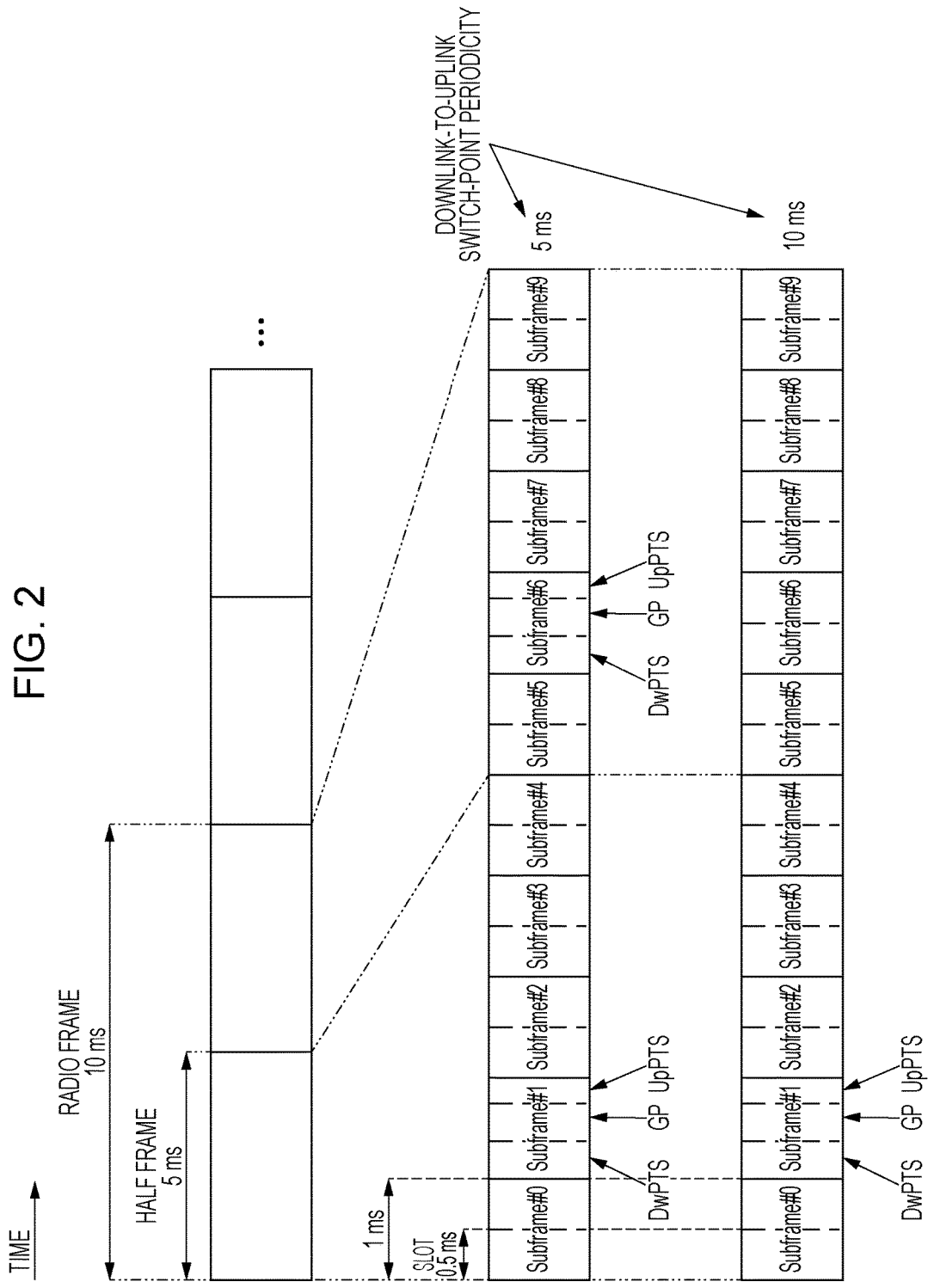
FIG. 2 is a diagram showing the schematic configuration of a radio frame of this embodiment.

FIG. 2 is a diagram showing the schematic configuration of a radio frame of this embodiment. Each radio frame has a length of 10 ms. In FIG. 2, the horizontal axis is a time axis. Each radio frame has two half frames. Each half frame has a length of 5 ms. Each half frame has five subframes. Each subframe has a length of 1 ms and is defined by two consecutive slots. Each slot has a length of 0.5 ms. An i-th subframe in a radio frame has a (2×i)th slot and a (2×i+1)th slot. That is, ten subframes can be used at each internal of 10 ms.

The subframes include a downlink subframe (first subframe), an uplink subframe (second subframe), a special subframe (third subframe), and the like.

The downlink subframe is a subframe which is reserved for downlink transmission. The uplink subframe is a subframe which is reserved for uplink transmission. The special subframe has three fields. The three fields are a DwPTS (Downlink Pilot Time Slot), a GP (Guard Period), and an UpPTS (Uplink Pilot Time Slot). The total length of the DwPTS, the GP, and the UpPTS is 1 ms. The DwPTS is a field which is reserved for downlink transmission. The UpPTS is a field which is reserved for uplink transmission. The GP is a field where downlink transmission and uplink transmission are not performed. The special subframe may have only the DwPTS and the GP or may have only the GP and the UpPTS.

A single radio frame has at least a downlink subframe, an uplink subframe, and a special subframe.

The radio communication system of this embodiment supports downlink-to-uplink switch-point periodicity of 5 ms and 10 ms. When the downlink-to-uplink switch-point periodicity is 5 ms, a special subframe is included in both half frames in a radio frame. When the downlink-to-uplink switch-point periodicity is 10 ms, a special subframe is included in only the first half frame of a radio frame.

Hereinafter, the configuration of a slot of this embodiment will be described.

Figure 3:
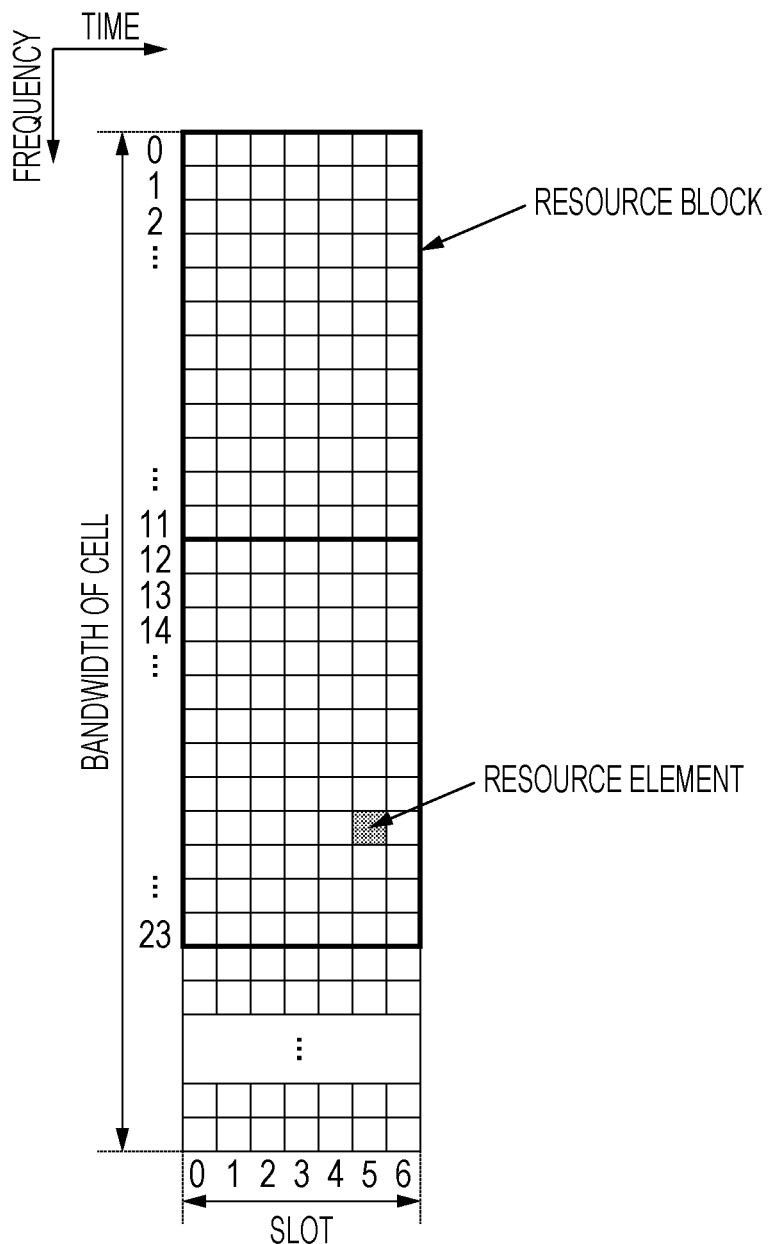
FIG. 3 is a diagram showing the configuration of a slot of this embodiment.

FIG. 3 is a diagram showing the configuration of a slot of this embodiment. In this embodiment, a normal CP (normal Cyclic Prefix) is applied to an OFDM symbol. An extended CP (extended Cyclic Prefix) may be applied to an OFDM symbol. A physical signal or a physical channel which is transmitted in each slot is expressed by a resource grid. In the downlink, a resource grid is defined by a plurality of subcarriers with respect to a frequency direction and a plurality of OFDM symbols with respect to a time direction. In the uplink, a resource grid is defined by a plurality of subcarriers with respect to a frequency direction and a plurality of SC-FDMA symbols with respect to a time direction. The number of subcarriers or resource blocks depends on a bandwidth of a cell. The number of OFDM symbols or SC-FDMA symbols of one slot is 7 on the normal CP and 6 on the extended CP. Each element in a resource grid is referred to as a resource element. A resource element is identified using the number of a subcarrier and the number of an OFDM symbol or SC-FDMA symbol.

A resource block is used for mapping to a resource element of a certain physical channel (PDSCH, PUSCH, or the like). In the resource block, a virtual resource block and a physical resource block are defined. A certain physical channel is first mapped to the virtual resource block. Thereafter, the virtual resource block is mapped to the physical resource block. One physical resource block is defined from seven continuous OFDM symbols or SC-FDMA symbols in a time domain and twelve contiguous subcarriers in a frequency domain. Therefore, one physical resource block has (7×12) resource elements. Furthermore, one physical resource block corresponds to one slot in the time domain, and corresponds to 180 kHz in the frequency domain. The physical resource block is numbered from 0 in the frequency domain. Moreover, two resource blocks in one subframe to which the same physical resource block number corresponds are defined as a physical resource block pair (PRB pair, RB pair).

Hereinafter, a physical channel and a physical signal which are transmitted in each subframe will be described.

Figure 4:
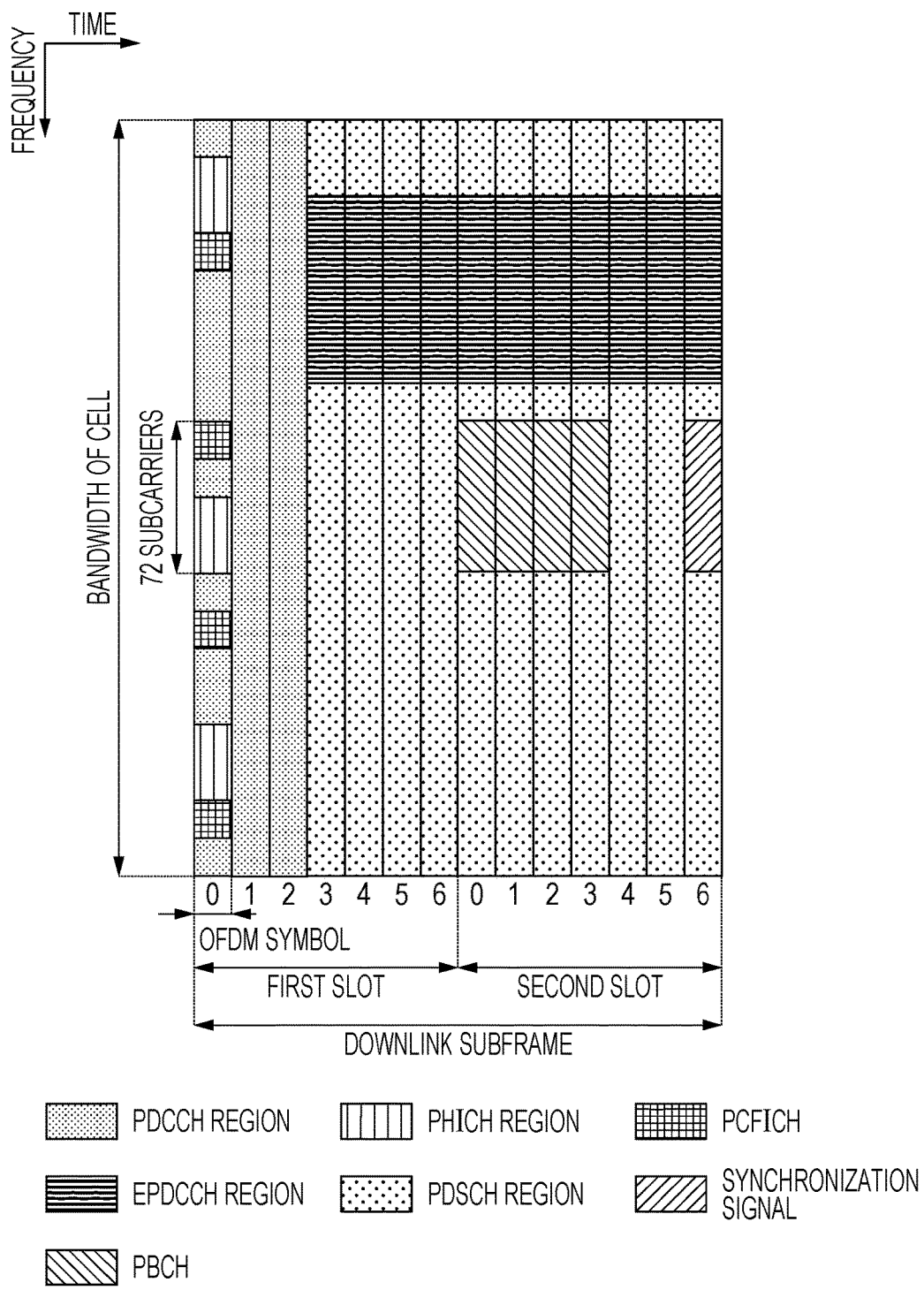
FIG. 4 is a diagram showing an example of the mapping of physical channels and physical signals in a downlink subframe of this embodiment.

FIG. 4 is a diagram showing an example of the mapping of physical channels and physical signals in the downlink subframe of this embodiment. The base station device 3 can transmit the downlink physical channels (PBCH, PCFICH, PHICH, PDCCH, EPDCCH, PDSCH) and/or the downlink physical signals (synchronization signal, downlink reference signal) in the downlink subframe. The PBCH is transmitted in only the subframe 0 of the radio frame. The downlink reference signal is mapped in the resource elements distributed in the frequency domain and the time domain. For simplification of description, the downlink reference signal is not shown in FIG. 4.

In a PDCCH region, a plurality of PDCCHs may be subjected to frequency multiplexing, time multiplexing, and/or spatial multiplexing. In an EPDCCH region, a plurality of EPDCCHs may be subjected to frequency multiplexing, time multiplexing, and/or spatial multiplexing. In a PDSCH region, a plurality of PDSCHs may be subjected to frequency multiplexing, time multiplexing, and/or spatial multiplexing. The PDCCH, the PDSCH, and/or the EPDCCH may be subjected to frequency multiplexing, time multiplexing, and/or spatial multiplexing.

Figure 5:
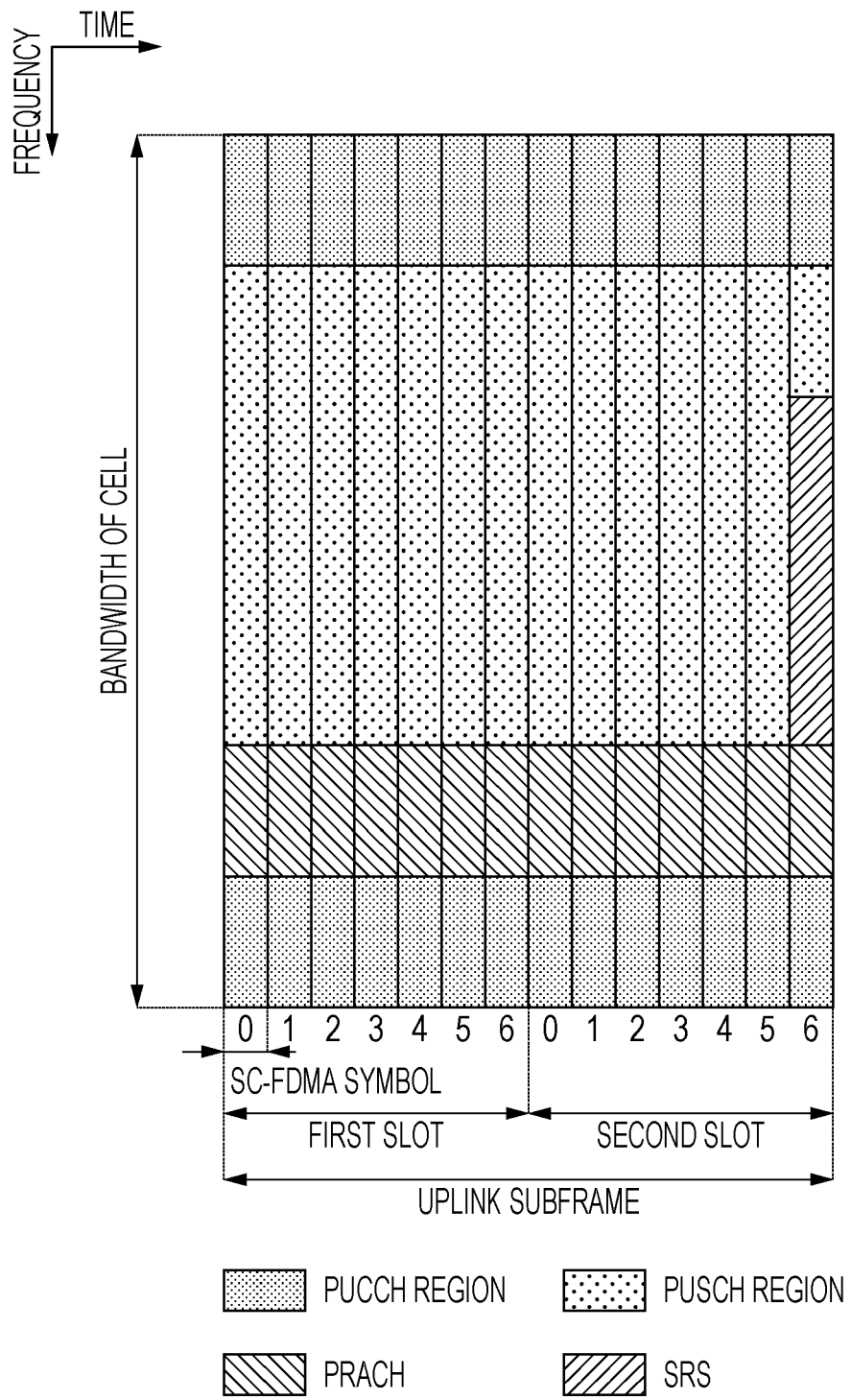
FIG. 5 is a diagram showing an example of the mapping of physical channels and physical signals in an uplink subframe of this embodiment.

FIG. 5 is a diagram showing an example of the mapping of physical channels and physical signals in an uplink subframe of this embodiment. The mobile station devices 1 may transmit the uplink physical channels (PUCCH, PUSCH, PRACH) and the uplink physical signals (UL-DMRS, SRS) in the uplink subframe. In a PUCCH region, a plurality of PUCCHs are frequency, time, space, and/or code-multiplexed. In a PUSCH region, a plurality of PUSCHs are frequency, time, space, and/or code-multiplexed. The PUCCH and the PUSCH may be frequency, time, space, and/or code-multiplexed. The PRACH may be allocated over a single subframe or two subframes. A plurality of PRACHs may be code-multiplexed.

The SRS is transmitted using the last SC-FDMA symbol in the uplink subframe. That is, the SRS is mapped in the last SC-FDMA symbol in the uplink subframe. The mobile station devices 1 can limit simultaneous transmission of the SRS and the PUCCH/PUSCH/PRACH in a single SC-FDMA symbol of a single cell. In a single uplink subframe of a single cell, the mobile station devices 1 can transmit the PUSCH and/or the PUCCH using SC-FDMA symbols excluding the last SC-FDMA symbol in the uplink subframe and can transmit the SRS using the last SC-FDMA symbol in the uplink subframe. That is, the mobile station devices 1 can transmit the SRS, and the PUSCH and the PUCCH in the single uplink subframe in the single cell. The DMRS is time-multiplexed on the PUCCH or the PUSCH. For simplification of description, the DMRS is not shown in FIG. 5.

Figure 6:
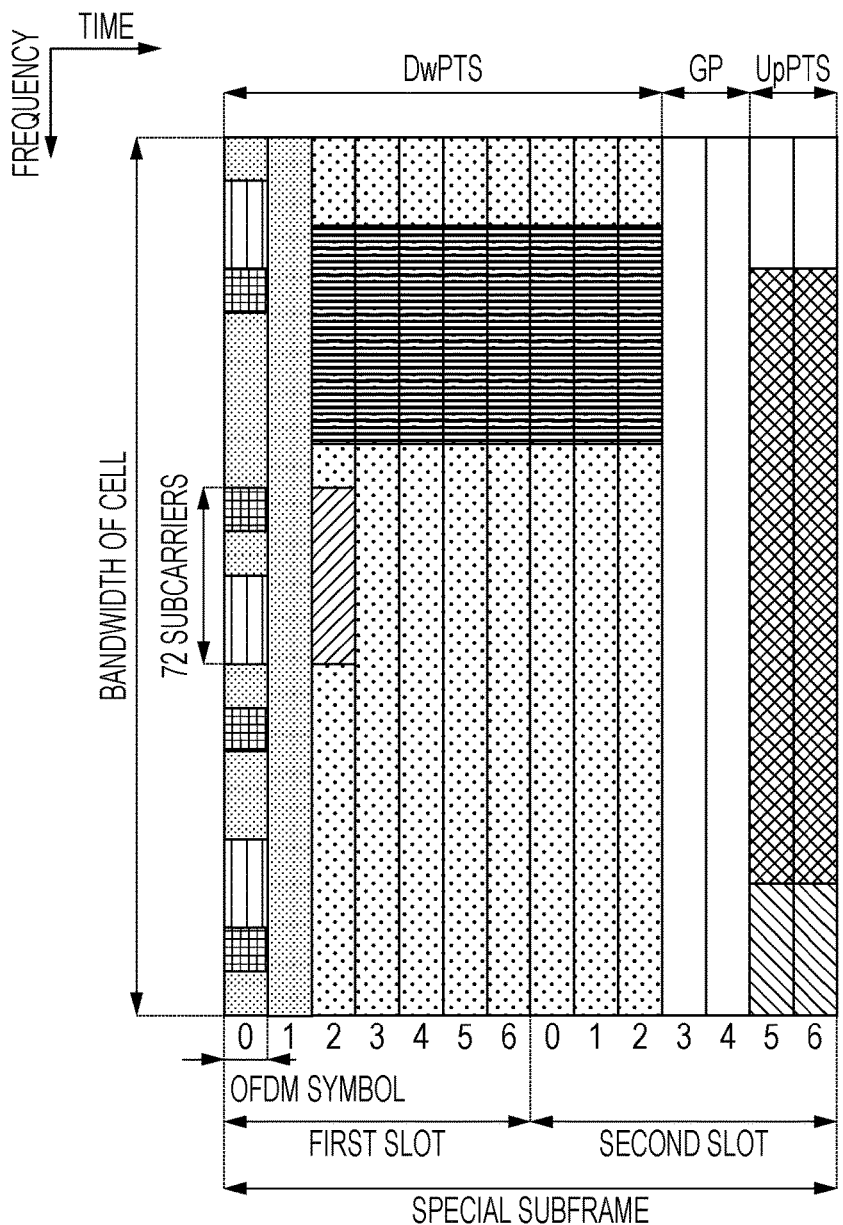
FIG. 6 is a diagram showing an example of the mapping of physical channels and physical signals in a special subframe of this embodiment.

FIG. 6 is a diagram showing an example of the mapping of physical channels and physical signals in a special subframe of this embodiment. In FIG. 6, the DwPTS has the first to tenth SC-FDMA symbols in the special subframe, the GP has the eleventh and twelfth SC-FDMA symbols in the special subframe, and the UpPTS has the thirteenth and fourteenth SC-FDMA symbols in the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 can limit the transmission of the PBCH in the DwPTS of the special subframe. The mobile station devices 1 may transmit the PRACH and the SRS in the UpPTS of the special subframe. That is, the mobile station devices 1 can limit the transmission of the PUCCH, the PUSCH, and the DMRS in the UpPTS of the special subframe.

Figure 7:
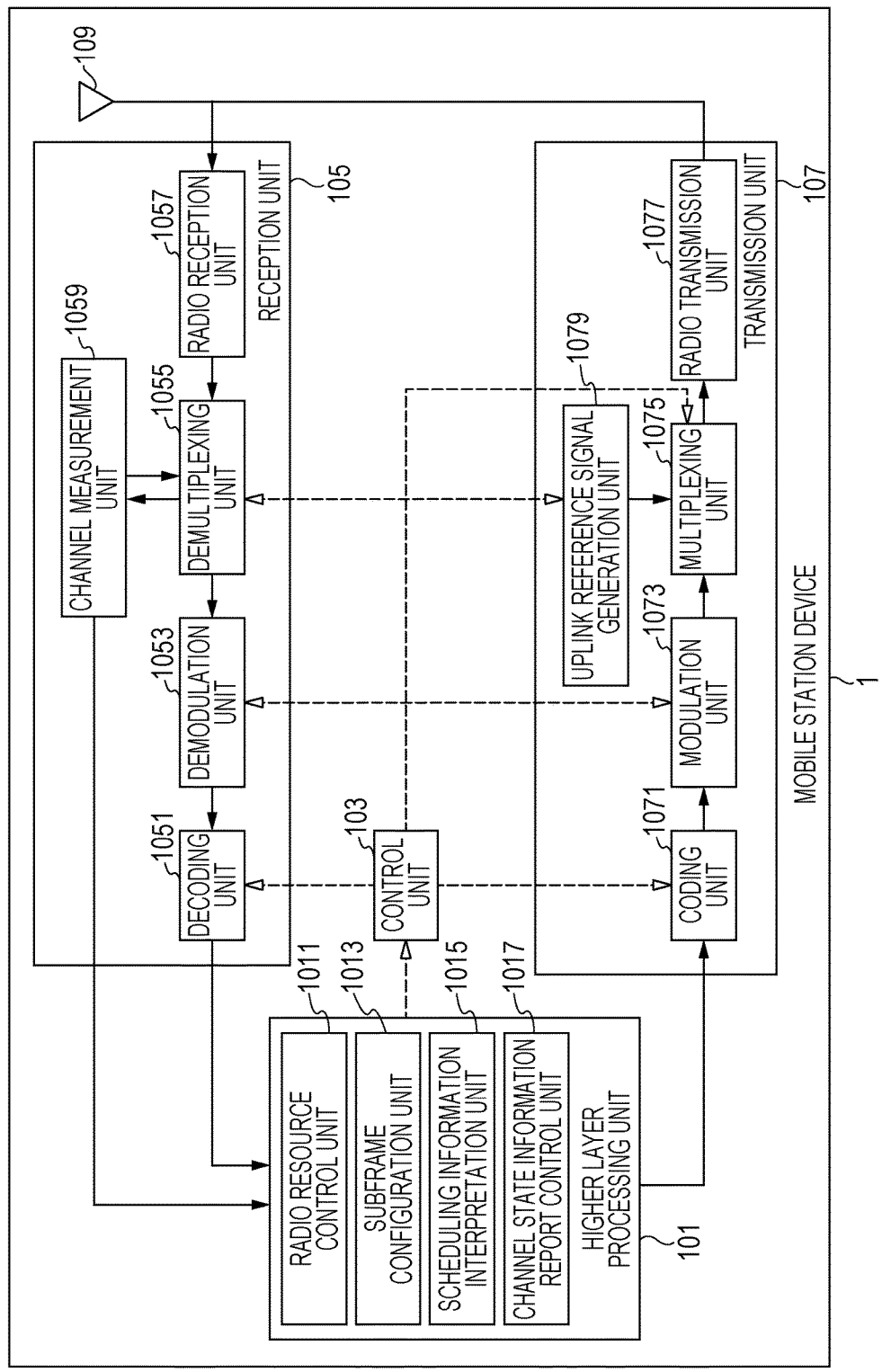
FIG. 7 is a schematic block diagram showing the configuration of a mobile station device 1 of this embodiment.

FIG. 7 is a schematic block diagram showing the configuration of a mobile station device 1 of this embodiment. As shown in the drawing, the mobile station device 1 includes a higher layer processing unit 101, a control unit 103, a reception unit 105, a transmission unit 107, and a transmission/reception antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (transport block) generated by user's operation to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control unit 1011 in the higher layer processing unit 101 manages various kinds of configuration information of the mobile station device. The radio resource control unit 1011 generates information to be mapped in each channel of the uplink and outputs the generated information to the transmission unit 107.

The subframe configuration unit 1013 in the higher layer processing unit 101 manages a subframe configuration in the base station device 3 and/or a base station device different from the base station device 3 based on information configured by the base station device 3. For example, the subframe configuration is the configuration of the uplink or downlink for a subframe. The subframe configuration includes a subframe pattern configuration, an uplink-downlink configuration, an uplink reference UL-DL configuration (Uplink reference configuration), a downlink reference UL-DL configuration (Downlink reference configuration), and/or a transmission direction UL-DL configuration (transmission direction configuration). The subframe configuration unit 1013 sets the subframe configuration, the subframe pattern configuration, the uplink-downlink configuration, the uplink reference UL-DL configuration, the downlink reference UL-DL configuration, and/or the transmission direction UL-DL configuration. The subframe configuration unit 1013 can set at least two subframe sets. The subframe pattern configuration includes an EPDCCH subframe configuration. The subframe configuration unit 1013 is referred to as a terminal subframe configuration unit.

The scheduling information interpretation unit 1015 in the higher layer processing unit 101 interprets the DCI format (scheduling information) received through the reception unit 105, generates control information to control the reception unit 105 and the transmission unit 107 based on the interpretation result of the DCI format, and outputs the generated control information to the control unit 103.

The scheduling information interpretation unit 1015 determines the timing of transmission processing and reception processing based on the subframe configuration, the subframe pattern configuration, the uplink-downlink configuration, the uplink reference UL-DL configuration, the downlink reference UL-DL configuration, and/or the transmission direction UL-DL configuration.

The CSI report control unit 1017 specifies a CSI reference resource. The CSI report control unit 1017 instructs the channel measurement unit 1059 to derive a CQI associated with the CSI reference resource. The CSI report control unit 1017 instructs the transmission unit 107 to transmit the CQI. The CSI report control unit 1017 sets a configuration which is used when the channel measurement unit 1059 calculates the CQI.

The control unit 103 generates control signals to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes reception signals received from the base station device 3 by the transmission/reception antenna 109 based on the control signals input from the control unit 103. The reception unit 105 outputs the decoded information to the higher layer processing unit 101.

The radio reception unit 1057 converts the signals of the downlink received by the transmission/reception antenna 109 to an intermediate frequency (down covert), removes unnecessary frequency components, controls an amplification level such that the signal levels are appropriately maintained, performs quadrature demodulation based on the in-phase components and quadrature components of the received signals, and converts the quadrature-demodulated analog signals to digital signals. The radio reception unit 1057 removes a portion corresponding to a guard interval (GI) from the converted digital signals, performs fast Fourier transform (FFT) on the signals with the guard interval removed, and extracts the signals of the frequency domain.

The demultiplexing unit 1055 separates the PHICH, the PDCCH, the EPDCCH, the PDSCH, and/or the downlink reference signal from the extracted signals. The demultiplexing unit 1055 compensates for the propagation path of the PHICH, the PDCCH, the EPDCCH, and/or the PDSCH from an estimation value of the propagation path input from the channel measurement unit 1059. The demultiplexing unit 1055 outputs the separated downlink reference signal to the channel measurement unit 1059.

The demodulation unit 1053 synthesizes the signals by multiplying the PHICH by a corresponding code, performs demodulation according to a BPSK (Binary Phase Shift Keying) modulation system on the synthesized signals, and outputs the demodulation result to the decoding unit 1051. The decoding unit 1051 decodes the PHICH addressed to the mobile station device and outputs the decoded HARQ indicator to the higher layer processing unit 101. The demodulation unit 1053 performs demodulation according to a QPSK modulation system on the PDCCH and/or the EPDCCH and outputs the demodulation result to the decoding unit 1051. The decoding unit 1051 attempts to decode the PDCCH and/or the EPDCCH, and when decoding is successful, outputs the decoded downlink control information and the RNTI, to which the downlink control information corresponds, to the higher layer processing unit 101.

The demodulation unit 1053 performs demodulation according to a modulation system notified by the downlink grant, such as QPSK (Quadrature Phase Shift Keying), 16QAM (Quadrature Amplitude Modulation), or 64QAM, on the PDSCH and outputs the demodulation result to the decoding unit 1051. The decoding unit 1051 performs decoding based on information concerning an encoding rate notified by the downlink control information and outputs the decoded downlink data (transport block) to the higher layer processing unit 101.

The channel measurement unit 1059 measures a path loss or a channel state of the downlink from the downlink reference signal input from the demultiplexing unit 1055 and outputs the measured path loss or the measured state of the channel to the higher layer processing unit 101. The channel measurement unit 1059 calculates an estimation value of the propagation path of the downlink from the downlink reference signal and outputs the estimation value to the demultiplexing unit 1055. The channel measurement unit 1059 performs channel measurement and/or interference measurement to calculate the CQI.

The transmission unit 107 generates the uplink reference signal according to the control signals from the control unit 103, encodes and modulates uplink data (transport block) input from the higher layer processing unit 101, multiplexes the PUCCH, PUSCH, and the generated uplink reference signal, and transmits the multiplexed signals to the base station device 3 through the transmission/reception antenna 109.

The coding unit 1071 performs encoding, such as convolution encoding or block encoding, on the uplink control information input from the higher layer processing unit 101. The coding unit 1071 performs turbo encoding based on information which is used for the scheduling of the PUSCH.

The modulation unit 1073 modulates an encoding bit input from the coding unit 1071 by a modulation system notified by the downlink control information, such as BPSK, QPSK, 16QAM, or 64QAM, or a modulation system determined in advance for each channel. The modulation unit 1073 determines the number of sequences of data to be spatially multiplexed based on information which is used for the scheduling of the PUSCH, and maps a plurality of pieces of uplink data transmitted by the same PUSCH to a plurality of sequences and performs precoding on the sequences using MIMO SM (Multiple Input Multiple Output Spatial Multiplexing).

The uplink reference signal generation unit 1079 generates a sequence obtained by a rule (expression) determined in advance based on a physical layer cell identifier (physical cell identity: PCI, referred to as a cell ID or the like) for identifying the base station device 3, a bandwidth where the uplink reference signal is allocated, a cyclic shift notified by the uplink grant, the values of parameters for generation of a DMRS sequence, and the like. The multiplexing unit 1075 rearranges the modulation symbols of the PUSCH in parallel according to the control signals input from the control unit 103 and then performs discrete Fourier transform (DFT). The multiplexing unit 1075 multiplexes the signals of the PUCCH and the PUSCH and the generated uplink reference signal for each transmission antenna port. That is, the multiplexing unit 1075 maps the signals of the PUCCH and the PUSCH and the generated uplink reference signal in the resource elements for each transmission antenna port.

The radio transmission unit 1077 performs inverse fast Fourier transform (IFFT) on the multiplexed signals, performs modulation according to a SC-FDMA system, appends a guard interval to SC-FDMA modulated SC-FDMA symbols, generates baseband digital signals, converts the baseband digital signals to analog signals, generates in-phase components and quadrature components having an intermediate frequency from the analog signals, removes excessive frequency components for the intermediate frequency band, converts signals having an intermediate frequency to signals having a high frequency (up convert), removes excessive frequency components, performs power amplification, and outputs and transmits the power-amplified signals to the transmission/reception antenna 109.

Figure 8:
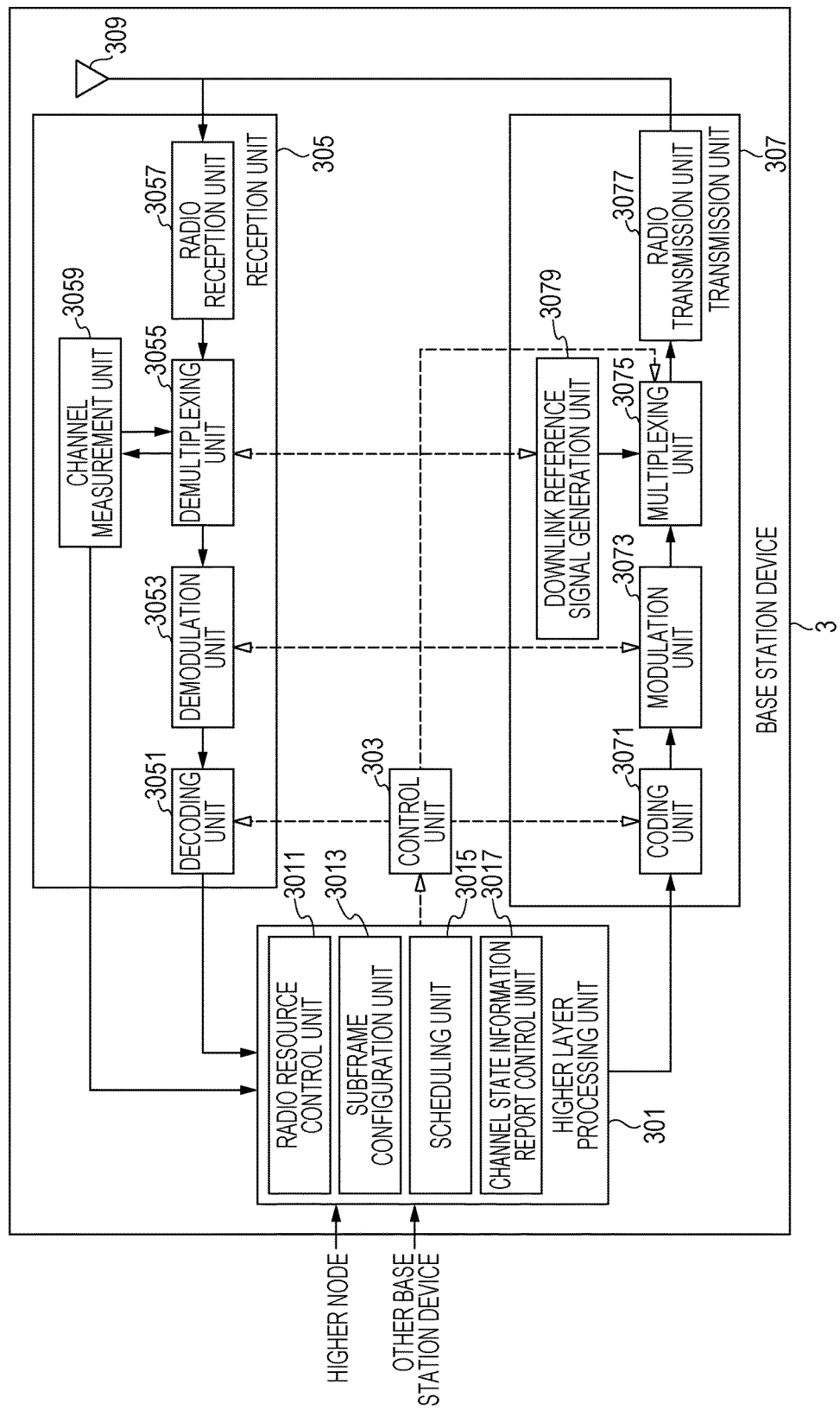
FIG. 8 is a schematic block diagram showing the configuration of a base station device 3 of this embodiment.

FIG. 8 is a schematic block diagram showing the configuration of a base station device 3 of this embodiment. As shown in the drawing, the base station device 3 includes a higher layer processing unit 301, a control unit 303, a reception unit 305, a transmission unit 307, and a transmission/reception antenna 309. The higher layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. The higher layer processing unit 301 generates control information to control the reception unit 305 and the transmission unit 307 and outputs the generated control information to the control unit 303.

The radio resource control unit 3011 in the higher layer processing unit 301 generates downlink data (transport block) arranged in the PDSCH of the downlink, system information, an RRC message, a MAC CE (Control Element), and the like, or acquires downlink data, the system information, the RRC message, and the MAC CE from a higher node, and outputs downlink data, the system information, the RRC message, and the MAC CE to the transmission unit 307. The radio resource control unit 3011 manages various kinds of configuration information of each of the mobile station devices 1.

The subframe configuration unit 3013 in the higher layer processing unit 301 manages the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 sets the subframe configuration, the subframe pattern configuration, the uplink-downlink configuration, the uplink reference UL-DL configuration, the downlink reference UL-DL configuration, and/or the transmission direction UL-DL configuration for each mobile station device 1. The subframe configuration unit 3013 transmits information concerning the subframe configuration to the mobile station devices 1. The subframe configuration unit 3013 is referred to as a base station subframe configuration unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1. The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the mobile station devices 1 indicated from the higher node.

For example, the subframe configuration unit 3013 may determine the subframe configuration, the subframe pattern configuration, the uplink-downlink configuration, the uplink reference UL-DL configuration, the downlink reference UL-DL configuration, and/or the transmission direction UL-DL configuration based on the traffic amount of the uplink and the traffic amount of the downlink.

The subframe configuration unit 3013 can manage at least two subframe sets. The subframe configuration unit 3013 may set at least two subframe sets for each mobile station device 1. The subframe configuration unit 3013 may set at least two subframe sets for each serving cell. The subframe configuration unit 3013 may set at least two subframe sets for each CSI process. The subframe configuration unit 3013 can transmit information representing at least two subframe sets to the mobile station devices 1 through the transmission unit 307.

The scheduling unit 3015 in the higher layer processing unit 301 determines the frequency and subframe to which the physical channels (PDSCH and PUSCH) are allocated, the encoding rate and the modulation system of the physical channels (PDSCH and PUSCH), transmission power, and the like from the channel state information, the estimation value of the propagation path or the channel quality input from the channel measurement unit 3059, and the like. The scheduling unit 3015 determines whether or not to schedule the downlink physical channels and/or the downlink physical signals or the uplink physical channels and/or the uplink physical signals in a flexible subframe. The scheduling unit 3015 generates control information (for example, DCI format) to control the reception unit 305 and the transmission unit 307 based on the scheduling result and outputs the generated control information to the control unit 303.

The scheduling unit 3015 generates information, which is used for the scheduling of the physical channels (PDSCH and PUSCH), based on the scheduling result. The scheduling unit 3015 determines the timing (subframe) of transmission processing and reception processing based on the UL-DL configuration, the subframe pattern configuration, the uplink-downlink configuration, the uplink reference UL-DL configuration, the downlink reference UL-DL configuration, and/or the transmission direction UL-DL configuration.

The CSI report control unit 3017 in the higher layer processing unit 301 controls a CSI report of the mobile station device 1. The CSI report control unit 3017 transmits information representing various configurations, which are assumed when the mobile station device 1 derives a CQI in a CSI reference resource, to the mobile station device 1 through the transmission unit 307.

The control unit 303 generates control signals to control the reception unit 305 and the transmission unit 307 based on the control information from the higher layer processing unit 301. The control unit 303 outputs the generated control signals to the reception unit 305 and the transmission unit 307 to control the reception unit 305 and the transmission unit 307.

The reception unit 305 separates, demodulates, and decodes reception signals received from the mobile station devices 1 through the transmission/reception antenna 309 according to the control signals input from the control unit 303 and outputs the decoded information to the higher layer processing unit 301. The radio reception unit 3057 converts the signals of the uplink received through the transmission/reception antenna 309 to an intermediate frequency (down covert), removes unnecessary frequency components, controls an amplification level such that the signal levels are appropriately maintained, performs quadrature demodulation based on the in-phase components and the quadrature components of the received signals, and converts the quadrature-demodulated analog signals to digital signals.

The radio reception unit 3057 removes a portion corresponding to the guard interval (GI) from the converted digital signals. The radio reception unit 3057 performs fast Fourier transform (FFT) on the signals with the guard interval removed, extracts the signals of the frequency domain, and outputs the extracted signals to the demultiplexing unit 3055.

The demultiplexing unit 1055 separates the signals input from the radio reception unit 3057 into the PUCCH, the PUSCH, the uplink reference signal, and the like. The separation is performed based on allocation information of radio resources included in the uplink grant determined by the radio resource control unit 3011 of the base station device 3 and notified to each mobile station device 1. The demultiplexing unit 3055 compensates for the propagation path of the PUCCH and the PUSCH from the estimation value of the propagation input from the channel measurement unit 3059. The demultiplexing unit 3055 outputs the separated uplink reference signal to the channel measurement unit 3059.

The demodulation unit 3053 performs inverse discrete Fourier transform (IDFT) on the PUSCH, acquires the modulation symbols, and demodulates the reception signals using a modulation system determined in advance, such as BPSK (Binary Phase Shift Keying), QPSK, 16QAM, or 64QAM, or a modulation system notified in advance from the base station device to each of the mobile station devices 1 by the uplink grant on each of the modulation symbols of the PUCCH and the PUSCH. The demodulation unit 3053 separates the modulation symbols of a plurality of pieces of uplink data transmitted in the same PUSCH using MIMO SM based on the number of sequences to be spatially multiplexed notified in advance to each of the mobile station devices 1 by the uplink grant and information indicating precoding on the sequences.

The decoding unit 3051 decodes the encoding bits of the demodulated PUCCH and PUSCH at an encoding rate determined in advance of an encoding system determined in advance or an encoding rate notified in advance from the base station device to each of the mobile station devices 1 by the uplink grant and outputs the decoded uplink data and the uplink control information to the higher layer processing unit 101. When retransmitting the PUSCH, the decoding unit 3051 decodes an encoding bit held in a HARQ buffer input from the higher layer processing unit 301 and the demodulated encoding bit. The channel measurement unit 309 measures the estimation value of the propagation path, the channel quality, and the like from the uplink reference signal input from the demultiplexing unit 3055 and outputs the measurement result to the demultiplexing unit 3055 and the higher layer processing unit 301.

The transmission unit 307 generates the downlink reference signal according to the control signals input from the control unit 303, encodes and modulates the HARQ indicator and the downlink control information, and downlink data input from the higher layer processing unit 301, multiplexes the PHICH, the PDCCH, the EPDCCH, the PDSCH, and the downlink reference signal, and outputs the signals to the mobile station devices 1 through the transmission/reception antenna 309.

The coding unit 3071 encodes the HARQ indicator, the downlink control information, and downlink data input from the higher layer processing unit 301 using an encoding system determined in advance, such as block encoding, convolution encoding, or turbo encoding, or an encoding system determined by the radio resource control unit 3011. The modulation unit 3073 modulates the encoding bit input from the coding unit 3071 by a modulation system determined in advance, such as BPSK, QPSK, 16QAM, or 64QAM, or a modulation system determined by the radio resource control unit 3011.

The downlink reference signal generation unit 3079 generates a sequence obtained by a rule determined in advance based on the physical layer cell identifier (PCI) or the like for identifying the base station device 3 and known to the mobile station devices 1 as the downlink reference signal. The multiplexing unit 3075 multiplexes the modulation symbols of each modulated channel and the generated downlink reference signal. That is, the multiplexing unit 3075 maps the modulation symbols of each modulated channel and the generated downlink reference signal in the resource elements.

The radio transmission unit 3077 performs inverse fast Fourier transform (IFFT) on the multiplexed modulation symbols and the like, performs modulation according to an OFDM system, appends a guard interval to the OFDM-modulated OFDM symbols, generates baseband digital signals, converts the baseband digital signals to analog signals, generates in-phase components and quadrature components having an intermediate frequency from the analog signals, removes excessive frequency components for the intermediate frequency band, converts the signals having the intermediate frequency to signals having a high frequency (up convert), removes excessive frequency components, performs power amplification, and outputs and transmits the power-amplified signals to the transmission/reception antenna 309.

Hereinafter, the details of the EPDCCH will be described. Similarly to the PDCCH, the EPDCCH is used to notify of the DCI (Downlink control information).

The EPDCCH is transmitted using an aggregation of one or more ECCEs (Enhanced control channel elements). Each ECCE has a plurality of EREGs (Enhanced resource element groups). The EREGs are used to define mapping to the resource elements of the EPDCCH. In each RB pair, 16 EREGs numbered 0 to 15 are defined. That is, in each RB pair, EREG0 to EREG15 are defined. In each RB pair, EREG0 to EREG15 are defined periodically with priority to the frequency direction for resource elements other than resource elements to which prescribed signals and/or channels are mapped. For example, resource elements to which a demodulation reference signal associated with the EPDCCH transmitted through antenna ports 107 to 110 is mapped define no EREGs.

The number of ECCEs used for one EPDCCH depends on an EPDCCH format and is determined based on other parameters. The number of ECCEs used for one EPDCCH is referred to as an aggregation level. For example, the number of ECCEs used for one EPDCCH is determined based on the number of resource elements which can be used for EPDCCH transmission in one RB pair, a transmission method of the EPDCCH, and the like. For example, the number of ECCEs used for one EPDCCH is 1, 2, 4, 8, 16, or 32. The number of EREGs used for one ECCE is determined based on the type of a subframe and the type of a cyclic prefix and is 4 or 8. As the transmission method of the EPDCCH, distributed transmission and localized transmission are supported.

The EPDCCH can use the distributed transmission and the localized transmission. The distributed transmission and the localized transmission are different in mapping of the ECCEs to the EREGs and the RB pairs. For example, in the distributed transmission, one ECCE is constituted using the EREGs of a plurality of RB pairs. In the localized transmission, one ECCE is constituted using the EREGs of one RB pair.

The base station device 3 performs the configuration concerning the EPDCCH for the mobile station devices 1. The mobile station devices 1 monitor a plurality of EPDCCHs based on the configuration from the base station device 3. A set of RB pairs which the mobile station devices 1 monitor the EPDCCH can be configured. A set of RB pairs is referred to as an EPDCCH set or an EPDCCH-PRB set. One or more EPDCCH sets can be configured for one mobile station device 1. Each EPDCCH set has one or more RB pairs. The configuration concerning the EPDCCH can be performed separately for each EPDCCH set.

Figure 9:
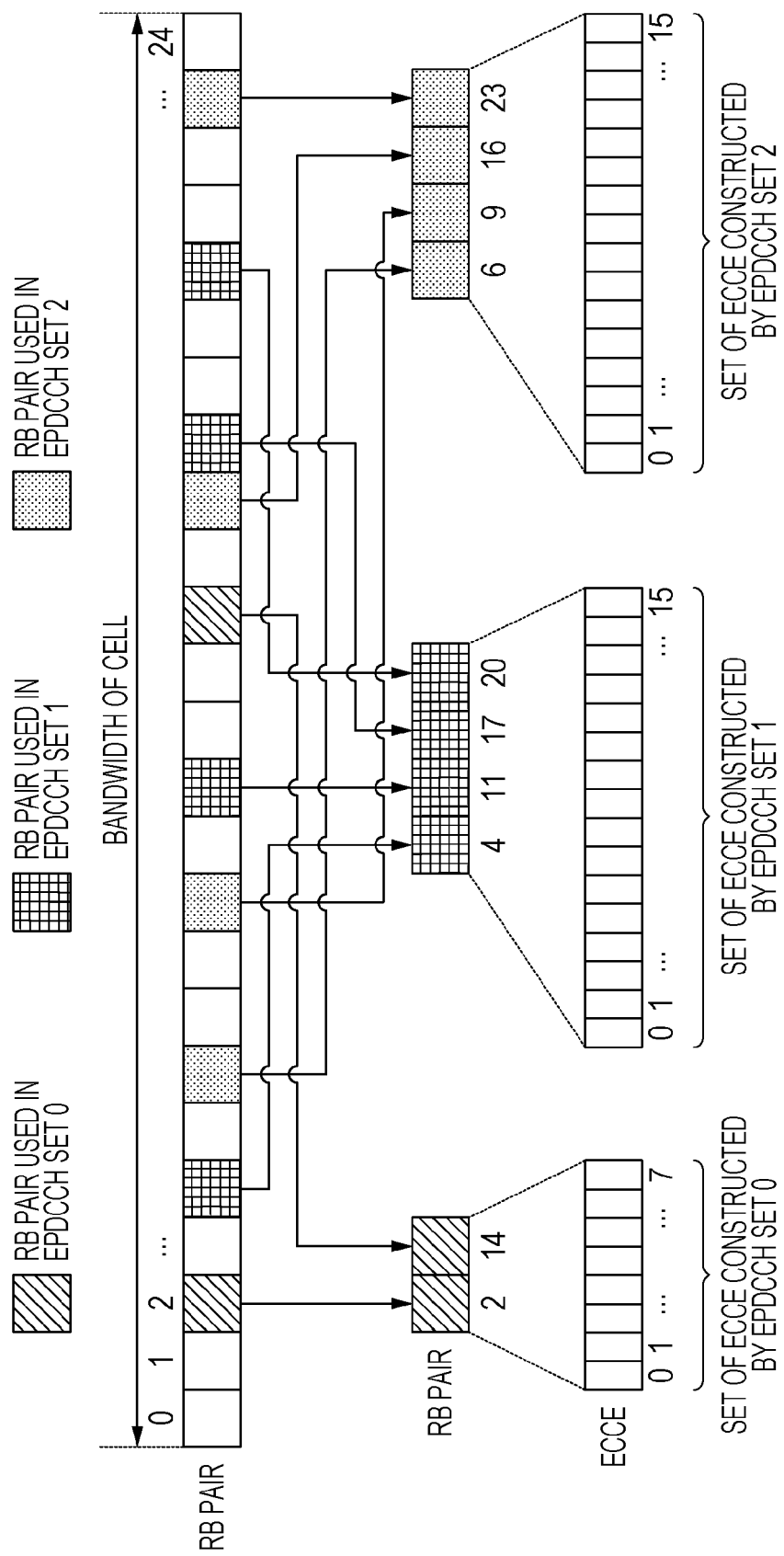
FIG. 9 is a diagram showing an example of an EPDCCH set.

FIG. 9 is a diagram showing an example of an EPDCCH set. In FIG. 9, in a bandwidth of a cell having 25 RB pairs, three EPDCCH sets are configured as EPDCCH sets 0 to 2. For example, the EPDCCH set 0 has two RB pairs, the EPDCCH set 1 has four RB pairs, and the EPDCCH set 2 has four RB pairs. Each EPDCCH set constitutes one set of a plurality of ECCEs. The number of ECCEs in one EPDCCH set is determined based on the number of RB pairs set as the EPDCCH set and the number of EREGs used for one ECCE. When the number of ECCEs in one EPDCCH set is N, each EPDCCH set has ECCEs numbered 0 to N−1. When the number of EREGs which are used for one ECCE is 4, the EPDCCH set 0 has eight ECCEs, the EPDCCH set 1 has 16 ECCEs, and the EPDCCH set 2 has 16 ECCEs.

The candidates of the EPDCCH which are monitored by the mobile station devices 1 are defined based on the ECCEs in the EPDCCH set. A set of candidates of the EPDCCH is defined as a search space (search region). A UE-specific search space which is a search space specific to the mobile station devices 1 and a common search space which is a search space specific to the base station device 3 (cell, transmission point, UE group) are defined. The monitoring of the EPDCCH includes that the mobile station devices 1 attempt to decode each of the candidates of the EPDCCH in the search space according to the DCI format to be monitored.

Figure 10:
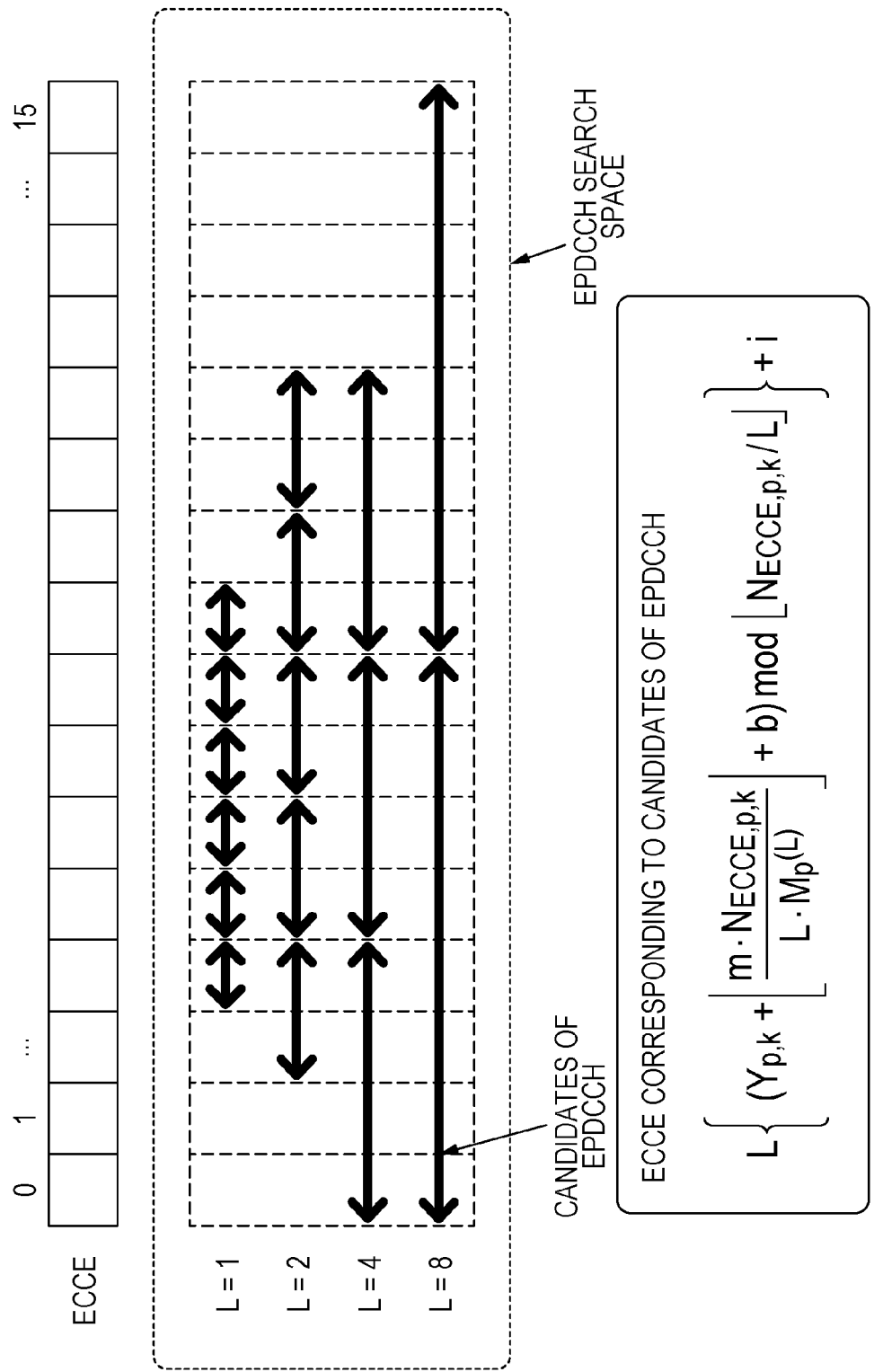
FIG. 10 is a diagram showing an example of an EPDCCH search space.

FIG. 10 is a diagram showing an example of an EPDCCH search space. In FIG. 10, an example of a search space where an aggregation level L is 1, 2, 4, and 8 in an EPDCCH set having 16 ECCEs is shown. When the aggregation level L is 1, 2, 4, and 8, the number of candidates of the EPDCCH is 6, 5, 3, and 2. The ECCEs corresponding to the candidates of the EPDCCH in the search space is given by a numerical expression in FIG. 10. However, m represents an index of each of the candidates of the EPDCCH and is 0 to $M_p^{(L)}-1$. $M_p^{(L)}$ is the number of candidates of the EPDCCH monitored by the aggregation level L in an EPDCCH EPDCCH set p. $N_{ECCE,p,k}$ is the number of ECCEs in an EPDCCH set p of a subframe k. b is the value of the CIF when a CIF (Carrier indicator field) is configured and is 0 otherwise. i is 0 to L−1. In FIG. 10, $Y_{p,k}$ is 3. When the aggregation level L is 4, the candidate 0 of the EPDCCH is given by the ECCEs 0 to 3, the candidate 1 of the EPDCCH is given by the ECCEs 4 to 7, and the candidate 2 of the EPDCCH is given by the ECCEs 8 to 11.

$Y_{p,k}$ represents a value in the EPDCCH set p and the subframe k. $Y_{p,k}$ can be configured independently by a search space. In the common search space, $Y_{p,k}$ is a value specific to the base station device 3 (cell). For example, in the common search space, $Y_{p,k}$ is a value defined in advance or a value determined based on the parameters specific to the base station device 3. In the UE-specific search space, $Y_{p,k}$ is a value specific to the mobile station devices 1. For example, $Y_{p,k}$ is a prescribed value and is determined based on the subframe k and the RNTI (for example, C-RNTI) of the mobile station device 1. In FIG. 10, $Y_{p,k}$ is 3. A plurality of common search spaces and/or a plurality of UE-specific search spaces may be configured in one EPDCCH set.

Configuration information of the EPDCCH is transmitted in a state of including at least one of a MIB, a system information block type 1 message, and a system information message. The EPDCCH configured by using the above transmission method is referred to a first EPDCCH.

The configuration information of the EPDCCH is transmitted in a state of including at least one of a RRC message, a MAC CE (Control Element), and control information (for example, DCI format) of the physical layer. The EPDCCH configured by using the above transmission method is referred to a second EPDCCH.

Although the search space is configured in each aggregation, in the following description, a set of search spaces in each aggregation is simply referred to as a search space. That is, in the following description, a search space includes a set of search spaces.

Hereinafter, the details of the subframe configuration will be described.

For example, the subframe configuration is a configuration concerning the type of the subframe for each subframe. The type of a subframe includes a downlink subframe, an uplink subframe, a special subframe, and a flexible subframe. In the following description, the downlink subframe is referred to as D, the uplink subframe is referred to as U, the special subframe is referred to as S, and the flexible subframe is referred to as F.

The subframe configuration can be performed using information of various forms or formats. For example, the subframe configuration can be performed using explicit or implicit information for each subframe. The subframe configuration can be performed using explicit or implicit information for a prescribed number of subframes. The subframe configuration can be performed using information corresponding to a plurality of subframe configurations defined in advance.

FIG. 11 is an example of an uplink-downlink configuration. In FIG. 11, as the subframe configuration, an uplink-downlink configuration is used. Seven uplink-downlink configurations are defined in advance, and a number (index) corresponding to each uplink-downlink configuration is allocated. In each uplink-downlink configuration, the type of the subframe is defined for ten subframes in one radio frame. For example, the base station device 3 notifies each mobile station device 1 of the number of the uplink-downlink configuration, whereby the base station device 3 can perform the uplink-downlink configuration in the radio frame to the mobile station device 1. The mobile station device 1 is notified of the number of the uplink-downlink configuration from the base station device 3, whereby the mobile station device 1 can be subjected to the uplink-downlink configuration in the radio frame from the base station device 3.

The uplink-downlink configuration is a configuration concerning the pattern of a subframe in a radio frame. The uplink-downlink configuration represents whether each subframe in a radio frame is a downlink subframe, an uplink subframe, or a special subframe.

The pattern of a downlink subframe, an uplink subframe, or a special subframe represents whether each of subframes #0 to #9 is a downlink subframe, an uplink subframe, and a special subframe, and is preferably expressed by an arbitrary combination of D, U, and S having a length of 10. More preferably, the head subframe (that is, the subframe #0) is D, and the second subframe (that is, the subframe #1) is S.

In FIG. 11, the subframe 1 in the radio frame is constantly a special subframe. In FIG. 11, the subframes 0 and 5 are constantly reserved for downlink transmission, and the subframe 2 is constantly reserved for uplink transmission. In FIG. 11, when the downlink-to-uplink switch-point periodicity is 5 ms, the subframe 6 in the radio frame is a special subframe, and when the downlink-to-uplink switch-point periodicity is 10 ms, the subframe 6 in the radio frame is a downlink subframe.

The base station device 3 performs the subframe configuration in prescribed subframes to each mobile station device 1. The mobile station device 1 monitors the control channels including the PDCCH and/or the EPDCCH based on the subframe configuration set from the base station device 3.

The subframe configuration can be performed using various methods or control information. For example, the subframe configuration is performed using one or more uplink-downlink configurations and/or one or more kinds of bitmap information. The control information which is used for the subframe configuration can be transmitted as information specific to the base station device 3 or each mobile station device 1. The control information which is used for the subframe configuration can be transmitted using various methods, such as the PDCCH, the EPDCCH, the MIB, the SIB, and/or the RRC. The bitmap information is information of a bitmap format for prescribed subframes. For example, an EPDCCH subframe configuration is a configuration concerning the monitoring of the EPDCCH as the bitmap information.

The monitoring of the control channels can be switched (determined) based on the subframe configuration. For example, in the monitoring of the control channels, first monitoring and second monitoring can be switched based on the subframe configuration. The monitoring of the control channels determined based on the subframe configuration can be performed using various methods or rules.

The monitoring of the control channels can switch among different control channels and/or different search spaces. For example, in the monitoring of the control channels, a PDCCH or an EPDCCH is determined. In the monitoring of the control channels, a PDCCH search space (PDCCH-SS) or an EPDCCH search space (EPDCCH-SS) is determined. In the monitoring of the control channels, a CSS or a USS is determined. In the monitoring of the control channels, a PDCCH-CSS which is a common search space for monitoring the PDCCH, a PDCCH-USS which is a UE-specific search space for monitoring the PDCCH, an EPDCCH-CSS which is a common search space for monitoring the EPDCCH, or an EPDCCH-USS which is a UE-specific search space for monitoring the EPDCCH is determined. The EPDCCH-SS includes the EPDCCH-CSS and the EPDCCH-USS. The PDCCH-SS includes the PDCCH-CSS and the PDCCH-USS.

The CSS is a search space which is configured using parameters specific to the base station device 3 (cell, transmission point) and/or parameters defined in advance. For example, the CSS is a search space which can be used in common by a plurality of mobile station devices. For this reason, the base station device 3 maps the control channels common to a plurality of mobile station devices to the CSS, thereby reducing the resources for transmitting the control channels. The USS is at least a search space which is configured using the parameters specific to the mobile station devices 1. For this reason, since the USS can transmit the control channels specific to the mobile station devices 1 individually, the base station device 3 can efficiently control the mobile station devices 1.

The CSS may be configured further using the parameters specific to the mobile station devices 1. In this case, it is preferable that the parameters specific to the mobile station devices 1 are configured to have the same values among a plurality of mobile station devices. Even when the CSS is configured further using the parameters specific to the mobile station devices 1, the CSS is common among a plurality of mobile station devices in which the same parameters are configured. For example, a unit in which the same parameters are configured among a plurality of mobile station devices is a cell, a transmission point, a UE group, or the like. Since a plurality of mobile station devices in which the same parameters are configured can receive the common control channels mapped to the CSS, the resources for transmitting the control channels can be reduced. The search space is referred to as a USS, instead of a CSS. That is, a USS which is a search space common to a plurality of mobile station devices may be configured. A USS specific to one mobile station device is referred to as a first USS, and a USS common to a plurality of mobile station devices is referred to as a second USS.

The CSS of the first EPDCCH is configured by a mobile station device in which the EPDCCH can be configured, so as to be common between cells. The CSS of the first EPDCCH can be used for an initial access of the mobile station device to the base station device. The CSS of the second EPDCCH is configured in a common search space between the plurality of mobile station devices. For example, a unit configured for the same parameter between the plurality of mobile station devices may be a cell, a transmission point, a UE group, and the like.

In the monitoring of the control channels, configurations set independently can be further switched for the same control channel and/or the same search space. The configurations are processing or configurations for the control channels to be monitored. The configurations include configurations defined in advance. When a plurality of configurations are configured or defined and the configurations are independent, the processing or the configurations for the control channels to be monitored are independent from one another. A configuration 1 (first configuration) and a configuration 2 (second configuration) correspond to first processing or configuration and second processing or configuration for the control channels to be monitored. The monitoring of the configuration 1 and the monitoring of the configuration 2 can be made different and are respectively referred to as first monitoring and second monitoring. For example, the configurations set independently process mapping of the control channels to be monitored to the resource elements independently. The configuration 1 and the configuration 2 correspond to first mapping and second mapping of the control channels to be monitored to the resource elements. The monitoring of the control channels corresponding to the configurations set independently of the same control channel and/or the same search space can be regarded as independent monitoring. That is, the monitoring of the control channels can switch among the configurations set independently for the same control channel and/or the same search space.

The monitoring of the control channels can switch among different control channels, different search spaces, and/or different configurations. In the monitoring of the control channels corresponding to different control channels, different search spaces, and/or different configurations, the processing or the configurations of the control channels can be made different. For example, when the monitoring of the control channels is different, in the respective monitoring, the mappings (mapping methods, mapping rules) of the control channels to be monitored to the resource elements can be made different. Specifically, different mappings are different in the resource elements which are not used for the mapping of the control channels, and the configuration or standard. The resource elements which are not used for the mapping of the control channels are regions or the like before a start symbol in the CRS, the NZP CSI-RS, the ZP CSI-RS, and the RB pair.

The processing or the configurations of the control channels to be monitored can be performed using various methods or assumptions. The processing or the configurations of the control channels to be monitored can be determined or switched based on the monitoring of the control channels. For example, the processing or the configurations of the control channels to be monitored are parameters for performing demodulation processing and/or decoding processing on the control channels. For example, the processing or the configurations of the control channels to be monitored are response signals to the PDSCH scheduled on the control channels.

Figure 12:
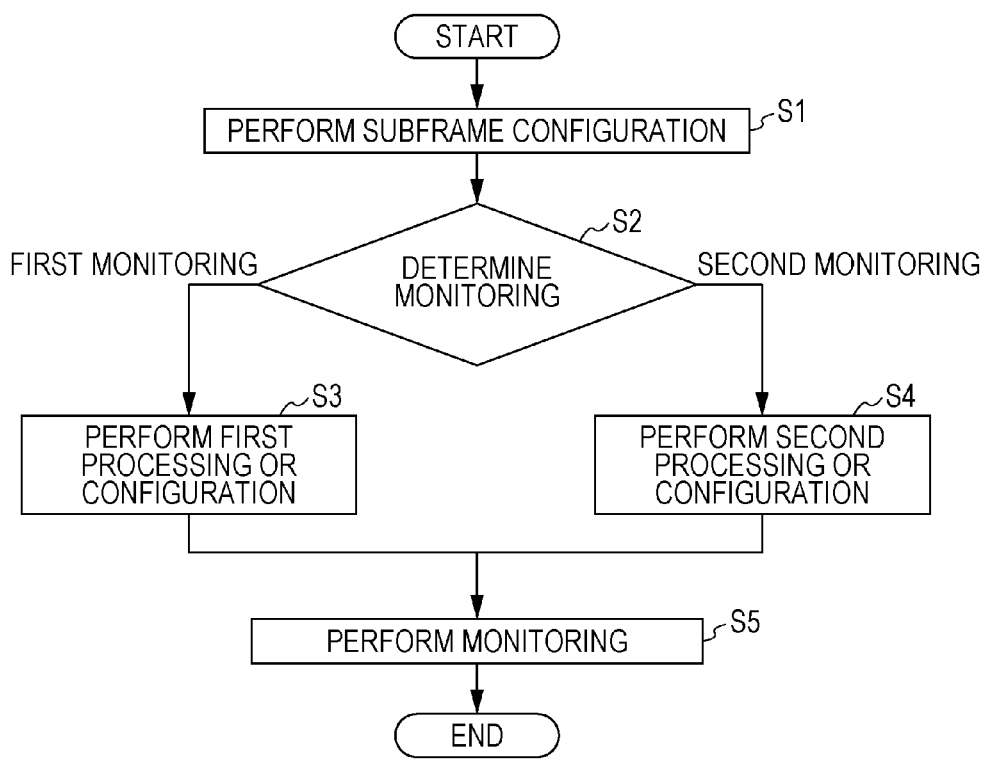
FIG. 12 is a diagram showing an example of a flowchart concerning monitoring of control channels in mobile station devices.

FIG. 12 is a diagram showing an example of a flowchart concerning monitoring of control channels in a mobile station device. In Step S1, the mobile station devices 1 are subjected to the subframe configuration by the base station device 3. In Step S2, the mobile station devices 1 determine the monitoring of the control channels based on the subframe configuration performed in Step S1. The mobile station devices 1 determine the processing or the configurations of the control channels to be monitored based on at least the monitoring of the control channel determined or configured in Step S2. When the first monitoring is determined in Step S2, in Step S3, the mobile station devices 1 determine the first processing or configuration for the control channels to be monitored. When the second monitoring is determined in Step S2, in Step S4, the mobile station devices 1 determine the second processing or configuration for the control channels to be monitored. In Step S5, the mobile station devices 1 monitor the control channels based on the processing or configuration determined in Step S3 or S4.

The base station device 3 performs the subframe configuration on the mobile station devices 1. The base station device 3 determines the monitoring of the control channels in the mobile station devices 1 based on the subframe configuration on the mobile station devices 1. The base station device 3 determines the processing or the configurations of the control channels of the mobile station devices 1 based on the monitoring of the control channels determined for the mobile station devices 1. When the first monitoring is determined for the mobile station devices 1, the base station device 3 determines the first processing or configuration for the control channels of the mobile station devices 1. When the second monitoring is determined for the mobile station devices 1, the base station device 3 determines the second processing or configuration for the control channels of the mobile station devices 1. The base station device 3 maps the control channels of the mobile station devices 1 to physical resources or logical resources based on the determined processing or configuration of the control channels.

Three or more kinds of the monitoring of the control channels and the processing or configurations of the control channel to be monitored may be configured or defined.

Figure 13:
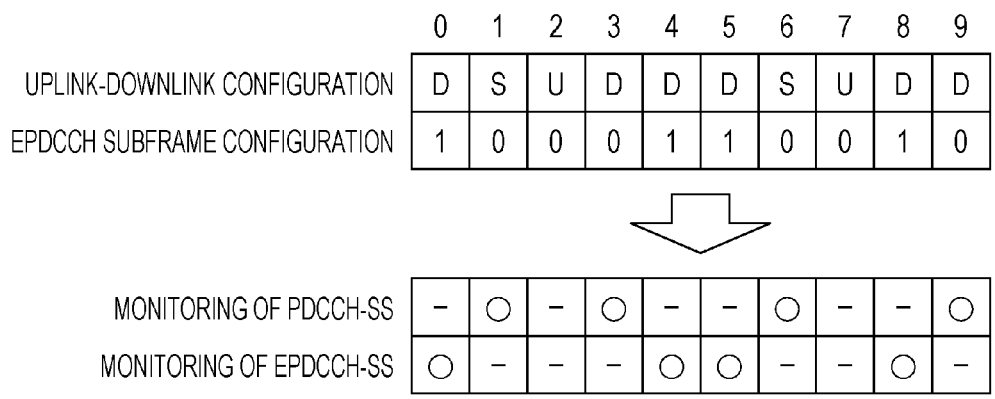
FIG. 13 is a diagram showing an example of a subframe configuration and monitoring of control channels.

FIG. 13 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using one uplink-downlink configuration and one EPDCCH subframe configuration. For example, the uplink-downlink configuration is configured through the SIB as a configuration specific to the base station device 3 (cell). The EPDCCH subframe configuration is configured through RRC signaling as a configuration specific to the mobile station devices 1.

The mobile station devices 1 perform the monitoring of the control channels based on the subframe configuration from the base station device 3. An example of the monitoring of the control channels switches monitoring of the PDCCH-SS or monitoring of the EPDCCH-SS for each subframe.

In a subframe where the uplink-downlink configuration is D or S, the monitoring of the control channels is performed. Of the subframes where the monitoring of the control channels is performed, in a subframe where the EPDCCH subframe configuration is 1, the monitoring of the EPDCCH-SS is performed. Of the subframes where the monitoring of the control channels is performed, in a subframe where the EPDCCH subframe configuration is 0, the monitoring of the PDCCH-SS is performed. In a subframe where the uplink-downlink configuration is U, the monitoring of the control channels is not performed.

The monitoring of the EPDCCH-SS is performed in a subframe where the uplink-downlink configuration is D or S and the EPDCCH subframe configuration is 1. The monitoring of the PDCCH-SS is performed in a subframe where the uplink-downlink configuration is D or S and the EPDCCH subframe configuration is 0. The monitoring of the control channels is not performed in a subframe where the uplink-downlink configuration is U and the EPDCCH subframe configuration is 0.

The mobile station devices 1 determine or switch the processing or the configurations of the control channels to be monitored according to whether the monitoring in the subframe is the monitoring of the PDCCH-SS or the monitoring of the EPDCCH-SS.

It can be assumed that, in the mobile station devices 1, the EPDCCH subframe configuration does not become 1 in a subframe where the uplink-downlink configuration is U. The monitoring of the control channels cannot be performed in a subframe where the uplink-downlink configuration is U, without depending on the EPDCCH subframe configuration. Even if the uplink-downlink configuration for a certain subframe is U, when the EPDCCH subframe configuration for the subframe is 1, the monitoring of the EPDCCH-SS may be performed. Even if the uplink-downlink configuration for a certain subframe is U, when the EPDCCH subframe configuration for the configuration is 0, the monitoring of the PDCCH-SS may be performed.

FIG. 14 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH, the EPDCCH, or RRC signaling as a configuration specific to a group of a plurality of mobile station devices 1. The uplink-downlink configuration 2 may be configured through the PDCCH, the EPDCCH, or RRC signaling as a configuration specific to the mobile station devices 1. The uplink-downlink configuration 2 may be configured through the PDCCH or RRC signaling as a configuration specific to the plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations for the control channels to be monitored are independent.

In a subframe where at least one of the uplink-downlink configuration 1 and the uplink-downlink configuration 2 is D or S, the monitoring of the control channels is performed. In the subframes where the monitoring of the control channels is performed, the monitoring of the EPDCCH-SS (configuration 1) and the monitoring of the EPDCCH-SS (configuration 2) are determined based on the uplink-downlink configuration 1 and the uplink-downlink configuration 2. Within the subframes where the monitoring of the control channels is performed, the monitoring of the EPDCCH-SS (configuration 1) is performed in a subframe where both the uplink-downlink configuration 1 and the uplink-downlink configuration 2 are D or S. Within the subframes where the monitoring of the control channels is performed, the monitoring of the EPDCCH-SS (configuration 1) is performed in a subframe where either of the uplink-downlink configuration 1 and the uplink-downlink configuration 2 is D and the other one of the uplink-downlink configuration 1 and the uplink-downlink configuration 2 is S. Within the subframes where the monitoring of the control channels is performed, the monitoring of the EPDCCH-SS (configuration 2) is performed in a subframe where either of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U.

The monitoring of the EPDCCH-SS (configuration 1) is performed in a subframe where both the uplink-downlink configuration 1 and the uplink-downlink configuration 2 are D or S. The monitoring of the EPDCCH-SS (configuration 1) is performed in a subframe where one of the uplink-downlink configuration 1 and the uplink-downlink configuration 2 is D and the other one of the uplink-downlink configuration 1 and the uplink-downlink configuration 2 is S. The monitoring of the EPDCCH-SS (configuration 2) is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U. The monitoring of the PDCCH-SS is not performed in all subframes.

It can be assumed that, in the mobile station devices 1, the uplink-downlink configuration 2 is not U in a subframe where the uplink-downlink configuration 1 is D. In a subframe where the uplink-downlink configuration 1 is D and the uplink-downlink configuration 2 is U, the monitoring of the PDCCH-SS, the monitoring of the EPDCCH-SS (configuration 1), or the monitoring of the EPDCCH-SS (configuration 2) may be performed. In a subframe where the uplink-downlink configuration 1 or the uplink-downlink configuration 2 is S and the uplink-downlink configuration 1 or the uplink-downlink configuration 2 is D or U, the monitoring of the PDCCH-SS, the monitoring of the EPD- CCH-SS (configuration 1), or the monitoring of the EPDCCH-SS (configuration 2) may be performed.

FIG. 15 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and one EPDCCH subframe configuration. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The EPDCCH subframe configuration is configured through RRC signaling as a configuration specific to the mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

In a subframe where at least one of the uplink-downlink configuration 1 and the uplink-downlink configuration 2 is D or S, the monitoring of the control channels is performed. Of the subframes where the monitoring of the control channels is performed, in a subframe where the EPDCCH subframe configuration is 0, the monitoring of the PDCCH-SS is performed. Of the subframes where the monitoring of the control channels is performed, in a subframe where the EPDCCH subframe configuration is 1, the monitoring of the EPDCCH-SS is performed. In the subframe where the monitoring of the EPDCCH-SS is performed, the monitoring of the EPDCCH-SS (configuration 1) or the monitoring of the EPDCCH-SS (configuration 2) is determined based on the uplink-downlink configuration 1 and the uplink-downlink configuration 2. Of the subframes where the monitoring of the EPDCCH-SS is performed, in a subframe where both the uplink-downlink configuration 1 and the uplink-downlink configuration 2 are D or S, the monitoring of the EPDCCH-SS (configuration 1) is performed. Of the subframes where the monitoring of the EPDCCH-SS is performed, in a subframe where either of the uplink-downlink configuration 1 and the uplink-downlink configuration 2 is D and the other one of the uplink-downlink configuration 1 and the uplink-downlink configuration 2 is S, the monitoring of the EPDCCH-SS (configuration 1) is performed. Of the subframes where the monitoring of the EPDCCH-SS is performed, in a subframe where either of the uplink-downlink configuration 1 and the uplink-downlink configuration 2 is U and the other one of the uplink-downlink configuration 1 and the uplink-downlink configuration 2 is D or S, the monitoring of the EPDCCH-SS (configuration 2) is performed. In a subframe where both the uplink-downlink configuration 1 and the uplink-downlink configuration 2 are U, the monitoring of the control channels is not performed.

The monitoring of the PDCCH-SS is performed in a subframe where at least one of the uplink-downlink configuration 1 and the uplink-downlink configuration 2 is D or S and the EPDCCH subframe configuration is 0. The monitoring of the EPDCCH-SS (configuration 1) is performed in a subframe where both the uplink-downlink configuration 1 and the uplink-downlink configuration 2 are D or S and the EPDCCH subframe configuration is 1. The monitoring of the EPDCCH-SS (configuration 1) is performed in a subframe where either of the uplink-downlink configuration 1 and the uplink-downlink configuration 2 is D, the other one of the uplink-downlink configuration 1 and the uplink-downlink configuration 2 is S, and the EPDCCH subframe configuration is 1. The monitoring of the EPDCCH-SS (configuration 2) is performed in a subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1. The monitoring of the control channels is not performed in a subframe where both the uplink-downlink configuration 1 and the uplink-downlink configuration 2 are U.

It may be assumed that, in the mobile station devices 1, the uplink-downlink configuration 2 does not become U in a subframe where the uplink-downlink configuration 1 is D. In a subframe where the uplink-downlink configuration 1 is D and the uplink-downlink configuration 2 is U, the monitoring of the PDCCH-SS, the monitoring of the EPDCCH-SS (configuration 1), or the monitoring of the EPDCCH-SS (configuration 2) may be performed. In a subframe where the uplink-downlink configuration 1 or the uplink-downlink configuration 2 is S and the uplink-downlink configuration 1 or the uplink-downlink configuration 2 is D or U, the monitoring of the PDCCH-SS, the monitoring of the EPDCCH-SS (configuration 1), or the monitoring of the EPDCCH-SS (configuration 2) may be performed.

It may be assumed that, in the mobile station devices 1, the EPDCCH subframe configuration does not become 1 in a subframe where the uplink-downlink configuration 1 and/or the uplink-downlink configuration 2 are U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS may be performed. Even if the uplink-downlink configuration 1 and/or the uplink-downlink configuration 2 for a certain subframe are U, when the EPDCCH subframe configuration for the subframe is 0, the monitoring of the PDCCH-SS may be performed.

The monitoring of the PDCCH-SS may further switch the processing or the configurations of the control channels to be monitored based on the uplink-downlink configuration 1 and the uplink-downlink configuration 2. That is, in a subframe where the monitoring of the PDCCH-SS is performed, the monitoring of the EPDCCH-SS (configuration 1) and the monitoring of the EPDCCH-SS (configuration 2) may be determined based on the uplink-downlink configuration 1 and the uplink-downlink configuration 2. For example, of the subframes where the monitoring of the PDCCH-SS is performed, in a subframe where both the uplink-downlink configuration 1 and the uplink-downlink configuration 2 are D or S, the monitoring of the EPDCCH-SS (configuration 1) may be performed. Of the subframes where the monitoring of the PDCCH-SS is performed, in a subframe where either of the uplink-downlink configuration 1 and the uplink-downlink configuration 2 is U, the monitoring of the EPDCCH-SS (configuration 2) may be performed.

FIG. 16 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channels in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using one uplink-downlink configuration and two EPDCCH subframe configurations. For example, the uplink-downlink configuration is configured through the SIB as a configuration specific to the base station device 3 (cell). An EPDCCH subframe configuration 1 and an EPDCCH subframe configuration 2 are configured through RRC signaling as a configuration specific to the mobile station devices 1. The EPDCCH subframe configuration 1 and the EPDCCH subframe configuration 2 may be configured as a configuration specific to the base station device 3 (cell).

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

In a subframe where the uplink-downlink configuration is D or S and a subframe where at least one of the EPDCCH subframe configuration 1 and the EPDCCH subframe configuration 2 is 1, the monitoring of the control channels is performed. Of the subframes where the monitoring of the control channels is performed, in a subframe where both the EPDCCH subframe configuration 1 and the EPDCCH subframe configuration 2 are 0, the monitoring of the PDCCH-SS is performed. Of the subframes where the monitoring of the control channels is performed, in a subframe where the EPDCCH subframe configuration 1 is 1, the monitoring of the EPDCCH-SS (configuration 1) is performed. Of the subframes where the monitoring of the control channels is performed, in a subframe where the EPDCCH subframe configuration 2 is 1, the monitoring of the EPDCCH-SS (configuration 2) is performed. In a subframe where the uplink-downlink configuration is U and the EPDCCH subframe configuration 1 and the EPDCCH subframe configuration 2 are 0, the monitoring of the control channels is not performed.

The monitoring of the PDCCH-SS is performed in a subframe where the uplink-downlink configuration is D or S and both the EPDCCH subframe configuration 1 and the EPDCCH subframe configuration 2 are 0. The monitoring of the EPDCCH-SS (configuration 1) is performed in a subframe where the EPDCCH subframe configuration 1 is 1, without depending on the uplink-downlink configuration. The monitoring of the EPDCCH-SS (configuration 2) is performed in a subframe where the EPDCCH subframe configuration 2 is 1, without depending on the uplink-downlink configuration. The monitoring of the control channels is not performed in a subframe where the uplink-downlink configuration is U and the EPDCCH subframe configuration 1 and the EPDCCH subframe configuration 2 are 0.

It may be assumed that, in the mobile station devices 1, EPDCCH subframe configuration 1 and/or the EPDCCH subframe configuration 2 do not become 1 in a subframe where the uplink-downlink configuration is U. In a subframe where the uplink-downlink configuration is U, the monitoring of the control channels cannot be performed, without depending on the EPDCCH subframe configuration 1 and/or the EPDCCH subframe configuration 2. In a subframe where the uplink-downlink configuration is U and the EPDCCH subframe configuration 1 and/or the EPDCCH subframe configuration 2 are 0, the monitoring of the PDCCH-SS, the monitoring of the EPDCCH-SS (configuration 1), or the monitoring of the EPDCCH-SS (configuration 2) may be performed.

In a subframe where both the EPDCCH subframe configuration 1 and the EPDCCH subframe configuration 2 are 1, the monitoring of the EPDCCH-SS (configuration 1) and the monitoring of the EPDCCH-SS (configuration 2) may be performed. It may be assumed that, in the mobile station devices 1, both the EPDCCH subframe configuration 1 and the EPDCCH subframe configuration 2 do not become 1. When both the EPDCCH subframe configuration 1 and the EPDCCH subframe configuration 2 are 1, it may be assumed that either the EPDCCH subframe configuration 1 or the EPDCCH subframe configuration 2 is 1. That is, in a subframe where both the EPDCCH subframe configuration 1 and the EPDCCH subframe configuration 2 are 1 and the monitoring of the control channels is performed, the monitoring of the EPDCCH-SS (configuration 1) or the monitoring of the EPDCCH-SS (configuration 2) may be performed. When both the EPDCCH subframe configuration 1 and the EPDCCH subframe configuration 2 are 1, it may be assumed that both the EPDCCH subframe configuration 1 and the EPDCCH subframe configuration 2 are 0. That is, in a subframe where both the EPDCCH subframe configuration 1 and the EPDCCH subframe configuration 2 are 1 and the monitoring of the control channels is performed, the monitoring of the PDCCH-SS may be performed. In a subframe where both the EPDCCH subframe configuration 1 and the EPDCCH subframe configuration 2 are 1, the monitoring of the PDCCH-SS may not be performed.

FIG. 17 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channels in the subframe. "-"

indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. In this example, the monitoring of the EPDCCH is not configured. An example of the monitoring of the control channels switches first monitoring of the PDCCH-SS (monitoring of the PDCCH-SS (configuration 1)), or second monitoring of the PDCCH-SS (monitoring of the PDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

In a subframe where at least one of the uplink-downlink configuration 1 and the uplink-downlink configuration 2 is D or S, the monitoring of the control channels is performed. In the subframes where the monitoring of the control channels is performed, the monitoring of the PDCCH-SS (configuration 1) or the monitoring of the PDCCH-SS (configuration 2) is determined based on the uplink-downlink configuration 1 and the uplink-downlink configuration 2. Of the subframes where the monitoring of the control channels is performed, in a subframe where both the uplink-downlink configuration 1 and the uplink-downlink configuration 2 are D or S, the monitoring of the PDCCH-SS (configuration 1) is performed. Of the subframes where the monitoring of the control channels is performed, in a subframe where either of the uplink-downlink configuration 1 and the uplink-downlink configuration 2 is D and the other one of the uplink-downlink configuration 1 and the uplink-downlink configuration 2 is S, the monitoring of the PDCCH-SS (configuration 1) is performed. Of the subframes where the monitoring of the control channels is performed, in a subframe where either of the uplink-downlink configuration 1 and the uplink-downlink configuration 2 is U and the other one of the uplink-downlink configuration 1 and the uplink-downlink configuration 2 is D or S, the monitoring of the PDCCH-SS (configuration 2) is performed. In a subframe where both the uplink-downlink configuration 1 and the uplink-downlink configuration 2 are U, the monitoring of the control channels is not performed.

The monitoring of the PDCCH-SS (configuration 1) is performed in a subframe where both the uplink-downlink configuration 1 and the uplink-downlink configuration 2 are D or S. The monitoring of the PDCCH-SS (configuration 1) is performed in a subframe where one of the uplink-downlink configuration 1 and the uplink-downlink configuration 2 is D and the other one of the uplink-downlink configuration 1 and the uplink-downlink configuration 2 is S. The monitoring of the PDCCH-SS (configuration 2) is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U. The monitoring of the EPDCCH-SS is not performed in all subframes.

It can be assumed that, in the mobile station devices 1, the uplink-downlink configuration 2 does not become U in a subframe where the uplink-downlink configuration 1 is D. In a subframe where the uplink-downlink configuration 1 is D and the uplink-downlink configuration 2 is U, the monitoring of the PDCCH-SS (configuration 1) or the monitoring of the PDCCH-SS (configuration 2) may be performed. In a subframe where the uplink-downlink configuration 1 or the uplink-downlink configuration 2 is S and the uplink-downlink configuration 1 or the uplink-downlink configuration 2 is D or U, the monitoring of the PDCCH-SS (configuration 1) or the monitoring of the PDCCH-SS (configuration 2) may be performed.

Figure 18:
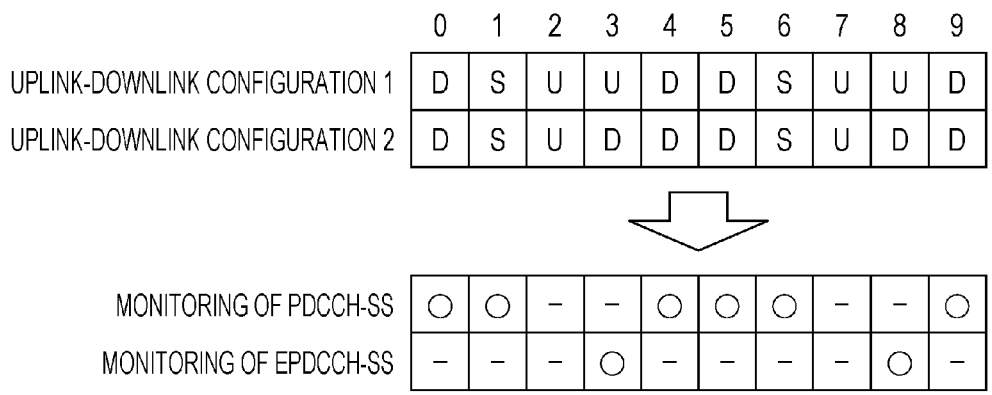
FIG. 18 is a diagram showing an example of a subframe configuration and monitoring of control channels.

FIG. 18 is a diagram showing an example of a subframe configuration and monitoring of control channels. "O" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS or monitoring of the EPDCCH-SS for each subframe.

In a subframe where at least one of the uplink-downlink configuration 1 and the uplink-downlink configuration 2 is D or S, the monitoring of the control channels is performed. In the subframes where the monitoring of the control channels is performed, the monitoring of the PDCCH-SS or the monitoring of the EPDCCH-SS is determined based on the uplink-downlink configuration 1 and the uplink-downlink configuration 2. Of the subframes where the monitoring of the control channels is performed, in a subframe where both the uplink-downlink configuration 1 and the uplink-downlink configuration 2 are D or S, the monitoring of the PDCCH-SS is performed. Of the subframes where the monitoring of the control channels is performed, in a subframe where either of the uplink-downlink configuration 1 and the uplink-downlink configuration 2 is D and the other one of the uplink-downlink configuration 1 and the uplink-downlink configuration 2 is S, the monitoring of the PDCCH-SS is performed. Of the subframes where the monitoring of the control channels is performed, in a subframe where either of the uplink-downlink configuration 1 and the uplink-downlink configuration 2 is U and the other one of the uplink-downlink configuration 1 and the uplink-downlink configuration 2 is D or S, the monitoring of the EPDCCH-SS is performed. In a subframe where both the uplink-downlink configuration 1 and the uplink-downlink configuration 2 are U, the monitoring of the control channels is not performed.

The monitoring of the PDCCH-SS is performed in a subframe where both the uplink-downlink configuration 1 and the uplink-downlink configuration 2 are D or S. The monitoring of the PDCCH-SS is performed in a subframe where one of the uplink-downlink configuration 1 and the uplink-downlink configuration 2 is D and the other one of the uplink-downlink configuration 1 and the uplink-downlink configuration 2 is S. The monitoring of the EPDCCH-SS is performed in a subframe where one of the uplink-downlink configuration 1 and the uplink-downlink configuration 2 is U and the other one of the uplink-downlink configuration 1 and the uplink-downlink configuration 2 is D or S. The monitoring of the control channels is not performed in a subframe where both the uplink-downlink configuration 1 and the uplink-downlink configuration 2 are U.

It can be assumed that, in the mobile station devices 1, the uplink-downlink configuration 2 does not become U in a subframe where the uplink-downlink configuration 1 is D. In a subframe where the uplink-downlink configuration 1 is D and the uplink-downlink configuration 2 is U, the monitoring of the PDCCH-SS or the monitoring of the EPDCCH-SS may be performed. In a subframe where the uplink-downlink configuration 1 or the uplink-downlink configuration 2 is S and the uplink-downlink configuration 1 or the uplink-downlink configuration 2 is D or U, the monitoring of the PDCCH-SS or the monitoring of the EPDCCH-SS may be performed.

Figure 19:
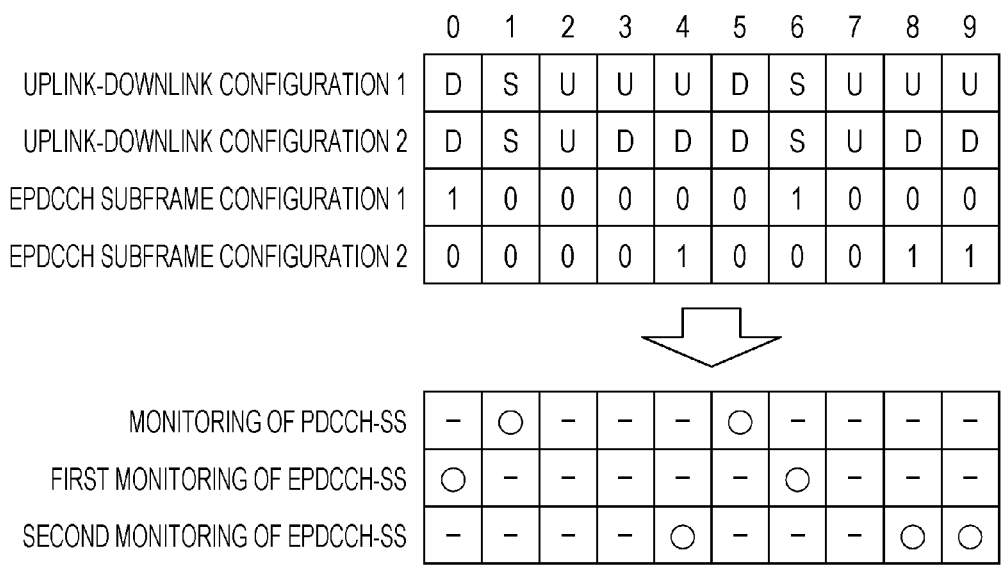
FIG. 19 is a diagram showing an example of a subframe configuration and monitoring of control channels.

FIG. 19 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and two EPDCCH subframe configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. An EPDCCH subframe configuration 1 and/or an EPDCCH subframe configuration 2 are configured through RRC signaling as a configuration specific to the mobile station devices 1.

The EPDCCH subframe configuration 1 and/or the EPDCCH subframe configuration 2 may be configured as a configuration specific to the base station device 3 (cell). The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels switches monitoring of the PDCCH-SS, first monitoring of the EPDCCH-SS (monitoring of the EPDCCH-SS (configuration 1)), or second monitoring of the EPDCCH-SS (monitoring of the EPDCCH-SS (configuration 2)) for each subframe. The configurations represent the processing or the configurations of the control channels to be monitored. That is, the configuration 1 and the configuration 2 represent that the processing or the configurations of the control channels to be monitored are independent.

In a subframe where at least one of the uplink-downlink configuration 1 and the uplink-downlink configuration 2 is D or S and a subframe where at least one of the EPDCCH subframe configuration 1 and the EPDCCH subframe configuration 2 is 1, the monitoring of the control channels is performed. In a subframe where at least one of the uplink-downlink configuration 1 and the uplink-downlink configuration 2 is D or S and both the EPDCCH subframe configuration 1 and the EPDCCH subframe configuration 2 are 0, the monitoring of the PDCCH-SS is performed. In a subframe where the EPDCCH subframe configuration 1 is 1, the monitoring of the EPDCCH-SS (configuration 1) is performed. In a subframe where the EPDCCH subframe configuration 2 is 1, the monitoring of the EPDCCH-SS (configuration 2) is performed. In a subframe where both the uplink-downlink configuration 1 and the uplink-downlink configuration 2 are U and both the EPDCCH subframe configuration 1 and the EPDCCH subframe configuration 2 are 0, the monitoring of the control channels is not performed.

The monitoring of the PDCCH-SS is performed in a subframe where at least one of the uplink-downlink configuration 1 and the uplink-downlink configuration 2 is D or S and both the EPDCCH subframe configuration 1 and the EPDCCH subframe configuration 2 are 0. The monitoring of the EPDCCH-SS (configuration 1) is performed in a subframe where the EPDCCH subframe configuration 1 is 1, without depending on the uplink-downlink configuration. The monitoring of the EPDCCH-SS (configuration 2) is performed in a subframe where the EPDCCH subframe configuration 2 is 1, without depending on the uplink-downlink configuration. The monitoring of the control channels is not performed in a subframe where both the uplink-downlink configuration 1 and the uplink-downlink configuration 2 are U and the EPDCCH subframe configuration 1 and the EPDCCH subframe configuration 2 are 0.

It may be assumed that, in the mobile station devices 1, the EPDCCH subframe configuration 1 and/or the EPDCCH subframe configuration 2 do not become 1 in a subframe where both the uplink-downlink configuration 1 and the uplink-downlink configuration 2 are U. In a subframe where both the uplink-downlink configuration 1 and the uplink-downlink configuration 2 are U, the monitoring of the control channels cannot be performed, without depending on the EPDCCH subframe configuration 1 and/or the EPDCCH subframe configuration 2.

In a subframe where both the EPDCCH subframe configuration 1 and the EPDCCH subframe configuration 2 are 1, the monitoring of the EPDCCH-SS (configuration 1) and the monitoring of the EPDCCH-SS (configuration 2) may be performed. It may be assumed that, in the mobile station devices 1, both the EPDCCH subframe configuration 1 and the EPDCCH subframe configuration 2 do not become 1. When both the EPDCCH subframe configuration 1 and the EPDCCH subframe configuration 2 are 1, it may be assumed that either the EPDCCH subframe configuration 1 or the EPDCCH subframe configuration 2 is 1. That is, in a subframe where both the EPDCCH subframe configuration 1 and the EPDCCH subframe configuration 2 are 1 and the monitoring of the control channels is performed, the monitoring of the EPDCCH-SS (configuration 1) or the monitoring of the EPDCCH-SS (configuration 2) may be performed. When both the EPDCCH subframe configuration 1 and the EPDCCH subframe configuration 2 are 1, it may be assumed that both the EPDCCH subframe configuration 1 and the EPDCCH subframe configuration 2 are 0. That is, in a subframe where both the EPDCCH subframe configuration 1 and the EPDCCH subframe configuration 2 are 1 and the monitoring of the control channels is performed, the monitoring of the PDCCH-SS may be performed. In a subframe where both the EPDCCH subframe configuration 1 and the EPDCCH subframe configuration 2 are 1, the monitoring of the PDCCH-SS may not be performed.

The example of the subframe configuration and the monitoring of the control channels described above can be applied to monitoring of the PDCCH for one or more SSs and/or monitoring of the EPDCCH for one or more SSs. That is, when a plurality of SSs are configured for the PDCCH and/or the EPDCCH, each SS can configure or define the monitoring of the control channels independently.

For example, when one SS is configured for one EPDCCH set, a subframe configuration is performed independently for each EPDCCH set. An SS corresponding to each EPDCCH set configures or defines the monitoring of the control channels based on each subframe configuration independently. For example, when a plurality of SSs are configured for one EPDCCH set, a subframe configuration is performed for the EPDCCH set. Each SS configures or defines the monitoring of the control channels based on the subframe configuration independently.

Hereinafter, an example of a subframe configuration and monitoring of control channels when a plurality of SSs are configured for the PDCCH and/or the EPDCCH will be described. In the following description, although a case where the number of SSs is two will be described, the same applies to a case where the number of SSs is equal to or greater than three. A SS1 is referred to as a first SS, and a SS2 is referred to as a second SS. For example, the type of the control channel to be monitored, the DCI format, and/or the RNTI may be different between the SSs.

The SS1 can correspond to the USS, and the SS2 can correspond to the CSS. Furthermore, the SS1 can correspond to the first USS, and the SS2 can correspond to the second USS.

FIG. 20 is a diagram showing an example of a subframe configuration and monitoring of control channels. "○" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and one EPDCCH subframe configuration. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. The EPDCCH subframe configuration is configured through RRC signaling as a configuration specific to the mobile station devices 1. The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. As an example of the monitoring of the control channels, monitoring of a PDCCH-SS1, monitoring of an EPDCCH-SS1, monitoring of a PDCCH-SS2, or monitoring of an EPDCCH-SS2 for each subframe is determined.

First, a case where the monitoring of the PDCCH-SS1 and the EPDCCH-SS1 is configured will be described. The monitoring of the PDCCH-SS1 and the EPDCCH-SS1 is switched based on the uplink-downlink configuration 1, the uplink-downlink configuration 2, and the EPDCCH subframe configuration. In a subframe where at least one of the uplink-downlink configuration 1 and the uplink-downlink configuration 2 is D or S and the EPDCCH subframe configuration is 0, the monitoring of the PDCCH-SS1 is performed. In a subframe where the EPDCCH subframe configuration is 1, the monitoring of the EPDCCH-SS1 is performed. In a subframe where both the uplink-downlink configuration 1 and the uplink-downlink configuration 2 are U and the EPDCCH subframe configuration is 0, the monitoring of the PDCCH-SS1 and the EPDCCH-SS1 is not performed.

Next, a case where the monitoring of the PDCCH-SS2 of the EPDCCH-SS2 is configured will be described. The monitoring of the PDCCH-SS2 and the EPDCCH-SS2 is switched based on the uplink-downlink configuration 1 and the uplink-downlink configuration 2. That is, even when the EPDCCH subframe configuration is configured, in the switching of the monitoring of the PDCCH-SS2 and the EPDCCH-SS2, the EPDCCH subframe configuration is not used. In a subframe where both the uplink-downlink configuration 1 and the uplink-downlink configuration 2 are D or S, the monitoring of the PDCCH-SS2 is performed. In a subframe where one of the uplink-downlink configuration 1 and the uplink-downlink configuration 2 is D and the other one of the uplink-downlink configuration 1 and the uplink-downlink configuration 2 is S, the monitoring of the PDCCH-SS2 is performed. In a subframe where one of the uplink-downlink configuration 1 and the uplink-downlink configuration 2 is D or S and the other one of the uplink-downlink configuration 1 and the uplink-downlink configuration 2 is U, the monitoring of the EPDCCH-SS2 is performed. In a subframe where both the uplink-downlink configuration 1 and the uplink-downlink configuration 2 are U, the PDCCH-SS2 and the EPDCCH-SS2 is not performed.

It may be assumed that, in the mobile station devices 1, the uplink-downlink configuration 2 does not become U in a subframe where the uplink-downlink configuration 1 is D. It may be assumed that, in the mobile station devices 1, the EPDCCH subframe configuration does not become 1 in a subframe where the uplink-downlink configuration 1 and/or the uplink-downlink configuration 2 are U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS1 and/or the EPDCCH-SS2 may be performed. Even if the uplink-downlink configuration 1 and/or the uplink-downlink configuration 2 for a certain subframe are U, when the EPDCCH subframe configuration for the configuration is 0, the monitoring of the PDCCH-SS1 and/or the PDCCH-SS2 may be performed.

FIG. 21 is a diagram showing an example of a subframe configuration and monitoring of control channels. In an example of FIG. 21, an independent configuration is further configured or defined for the monitoring of the EPDCCH-SS1 in the example described in FIG. 20. That is, in the monitoring of the EPDCCH-SS1, the processing or the configurations of the control channels to be monitored are further switched. Hereinafter, a difference from the description in FIG. 20 will be described.

The monitoring of the EPDCCH-SS1 is switched based on the uplink-downlink configuration 1, the uplink-downlink configuration 2, and the EPDCCH subframe configuration. In a subframe where one of the uplink-downlink configuration 1 and the uplink-downlink configuration 2 is D or S, the other one of the uplink-downlink configuration 1 and the uplink-downlink configuration 2 is D or S, and the EPDCCH subframe configuration is 1, the first monitoring of the EPDCCH-SS (monitoring of the EPDCCH-SS (configuration 1)) is performed. In a subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1, the second monitoring of the EPDCCH-SS (monitoring of the EPDCCH-SS (configuration 2)) is performed. That is, in a subframe where the EPDCCH subframe configuration is 1, the monitoring of the EPDCCH-SS1 switches the configuration 1 and the configuration 2 based on the uplink-downlink configuration 1 and the uplink-downlink configuration 2.

In the monitoring of the PDCCH-SS1, the monitoring of the PDCCH-SS2, and/or the monitoring of the EPDCCH-SS2, the processing or the configurations of the control channels to be monitored may be further switched.

FIG. 22 is a diagram showing an example of a subframe configuration and monitoring of control channels. "◯" indicated in a certain subframe means a search space where the base station device 3 can map the control channels to the mobile station devices 1 in the subframe and means a search space where the mobile station devices 1 perform the monitoring of the control channel in the subframe. "-" indicated in a certain subframe means a search space where the base station device 3 does not map the control channels to the mobile station devices 1 in the subframe and means a search space where the mobile station devices 1 do not perform the monitoring of the control channels in the subframe.

An example of the subframe configuration is performed using two uplink-downlink configurations and two EPD-CCH subframe configurations. For example, an uplink-downlink configuration 1 is configured through the SIB as a configuration specific to the base station device 3 (cell). An uplink-downlink configuration 2 is configured through the PDCCH or RRC signaling as a configuration specific to a group of a plurality of mobile station devices 1. An EPDCCH subframe configuration 1 and/or an EPDCCH subframe configuration 2 are configured through RRC signaling as a configuration specific to the mobile station devices 1. The EPDCCH subframe configuration 1 and/or the EPDCCH subframe configuration 2 may be configured as a configuration specific to the base station device 3 (cell). The uplink-downlink configuration 2 may be configured through RRC signaling as a configuration specific to the mobile station devices 1. The uplink-downlink configuration 1 may be an uplink reference UL-DL configuration. The uplink-downlink configuration 2 may be a downlink reference UL-DL configuration.

The mobile station devices 1 perform the monitoring of the control channels based on the subframe configuration from the base station device 3. An example of the monitoring of the control channels determines the monitoring of the PDCCH-SS1, the monitoring of the EPDCCH-SS1, the monitoring of the PDCCH-SS2, or the monitoring of the EPDCCH-SS2 for each subframe. The EPDCCH subframe configuration 1 is used for switching the monitoring of the PDCCH-SS1 and the EPDCCH-SS1. The EPDCCH subframe configuration 2 is used for switching the monitoring of the PDCCH-SS2 and the EPDCCH-SS2.

First, the monitoring of the PDCCH-SS1 and the EPDCCH-SS1 will be described. The monitoring of the PDCCH-SS1 and the EPDCCH-SS1 is switched based on the uplink-downlink configuration 1, the uplink-downlink configuration 2, and the EPDCCH subframe configuration 1. In a subframe where at least one of the uplink-downlink configuration 1 and the uplink-downlink configuration 2 is D or S and the EPDCCH subframe configuration 1 is 0, the monitoring of the PDCCH-SS 1 is performed. In a subframe where the EPDCCH subframe configuration 1 is 1, the monitoring of the EPDCCH-SS1 is performed. In a subframe where both the uplink-downlink configuration 1 and the uplink-downlink configuration 2 are U and the EPDCCH subframe configuration 1 is 0, the monitoring of the PDCCH-SS1 and the EPDCCH-SS1 is not performed.

Next, the monitoring of the PDCCH-SS2 and the EPDCCH-SS2 will be described. The monitoring of the PDCCH-SS2 and the EPDCCH-SS2 is switched based on the uplink-downlink configuration 1, the uplink-downlink configuration 2, and the EPDCCH subframe configuration 2. In a subframe where at least one of the uplink-downlink configuration 1 and the uplink-downlink configuration 2 is D or S and the EPDCCH subframe configuration 2 is 0, the monitoring of the PDCCH-SS2 is performed. In a subframe where the EPDCCH subframe configuration 2 is 1, the monitoring of the EPDCCH-SS2 is performed. In a subframe where both the uplink-downlink configuration 1 and the uplink-downlink configuration 2 are U and the EPDCCH subframe configuration 2 is 0, the monitoring of the PDCCH-SS2 and the EPDCCH-SS2 is not performed.

It may be assumed that, in the mobile station devices 1, the uplink-downlink configuration 2 does not become U in a subframe where the uplink-downlink configuration 1 is D. It may be assumed that, in the mobile station device 1, the EPDCCH subframe configuration does not become 1 in a subframe where the uplink-downlink configuration 1 and/or the uplink-downlink configuration 2 are/is U. In a subframe where the uplink-downlink configuration 1 and/or the uplink-downlink configuration 2 are U, the monitoring of the control channels cannot be performed, without depending on the EPDCCH subframe configuration. Even if the uplink-downlink configuration 1 and the uplink-downlink configuration 2 for a certain subframe are U, when the EPDCCH subframe configuration for the subframe is 1, the monitoring of the EPDCCH-SS1 and/or the EPDCCH-SS2 may be performed. Even if the uplink-downlink configuration 1 and/or the uplink-downlink configuration 2 for a certain subframe are/is U, when the EPDCCH subframe configuration for the subframe is 0, the monitoring of the PDCCH-SS1 and/or the PDCCH-SS2 may be performed.

In a subframe where both the EPDCCH subframe configuration 1 and the EPDCCH subframe configuration 2 are 1, the monitoring of the EPDCCH-SS1 and the monitoring of the EPDCCH-SS2 may be performed. It may be assumed that, in the mobile station devices 1, both the EPDCCH subframe configuration 1 and the EPDCCH subframe configuration 2 do not become 1. When both the EPDCCH subframe configuration 1 and the EPDCCH subframe configuration 2 are 1, it may be assumed that either the EPDCCH subframe configuration 1 or the EPDCCH subframe configuration 2 is 1. That is, in a subframe where both the EPDCCH subframe configuration 1 and the EPDCCH subframe configuration 2 are 1 and the monitoring of the control channels is performed, the monitoring of the EPDCCH-SS1 or the monitoring of the EPDCCH-SS2 may be performed. When both the EPDCCH subframe configuration 1 and the EPDCCH subframe configuration 2 are 1, it may be assumed that both the EPDCCH subframe configuration 1 and the EPDCCH subframe configuration 2 are 0. That is, in a subframe where both the EPDCCH subframe configuration 1 and the EPDCCH subframe configuration 2 are 1 and the monitoring of the control channels is performed, the monitoring of the PDCCH-SS1 and/or the PDCCH-SS2 may be performed. In a subframe where both the EPDCCH subframe configuration 1 and the EPDCCH subframe configuration 2 are 1, the monitoring of the PDCCH-SS1 and/or the PDCCH-SS2 may not be performed.

FIG. 23 is a diagram showing an example of a subframe configuration and monitoring of control channels. In the example of FIG. 23, an independent configuration is further configured or defined for the monitoring of the EPDCCH-SS1 in the example described in FIG. 22. That is, in the monitoring of the EPDCCH-SS1, the processing or the configurations of the control channels to be monitored are further switched. Hereinafter, a difference from the description in FIG. 22 will be described.

The monitoring of the EPDCCH-SS1 is switched based on the uplink-downlink configuration 1, the uplink-downlink configuration 2, and the EPDCCH subframe configuration 1. In a subframe where one of the uplink-downlink configuration 1 and the uplink-downlink configuration 2 is D or S, the other one of the uplink-downlink configuration 1 and the uplink-downlink configuration 2 is D or S, and the EPDCCH subframe configuration 1 is 1, the first monitoring of the EPDCCH-SS (monitoring of the EPDCCH-SS (configuration 1)) is performed. In a subframe where one of the uplink-downlink configuration 1 and the uplink-downlink configuration 2 is D or S, the other one of the uplink-downlink configuration 1 and the uplink-downlink configuration 2 is U, and the EPDCCH subframe configuration is 1, the second monitoring of the EPDCCH-SS (monitoring of the EPDCCH-SS (configuration 2)) is performed. That is, in a subframe where the EPDCCH subframe configuration is 1, the monitoring of the EPDCCH-SS1 switches the configuration 1 and the configuration 2 based on the uplink-downlink configuration 1 and the uplink-downlink configuration 2.

In the monitoring of the PDCCH-SS1, the monitoring of the PDCCH-SS2, and/or the monitoring of the EPDCCH-SS2, the processing or the configurations of the control channels to be monitored may be further switched.

A subframe where one of the uplink-downlink configuration 1 and the uplink-downlink configuration 2 is D or S and the other one of the uplink-downlink configuration 1 and the uplink-downlink configuration 2 is U is referred to as a flexible subframe. For example, the flexible subframe is a subframe where an uplink subframe or a downlink subframe can be dynamically switched. That is, the base station device 3 can dynamically determine the flexible subframe as an uplink subframe or a downlink subframe in consideration of a load of communication. For this reason, the base station device 3 can implement efficiency communication. For example, when the monitoring of the control channels is performed in the flexible subframe, the mobile station devices 1 may recognize the subframe as a downlink subframe. When the transmission of an uplink channel and/or an uplink signal in the flexible subframe is instructed, the mobile station devices 1 may recognize the subframe as an uplink subframe. When the flexible subframe is recognized as an uplink subframe, the mobile station devices 1 can configure or define such that the monitoring of the control channels is not performed in the subframe. A subframe where one of the uplink-downlink configuration 1 and the uplink-downlink configuration 2 is D or S and the other one of the uplink-downlink configuration 1 and the uplink-downlink configuration 2 is D or S is referred to as a fixed subframe.

A mobile station device of the related art which cannot recognize the flexible subframe can recognize the flexible subframe as an uplink subframe. The mobile station device of the related art which cannot recognize the flexible subframe may not perform transmission and reception processing when an uplink channel and/or an uplink signal is not indicated in the subframe. With this, the base station device 3 which uses the flexible subframe can implement communication with a mobile station device which can recognize the flexible subframe and a mobile station device which cannot recognize the flexible subframe.

Hereinafter, switching between operations of the demodulation processing and/or the decoding processing based on the control channel, the search space, and/or the subframe configuration will be described.

The mobile station device 1 switches a parameter for performing the demodulation processing and/or the decoding processing on the control channel, based on the type of the transmitted control channel. For example, the mobile station device 1 performs the demodulation processing and/or the decoding processing by using parameters which are individually configured between the PDCCH and the EPDCCH. The mobile station device 1 performs the demodulation processing and/or the decoding processing by operations (processing, procedures) which are individually defined between the PDCCH and the EPDCCH. For example, the mobile station device 1 performs the demodulation processing and/or the decoding processing by using parameters which are individually configured between the first EPDCCH and the second EPDCCH. The mobile station device 1 performs the demodulation processing and/or the decoding processing by using operations which are individually defined between the first EPDCCH and the second EPDCCH.

The mobile station device 1 switches the parameter for performing the demodulation processing and/or the decoding processing on the control channel, based on the monitored search space. For example, the mobile station device 1 performs the demodulation processing and/or the decoding processing by using parameters which are individually configured between a control channel allocated to the common search space and a control channel allocated to the UE-specific search space. The mobile station device 1 switches the parameter for performing the demodulation processing and/or the decoding processing by an operation which is individually defined between the control channel allocated to the common search space and the control channel allocated to the UE-specific search space.

The mobile station device 1 switches the parameter for performing the demodulation processing and/or the decoding processing on the control channel, based on the subframe configuration. For example, the mobile station device 1 performs the demodulation processing and/or the decoding processing by using parameters which are individually configured between a control channel transmitted in the fixed subframe and a control channel transmitted in the flexible subframe. The mobile station device 1 performs the demodulation processing and/or the decoding processing by using operations which are individually defined between a control channel transmitted in the fixed subframe and a control channel transmitted in the flexible subframe.

The parameters which are individually configured are parameters used in initial values of scrambling sequences of the RNTI and the EPDCCH, and/or the parameters (dmrs-ScramblingSequenceInit) used in the initial value of the scrambling sequence of the DMRS. The parameters which are individually configured are not limited to the above-described parameters, and other parameters may be individually configured by the control channel, the search space, and/or the subframe configuration. The operations which are individually defined correspond to types of RNTIs used in the decoding processing of the control channel.

Hereinafter, an example of switching the type of the RNTI used in the decoding processing of the control channel will be described in detail.

FIG. 24 is a diagram illustrating an example of the type of the RNTI used in the decoding processing of a control channel which is associated with a downlink physical channel based on the search space or the subframe configuration. FIG. 24 illustrates an example of the type of the RNTI in a case where both of the CSS and USS are monitored in a certain subframe. "○" means that scrambling of a CRC of a DCI transmitted in a certain search space of a control channel of a certain subframe in the mobile station device 1 by using the RNTI is expected. "-" means that scrambling of a CRC of a DCI transmitted in a certain search space of a control channel of a certain subframe in the mobile station device 1 by using the RNTI is not expected. From a different view, "○" means that the mobile station device 1 performs monitoring (decoding processing) on a control channel having a CRC which is scrambled by using the RNTI, in a certain search space of a certain subframe. "-" means that the mobile station device 1 does not perform monitoring (decoding processing) on a control channel having a CRC which is scrambled by using the RNTI, in a certain search space of a certain subframe.

When decoding of the PDCCH/first EPDCCH/second EPDCCH having a CRC which is scrambled by using the SI-RNTI is configured in a higher layer, the mobile station device 1 monitors the PDCCH/first EPDCCH/second EPDCCH having a specific DCI format and the CRC which is scrambled by using the SI-RNTI and decodes the PDCCH/first EPDCCH/second EPDCCH, and the PDSCH associated with the PDCCH/first EPDCCH/second EPDCCH in a shared search space of the fixed subframe. The specific DCI format is a DCI format for controlling the downlink physical channel and is a DCI format 1C/1A, for example. However, the specific DCI format is not limited thereto, and a new DCI format may be included as the specific DCI format.

When decoding of the second EPDCCH having the CRC which is scrambled by using the SI-RNTI is configured in the higher layer, the mobile station device 1 monitors the second EPDCCH having a specific DCI format and the CRC which is scrambled by using the SI-RNTI, and decodes the second EPDCCH and the PDSCH associated with the second EPDCCH in a shared search space of the flexible subframe. The specific DCI format is a DCI format for controlling the downlink physical channel and is a DCI format 1C/1A, for example. However, the specific DCI format is not limited thereto, and a new DCI format may be included as the specific DCI format. The PDCCH/first EPDCCH having the CRC which is scrambled by using the SI-RNTI is not allocated to the shared search space of the flexible subframe. The mobile station device 1 does not perform the decoding processing even when the PDCCH/first EPDCCH having the CRC which is scrambled by using the SI-RNTI is allocated to the shared search space of the flexible subframe.

The PDCCH/first EPDCCH/second EPDCCH having the CRC which is scrambled by using the SI-RNTI is not allocated to a UE-specific search space of the fixed subframe. The mobile station device 1 does not perform monitoring (decoding processing) on the PDCCH/first EPDCCH/second EPDCCH having the CRC which is scrambled by using the SI-RNTI, in the UE-specific search space of the fixed subframe.

The PDCCH/first EPDCCH/second EPDCCH having the CRC which is scrambled by using the SI-RNTI is not allocated to a UE-specific search space of the flexible subframe. The mobile station device 1 does not perform monitoring (decoding processing) on the PDCCH/first EPDCCH/second EPDCCH having the CRC which is scrambled by using the SI-RNTI, in the UE-specific search space of the flexible subframe.

When decoding of the PDCCH/first EPDCCH having a CRC which is scrambled by using the P-RNTI is configured in the higher layer, the mobile station device 1 monitors the PDCCH/first EPDCCH which is allocated in a shared search space of the fixed subframe and has a specific DCI format and the CRC scrambled by using the P-RNTI, and decodes the PDCCH/first EPDCCH, and the PDSCH associated with the PDCCH/first EPDCCH. The specific DCI format is a DCI format for controlling the downlink physical channel and is a DCI format 1C/1A, for example. However, the specific DCI format is not limited thereto, and a new DCI format may be included as the specific DCI format.

The PDCCH/first EPDCCH/second EPDCCH having the CRC which is scrambled by using the P-RNTI is not allocated to a shared search space of the flexible subframe. The mobile station device 1 does not perform monitoring (decoding processing) on the PDCCH/first EPDCCH/second EPDCCH having the CRC which is scrambled by using the P-RNTI, in the shared search space of the flexible subframe.

The PDCCH/first EPDCCH/second EPDCCH having the CRC which is scrambled by using the P-RNTI is not allocated to the UE-specific search space of the fixed subframe. The mobile station device 1 does not perform monitoring (decoding processing) on the PDCCH/first EPDCCH/ second EPDCCH having the CRC which is scrambled by using the P-RNTI, in the UE-specific search space of the fixed subframe.

The PDCCH/first EPDCCH/second EPDCCH having the CRC which is scrambled by using the P-RNTI is not allocated to the UE-specific search space of the flexible subframe. The mobile station device 1 does not perform monitoring (decoding processing) on the PDCCH/first EPDCCH/second EPDCCH having the CRC which is scrambled by using the P-RNTI, in the UE-specific search space of the flexible subframe.

When decoding of the PDCCH/first EPDCCH/second EPDCCH having a CRC which is scrambled by using the RA-RNTI is configured in the higher layer, the mobile station device 1 monitors the PDCCH/first EPDCCH/second EPDCCH which is allocated in a shared search space of the fixed subframe and has a specific DCI format and the CRC scrambled by using the RA-RNTI, and decodes the PDCCH/first EPDCCH/second EPDCCH, and the PDSCH associated with the PDCCH/first EPDCCH/second EPDCCH, in the shared search space of the fixed subframe. The specific DCI format is a DCI format for controlling the downlink physical channel and is a DCI format 1C/1A, for example. However, the specific DCI format is not limited thereto, and a new DCI format may be included as the specific DCI format.

When decoding of the second EPDCCH having a CRC which is scrambled by using the RA-RNTI is configured in the higher layer, the mobile station device 1 monitors the second EPDCCH which has a specific DCI format and the CRC scrambled by using the RA-RNTI, and decodes the second EPDCCH, and the PDSCH associated with the second EPDCCH, in the shared search space of the flexible subframe. The specific DCI format is a DCI format for controlling the downlink physical channel and is a DCI format 1C/1A, for example. However, the specific DCI format is not limited thereto, and a new DCI format may be included as the specific DCI format. The PDCCH/first EPDCCH having the CRC which is scrambled by using the RA-RNTI is not allocated to the shared search space of the flexible subframe. The mobile station device 1 does not perform monitoring (decoding processing) on the PDCCH/first EPDCCH having the CRC which is scrambled by using the RA-RNTI, in the shared search space of the flexible subframe.

The PDCCH/first EPDCCH/second EPDCCH having the CRC which is scrambled by using the RA-RNTI is not allocated to the UE-specific search space of the fixed subframe. The mobile station device 1 does not perform monitoring (decoding processing) on the PDCCH/first EPDCCH/second EPDCCH having the CRC which is scrambled by using the RA-RNTI, in the UE-specific search space of the fixed subframe.

The PDCCH/first EPDCCH/second EPDCCH having the CRC which is scrambled by using the RA-RNTI is not allocated to the UE-specific search space of the flexible subframe. The mobile station device 1 does not perform monitoring (decoding processing) on the PDCCH/first EPDCCH/second EPDCCH having the CRC which is scrambled by using the RA-RNTI, in the UE-specific search space of the fixed subframe.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, and decodes the PDCCH/first EPDCCH/second EPDCCH and the PDSCH associated with the PDCCH/first EPDCCH/second EPDCCH, in the shared search space of the fixed subframe. The specific DCI format is a DCI format for controlling the downlink physical channel and is a DCI format 1A, for example. However, the specific DCI format is not limited thereto, and a new DCI format may be included as the specific DCI format.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, and decodes the PDCCH/first EPDCCH/second EPDCCH and the PDSCH associated with the PDCCH/first EPDCCH/second EPDCCH, in the shared search space of the flexible subframe. The specific DCI format is a DCI format for controlling the downlink physical channel and is a DCI format 1A, for example. However, the specific DCI format is not limited thereto, and a new DCI format may be included as the specific DCI format.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, and decodes the PDCCH/first EPDCCH/second EPDCCH and the PDSCH associated with the PDCCH/first EPDCCH/second EPDCCH, in the UE-specific search space of the fixed subframe. The specific DCI format is a DCI format for controlling the downlink physical channel and is a DCI format 1/1A/1B/1D/2/2A/2B/2C/2D, for example. However, the specific DCI format is not limited thereto, and a new DCI format may be included as the specific DCI format.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, and decodes the PDCCH/first EPDCCH/second EPDCCH and the PDSCH associated with the PDCCH/first EPDCCH/second EPDCCH, in the UE-specific search space of the flexible subframe. The specific DCI format is a DCI format for controlling the downlink physical channel and is a DCI format 1/1A/1B/1D/2/2A/2B/2C/2D, for example. However, the specific DCI format is not limited thereto, and a new DCI format may be included as the specific DCI format.

When decoding of the PDCCH/first EPDCCH/second EPDCCH having a CRC which is scrambled by using the SPS C-RNTI is configured in the higher layer, the mobile station device 1 monitors the PDCCH/first EPDCCH/second EPDCCH which has a specific DCI format and the CRC scrambled by using the SPS C-RNTI, and decodes the PDCCH/first EPDCCH/second EPDCCH and the PDSCH associated with the PDCCH/first EPDCCH/second EPDCCH, in the shared search space of the fixed subframe. The specific DCI format is a DCI format for controlling the downlink physical channel and is a DCI format 1A, for example. However, the specific DCI format is not limited thereto, and a new DCI format may be included as the specific DCI format.

The PDCCH/first EPDCCH/second EPDCCH having the CRC which is scrambled by using the SPS C-RNTI is not allocated to the shared search space of the flexible subframe. The mobile station device 1 does not perform monitoring (decoding processing) on the PDCCH/first EPDCCH/second EPDCCH having the CRC which is scrambled by using the SPS C-RNTI, in the shared search space of the flexible subframe.

When decoding of the PDCCH/first EPDCCH/second EPDCCH having a CRC which is scrambled by using the SPS C-RNTI is configured in the higher layer, the mobile station device 1 monitors the PDCCH/first EPDCCH/second EPDCCH which has a specific DCI format and the CRC scrambled by using the SPS C-RNTI, and decodes the PDCCH/first EPDCCH/second EPDCCH and the PDSCH associated with the PDCCH/first EPDCCH/second EPDCCH, in the UE-specific search space of the fixed subframe. The specific DCI format is a DCI format for controlling the downlink physical channel and is a DCI format 1/1A/1B/1D/2/2A/2B/2C/2D, for example. However, the specific DCI format is not limited thereto, and a new DCI format may be included as the specific DCI format.

The PDCCH/first EPDCCH/second EPDCCH having the CRC which is scrambled by using the SPS C-RNTI is not allocated to the UE-specific search space of the flexible subframe. The mobile station device 1 does not perform monitoring (decoding processing) on the PDCCH/first EPDCCH/second EPDCCH having the CRC which is scrambled by using the SPS C-RNTI, in the UE-specific search space of the flexible subframe.

When decoding of the PDCCH/first EPDCCH having a CRC which is scrambled by using the Temporary C-RNTI is configured in the higher layer and decoding of the PDCCH/first EPDCCH having a CRC which is scrambled by using the C-RNTI is not configured, the mobile station device 1 monitors the PDCCH/first EPDCCH which has a specific DCI format and the CRC scrambled by using the Temporary C-RNTI, and decodes the PDCCH/first EPDCCH and the PDSCH associated with the PDCCH/first EPDCCH, in the shared search space of the fixed subframe. The specific DCI format is a DCI format for controlling the downlink physical channel and is a DCI format 1A, for example. However, the specific DCI format is not limited thereto, and a new DCI format may be included as the specific DCI format. The second EPDCCH which has the specific DCI format and the CRC scrambled by using the Temporary C-RNTI is not allocated to the shared search space of the fixed subframe. The mobile station device 1 does not perform decoding processing even when the second EPDCCH which has a specific DCI format and the CRC scrambled by using the Temporary C-RNTI is not allocated to the shared search space of the fixed subframe. The specific DCI format is a DCI format for controlling the downlink physical channel.

The PDCCH/first EPDCCH/second EPDCCH which has a specific DCI format and the CRC scrambled by using the Temporary C-RNTI is not allocated to the shared search space of the flexible subframe. The mobile station device 1 does not perform monitoring (decoding processing) on the PDCCH/first EPDCCH/second EPDCCH which has the specific DCI format and the CRC which is scrambled by using the Temporary C-RNTI, in the shared search space of the flexible subframe. The specific DCI format is a DCI format for controlling the downlink physical channel.

When decoding of the PDCCH/first EPDCCH having a CRC which is scrambled by using the Temporary C-RNTI is configured in the higher layer and decoding of the PDCCH/first EPDCCH having a CRC which is scrambled by using the C-RNTI is not configured, the mobile station device 1 monitors the PDCCH/first EPDCCH which has a specific DCI format and the CRC scrambled by using the Temporary C-RNTI, and decodes the PDCCH/first EPDCCH and the PDSCH associated with the PDCCH/first EPDCCH, in the UE-specific search space of the fixed subframe. The specific DCI format is a DCI format for controlling the downlink physical channel and is a DCI format 1/1A, for example. However, the specific DCI format is not limited thereto, and a new DCI format may be included as the specific DCI format. The second EPDCCH which has the specific DCI format and the CRC scrambled by using the Temporary C-RNTI is not allocated to the UE-specific search space of the fixed subframe. The mobile station device 1 does not perform decoding processing even when the second EPDCCH which has a specific DCI format and the CRC scrambled by using the Temporary C-RNTI is not allocated to the UE-specific search space of the fixed subframe. The specific DCI format is a DCI format for controlling the downlink physical channel.

The PDCCH/first EPDCCH/second EPDCCH which has a specific DCI format and the CRC scrambled by using the Temporary C-RNTI is not allocated to the UE-specific search space of the flexible subframe. The mobile station device 1 does not perform monitoring (decoding processing) on the PDCCH/first EPDCCH/second EPDCCH which has the specific DCI format and the CRC scrambled by using the Temporary C-RNTI, in the UE-specific search space of the flexible subframe. The specific DCI format is a DCI format for controlling the downlink physical channel.

When decoding of the PDCCH/first EPDCCH having a CRC which is scrambled by using the M-RNTI is configured in the higher layer, the mobile station device 1 monitors the PDCCH/first EPDCCH which has a specific DCI format and the CRC scrambled by using the M-RNTI, and decodes the PDCCH/first EPDCCH and the PDSCH associated with the PDCCH/first EPDCCH, in the shared search space of the fixed subframe. The specific DCI format is a DCI format for controlling the downlink physical channel and is a DCI format 1C, for example. However, the specific DCI format is not limited thereto, and a new DCI format may be included as the specific DCI format. The second EPDCCH having the CRC which is scrambled by using the M-RNTI is not allocated to the shared search space of the fixed subframe. The mobile station device 1 does not perform monitoring (decoding processing) on the second EPDCCH having the CRC which is scrambled by using the M-RNTI, in the shared search space of the fixed subframe.

The PDCCH/first EPDCCH/second EPDCCH having the CRC which is scrambled by using the M-RNTI is not allocated to the shared search space of the flexible subframe. The mobile station device 1 does not perform monitoring (decoding processing) on the PDCCH/first EPDCCH/second EPDCCH having the CRC which is scrambled by using the M-RNTI, in the shared search space of the flexible subframe.

The PDCCH/first EPDCCH/second EPDCCH having the CRC which is scrambled by using the M-RNTI is not allocated to the UE-specific search space of the fixed subframe. The mobile station device 1 does not perform monitoring (decoding processing) on the PDCCH/first EPDCCH/second EPDCCH having the CRC which is scrambled by using the M-RNTI, in the UE-specific search space of the fixed subframe.

The PDCCH/first EPDCCH/second EPDCCH having the CRC which is scrambled by using the M-RNTI is not allocated to the UE-specific search space of the flexible subframe. The mobile station device 1 does not perform monitoring (decoding processing) on the PDCCH/first EPDCCH/second EPDCCH having the CRC which is scrambled by using the M-RNTI, in the UE-specific search space of the flexible subframe.

When decoding of the PDCCH/first EPDCCH/second EPDCCH having a CRC which is scrambled by using the D-RNTI is configured in the higher layer, the mobile station device 1 monitors the PDCCH/first EPDCCH/second EPDCCH which has a specific DCI format and the CRC scrambled by using the D-RNTI, and decodes the PDCCH/first EPDCCH/second EPDCCH, in the shared search space of the fixed subframe. The specific DCI format is a DCI format for controlling the downlink physical channel and is a DCI format 1C, for example. However, the specific DCI format is not limited thereto, and a new DCI format may be included as the specific DCI format. The second EPDCCH having the CRC which is scrambled by using the D-RNTI is not allocated to the shared search space of the fixed subframe. The mobile station device 1 does not perform monitoring (decoding processing) on the second EPDCCH having the CRC which is scrambled by using the D-RNTI, in the shared search space of the fixed subframe.

When decoding of the second EPDCCH having a CRC which is scrambled by using the D-RNTI is configured in the higher layer, the mobile station device 1 monitors the second EPDCCH which is allocated to the shared search space of the flexible subframe and has a specific DCI format and the CRC scrambled by using the D-RNTI, and decodes the second EPDCCH. The specific DCI format is a DCI format for controlling the downlink physical channel and is a DCI format 1C, for example. However, the specific DCI format is not limited thereto, and a new DCI format may be included as the specific DCI format. The PDCCH/first EPDCCH having the CRC which is scrambled by using the D-RNTI is not allocated to the shared search space of the flexible subframe. The mobile station device 1 does not perform monitoring (decoding processing) on the PDCCH/first EPDCCH having the CRC which is scrambled by using the D-RNTI, in the shared search space of the flexible subframe.

The PDCCH/first EPDCCH/second EPDCCH having the CRC which is scrambled by using the D-RNTI is not allocated to the UE-specific search space of the fixed subframe. The mobile station device 1 does not perform monitoring (decoding processing) on the PDCCH/first EPDCCH/second EPDCCH having the CRC which is scrambled by using the D-RNTI, in the UE-specific search space of the fixed subframe.

The PDCCH/first EPDCCH/second EPDCCH having the CRC which is scrambled by using the D-RNTI is not allocated to the UE-specific search space of the flexible subframe. The mobile station device 1 does not perform monitoring (decoding processing) on the PDCCH/first EPDCCH/second EPDCCH having the CRC which is scrambled by using the D-RNTI, in the UE-specific search space of the flexible subframe.

FIG. 25 is a diagram illustrating an example of the type of the RNTI used in the decoding processing of the control channel which is associated with an uplink physical channel based on the search space or the subframe configuration. FIG. 25 illustrates an example of the type of the RNTI in a case where both of the CSS and USS are monitored in a downlink subframe. "○" means that scrambling of a CRC parity bit appended to a DCI format transmitted in a search space of a control channel of the corresponding subframe in the mobile station device 1 by using the RNTI is expected. "-" means that scrambling of the CRC parity bit appended to the DCI format transmitted in the search space of the control channel of the corresponding subframe in the mobile station device 1 by using the RNTI is not expected. From a different view, "○" means that the mobile station device 1 performs monitoring (decoding processing) on a control channel having a CRC which is scrambled by using the RNTI, in a certain search space of a certain subframe. "-" means that the mobile station device 1 does not perform monitoring (decoding processing) on a control channel having a CRC which is scrambled by using the RNTI, in a certain search space of a certain subframe.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, decodes the PDCCH/first EPDCCH/second EPDCCH, and transmits the PUSCH associated with the PDCCH/first EPDCCH/second EPDCCH, in the shared search space of the fixed subframe. The specific DCI format is a DCI format for controlling the uplink physical channel and is a DCI format 0, for example. However, the specific DCI format is not limited thereto, and a new DCI format may be included as the specific DCI format.

The PDCCH/first EPDCCH/second EPDCCH which has a specific DCI format and the CRC which is scrambled by using the C-RNTI is not allocated to the shared search space of the flexible subframe. The mobile station device 1 does not perform monitoring (decoding processing) on the PDCCH/first EPDCCH/second EPDCCH which has a specific DCI format and the CRC which is scrambled by using the C-RNTI, in the shared search space of the flexible subframe. The specific DCI format is a DCI format for controlling the uplink physical channel.

When decoding of the PDCCH/first EPDCCH/second EPDCCH having a CRC which is scrambled by using the C-RNTI is configured in the higher layer, the mobile station device 1 monitors the PDCCH/first EPDCCH/second EPDCCH which has a specific DCI format and the CRC scrambled by using the C-RNTI, decodes the PDCCH/first EPDCCH/second EPDCCH, and transmits the PUSCH associated with the PDCCH/first EPDCCH/second EPDCCH, in the UE-specific search space of the fixed subframe. The specific DCI format is a DCI format for controlling the uplink physical channel and is a DCI format 0/4, for example. However, the specific DCI format is not limited thereto, and a new DCI format may be included as the specific DCI format.

The PDCCH/first EPDCCH/second EPDCCH which has a specific DCI format and the CRC which is scrambled by using the C-RNTI is not allocated to the UE-specific search space of the flexible subframe. The mobile station device 1 does not perform monitoring (decoding processing) on the PDCCH/first EPDCCH/second EPDCCH which has a specific DCI format and the CRC which is scrambled by using the C-RNTI, in the UE-specific search space of the flexible subframe. The specific DCI format is a DCI format for controlling the uplink physical channel.

When decoding of the PDCCH/first EPDCCH/second EPDCCH having a CRC which is scrambled by using the SPS C-RNTI is configured in the higher layer, the mobile station device 1 monitors the PDCCH/first EPDCCH/second EPDCCH which has a specific DCI format and the CRC scrambled by using the SPS C-RNTI, decodes the PDCCH/first EPDCCH/second EPDCCH, and transmits the PUSCH associated with the PDCCH/first EPDCCH/second EPDCCH, in the shared search space of the fixed subframe. The specific DCI format is a DCI format for controlling the uplink physical channel and is a DCI format 0, for example.

However, the specific DCI format is not limited thereto, and a new DCI format may be included as the specific DCI format.

The PDCCH/first EPDCCH/second EPDCCH which has a specific DCI format and the CRC scrambled by using the SPS C-RNTI is not allocated to the shared search space of the flexible subframe. The mobile station device 1 does not perform monitoring (decoding processing) on the PDCCH/first EPDCCH/second EPDCCH which has a specific DCI format and the CRC scrambled by using the SPS C-RNTI, in the shared search space of the flexible subframe. The specific DCI format is a DCI format for controlling the uplink physical channel.

When decoding of the PDCCH/first EPDCCH/second EPDCCH having a CRC which is scrambled by using the SPS C-RNTI is configured in the higher layer, the mobile station device 1 monitors the PDCCH/first EPDCCH/second EPDCCH which has a specific DCI format and the CRC scrambled by using the SPS C-RNTI, decodes the PDCCH/first EPDCCH/second EPDCCH, and transmits the PUSCH associated with the PDCCH/first EPDCCH/second EPDCCH, in the UE-specific search space of the fixed subframe. The specific DCI format is a DCI format for controlling the uplink physical channel and is a DCI format 0/4, for example. However, the specific DCI format is not limited thereto, and a new DCI format may be included as the specific DCI format.

The PDCCH/first EPDCCH/second EPDCCH which has a specific DCI format and the CRC scrambled by using the SPS C-RNTI is not allocated to the UE-specific search space of the flexible subframe. The mobile station device 1 does not perform monitoring (decoding processing) on the PDCCH/first EPDCCH/second EPDCCH which has a specific DCI format and the CRC scrambled by using the SPS C-RNTI, in the UE-specific search space of the flexible subframe. The specific DCI format is a DCI format for controlling the uplink physical channel.

When decoding of the PDCCH/first EPDCCH having a CRC which is scrambled by using the Temporary C-RNTI is configured in the higher layer, the mobile station device 1 monitors the PDCCH/first EPDCCH which is allocated to the shared search space of the fixed subframe and has a specific DCI format and the CRC scrambled by using the Temporary C-RNTI, decodes the PDCCH/first EPDCCH, and transmits the PUSCH associated with the PDCCH/first EPDCCH, in the UE-specific search space of the fixed subframe regardless of whether or not decoding of the PDCCH/first EPDCCH having the CRC which is scrambled by using the C-RNTI is configured. The specific DCI format is a DCI format for controlling the uplink physical channel and is a DCI format 0, for example. However, the specific DCI format is not limited thereto, and a new DCI format may be included as the specific DCI format. The second EPDCCH which has a specific DCI format and the CRC scrambled by using the Temporary C-RNTI is not allocated to the shared search space of the fixed subframe. The mobile station device 1 does not perform decoding processing even when the second EPDCCH which has a specific DCI format and the CRC scrambled by using the Temporary C-RNTI is allocated to the shared search space of the fixed subframe. The specific DCI format is a DCI format for controlling the uplink physical channel.

The PDCCH/first EPDCCH/second EPDCCH which has a specific DCI format and the CRC scrambled by using the Temporary C-RNTI is not allocated to the shared search space of the flexible subframe. The mobile station device 1 does not perform monitoring (decoding processing) on the PDCCH/first EPDCCH/second EPDCCH which has a specific DCI format and the CRC scrambled by using the Temporary C-RNTI, in the shared search space of the flexible subframe. The specific DCI format is a DCI format for controlling the uplink physical channel.

The PDCCH/first EPDCCH/second EPDCCH which has a specific DCI format and the CRC scrambled by using the Temporary C-RNTI is not allocated to the UE-specific search space of the fixed subframe. The mobile station device 1 does not perform monitoring (decoding processing) on the PDCCH/first EPDCCH/second EPDCCH which has a specific DCI format and the CRC scrambled by using the Temporary C-RNTI, in the UE-specific search space of the fixed subframe. The specific DCI format is a DCI format for controlling the uplink physical channel.

The PDCCH/first EPDCCH/second EPDCCH which has a specific DCI format and the CRC scrambled by using the Temporary C-RNTI is not allocated to the UE-specific search space of the flexible subframe. The mobile station device 1 does not perform monitoring (decoding processing) on the PDCCH/first EPDCCH/second EPDCCH which has a specific DCI format and the CRC scrambled by using the Temporary C-RNTI, in the UE-specific search space of the flexible subframe. The specific DCI format is a DCI format for controlling the uplink physical channel.

When decoding of the PDCCH/first EPDCCH/second EPDCCH having a CRC which is scrambled by using the TPC-PUCCH-RNTI is configured in the higher layer, the mobile station device 1 monitors the PDCCH/first EPDCCH/second EPDCCH which is allocated to the shared search space of the fixed subframe and has a specific DCI format and the CRC scrambled by using the TPC-PUCCH-RNTI, and decodes the PDCCH/first EPDCCH/second EPDCCH. The specific DCI format is a DCI format for controlling the uplink physical channel and is a DCI format 3/3A, for example. However, the specific DCI format is not limited thereto, and a new DCI format may be included as the specific DCI format.

When decoding of the PDCCH/first EPDCCH/second EPDCCH having the CRC which is scrambled by using the TPC-PUCCH-RNTI is configured in the higher layer, the mobile station device 1 monitors the PDCCH/first EPDCCH/second EPDCCH which is allocated to the shared search space of the flexible subframe and has a specific DCI format and the CRC scrambled by using the TPC-PUCCH-RNTI, and decodes the PDCCH/first EPDCCH/second EPDCCH. The specific DCI format is a DCI format for controlling the uplink physical channel and is a DCI format 3/3A, for example. However, the specific DCI format is not limited thereto, and a new DCI format may be included as the specific DCI format.

The PDCCH/first EPDCCH/second EPDCCH having the CRC which is scrambled by using the TPC-PUCCH-RNTI is not allocated to the UE-specific search space of the fixed subframe. The mobile station device 1 does not perform monitoring (decoding processing) on the PDCCH/first EPDCCH/second EPDCCH having the CRC which is scrambled by using the TPC-PUCCH-RNTI, in the UE-specific search space of the fixed subframe.

The PDCCH/first EPDCCH/second EPDCCH having the CRC which is scrambled by using the TPC-PUCCH-RNTI is not allocated to the UE-specific search space of the flexible subframe. The mobile station device 1 does not perform monitoring (decoding processing) on the PDCCH/first EPDCCH/second EPDCCH having the CRC which is scrambled by using the TPC-PUCCH-RNTI, in the UE-specific search space of the flexible subframe.

When decoding of the PDCCH/first EPDCCH/second EPDCCH having a CRC which is scrambled by using the TPC-PUSCH-RNTI is configured in the higher layer, the mobile station device 1 monitors the PDCCH/first EPDCCH/second EPDCCH which is allocated to the shared search space of the fixed subframe and has a specific DCI format and the CRC scrambled by using the TPC-PUSCH-RNTI, and decodes the PDCCH/first EPDCCH/second EPDCCH. The specific DCI format is a DCI format for controlling the uplink physical channel and is a DCI format 3/3A, for example. However, the specific DCI format is not limited thereto, and a new DCI format may be included as the specific DCI format.

The PDCCH/first EPDCCH/second EPDCCH having the CRC which is scrambled by using the TPC-PUSCH-RNTI is not allocated to the shared search space of the flexible subframe. The mobile station device 1 does not perform monitoring (decoding processing) on the PDCCH/first EPDCCH/second EPDCCH having the CRC which is scrambled by using the TPC-PUSCH-RNTI, in the shared search space of the flexible subframe.

The PDCCH/first EPDCCH/second EPDCCH having the CRC which is scrambled by using the TPC-PUSCH-RNTI is not allocated to the UE-specific search space of the fixed subframe. The mobile station device 1 does not perform monitoring (decoding processing) on the PDCCH/first EPDCCH/second EPDCCH having the CRC which is scrambled by using the TPC-PUSCH-RNTI, in the UE-specific search space of the fixed subframe.

The PDCCH/first EPDCCH/second EPDCCH having the CRC which is scrambled by using the TPC-PUSCH-RNTI is not allocated to the UE-specific search space of the flexible subframe. The mobile station device 1 does not perform monitoring (decoding processing) on the PDCCH/first EPDCCH/second EPDCCH having the CRC which is scrambled by using the TPC-PUSCH-RNTI, in the UE-specific search space of the flexible subframe.

In a case of "∘" in FIGS. 24 and 25, the base station device 3 may scramble the CRC parity bit appended to the DCI format which is transmitted in the search space of the control channel of the corresponding subframe, by using the RNTI and may transmit the control channel. In a case of "-" in FIGS. 24 and 25, the base station device 3 does not scramble the CRC parity bit appended to the DCI format which is transmitted in the search space of the control channel of the corresponding subframe, by using the RNTI or the base station device 3 does not transmit the DCI format to which the CRC parity bit scrambled by using the RNTI in the control channel of the subframe is appended, in the search space.

In this manner, the type of the RNTI used in the decoding processing of the control channel is switched based on the control channel, the search space, and/or the subframe configuration, and thus the mobile station device 1 monitors only information having a probability of being transmitted from the base station device 3. Accordingly, decoding processing of the mobile station device 1 is reduced.

In the above descriptions, the operations for performing the decoding processing by using the RNTI are individually defined between the fixed subframe and the flexible subframe, for each of the control channel and the search space. However, the decoding processing which is common between the fixed subframe and the flexible subframe may be performed in a certain control channel or a certain search space. For example, in the CSS of the PDCCH, the decoding processing of the control channel may be performed by using the type of the RNTI defined in the fixed subframe although the subframe is the flexible subframe.

Hitherto, an operation in which operations for performing the decoding processing of the control channel by using the type of the RNTI are defined in advance in the mobile station device 1 and the operations are switched based on the control channel, the search space, and/or the subframe configuration is described.

Hereinafter, a method of designating the type of the RNTI for performing the decoding processing of the control channel in the mobile station device 1, from the base station device 3 will be described.

The base station device 3 configures 1-bit information indicating whether (1, TRUE, ENABLE, and ON) or not (0, FALSE, DISABLE, and OFF) the decoding processing is performed by using the RNTI, through RRC signaling in the mobile station device 1. For example, when performing of the decoding processing by using the C-RNTI in the EPDCCH allocated to the EPDCCH-CSS is configured, a flag corresponding to the decoding processing of the C-RNTI is configured to 1. The configured mobile station device 1 performs the decoding processing by using the C-RNTI in the EPDCCH allocated to the EPDCCH-CSS. When performing of the decoding processing by using the C-RNTI in the EPDCCH allocated to the EPDCCH-CSS is not configured, the flag corresponding to the decoding processing of the C-RNTI is configured to 0. The configured mobile station device 1 performs the decoding processing by using the C-RNTI in the EPDCCH allocated to the EPDCCH-CSS.

The types of all of the RNTIs may be configured for the flag corresponding to the decoding processing. In this case, the base station device 3 configures the flag of the decoding processing corresponding to the types of all of the RNTIs in the mobile station device 1. The flag corresponding to the decoding processing may be configured by using some of the types of the RNTIs. In this case, the mobile station device 1 determines whether or not the decoding processing is performed by using the RNTI prior to notification information, regarding the RNTI in which there is a notification of the flag corresponding to the decoding processing. The mobile station device 1 performs an operation of initial configuration regarding the RNTI in which there is no notification of the flag corresponding to the decoding processing.

Notification of the flag corresponding to the decoding processing is explicitly performed in a state where the flag is included in EPDCCH set configuration information.

Hereinafter, an example of switching between the monitoring of the RNTI and the decoding processing of the control channel will be described.

As an example of switching of operations of demodulation processing and/or decoding processing based on the subframe configuration, descriptions will be made using FIG. 26. FIG. 26 is a diagram illustrating an example of switching of the subframe configuration and the type of the monitored RNTI. The PDCCH-SS1 corresponds to a PDCCH-USS, and the EPDCCH-SS1 corresponds to a second EPDCCH-USS. The PDCCH-SS1 corresponds to a PDCCH-CSS, and the EPDCCH-SS1 corresponds to a second EPDCCH-CSS. FIG. 26 illustrates an example in which both of the CSS and the USS are monitored in a subframe in which either of the uplink-downlink configuration 1 and the uplink-downlink configuration 2 is configured as at least D or S.

The mobile station device 1 monitors the control channel based on the subframe configuration from the base station device 3. As an example of the monitoring of the control channel, the mobile station device 1 determines monitoring of the PDCCH-SS1, monitoring of the EPDCCH-SS1, monitoring of the PDCCH-SS2, or monitoring of the EPDCCH-SS2, for each subframe, and the type (referred to as RNTI group) of the monitored RNTI is switched.

The mobile station device 1 monitors an EPDCCH to which a CRC scrambled by using a first RNTI is appended, in a subframe (first subframe) determined based on at least an EPDCCH subframe configuration, and monitors an EPDCCH to which a CRC scrambled by using a second RNTI is appended, in a subframe (second subframe) determined based on at least of a first uplink-downlink configuration and a second uplink-downlink configuration. Here, the second subframe is determined based on at least the EPDCCH subframe configuration. The second subframe may be the first subframe.

The mobile station device 1 monitors the EPDCCH to which the CRC scrambled by using the first RNTI is appended in the first subframe, and monitors the EPDCCH to which a CRC scrambled by using the second RNTI in the second subframe different from the first subframe is appended, in one radio frame. The first RNTI is a RNTI included in a first RNTI group. The second RNTI is a RNTI included in a second RNTI group. The second RNTI group may include all of RNTIs included in the first RNTI group.

In the subframe 0, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI and the SPS C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 1, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the mobile station device 1 monitors the PDCCH allocated to the PDCCH-SS1, by using the C-RNTI, the SPS C-RNTI, and the Temporary C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 2, the control channel is not monitored because the uplink-downlink configuration 1 and the uplink-downlink configuration 2 are Us together.

In a subframe 3, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI, and the mobile station device 1 performs the decoding processing. At this time, the mobile station device 1 monitors the EPDCCH allocated to the EPDCCH-SS2, by using the SI-RNTI, the P-RNTI, the RA-RNTI, the C-RNTI, and the TPC-PUCCH-RNTI, and the mobile station device 1 performs the decoding processing.

In a subframe 4, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI, and the mobile station device 1 performs the decoding processing. At this time, the mobile station device 1 monitors the EPDCCH allocated to the EPDCCH-SS2, by using the SI-RNTI, the P-RNTI, the RA-RNTI, the C-RNTI, and the TPC-PUCCH-RNTI, and the mobile station device 1 performs the decoding processing.

In a subframe 5, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the mobile station device 1 monitors the PDCCH allocated to the PDCCH-SS1, by using the C-RNTI, the SPS C-RNTI, and the Temporary C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In a subframe 6, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI and the SPS C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In a subframe 7, the control channel is not monitored because the uplink-downlink configuration 1 and the uplink-downlink configuration 2 are Us together.

In a subframe 8, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI, and the mobile station device 1 performs the decoding processing. At this time, the mobile station device 1 monitors the EPDCCH allocated to the EPDCCH-SS2, by using the SI-RNTI, the RA-RNTI, the C-RNTI, and the TPC-PUCCH-RNTI, and the mobile station device 1 performs the decoding processing.

In a subframe 9, it is configured that the mobile station device 1 monitors the PDCCH-SS1 and the EPDCCH-SS2 based on the uplink-downlink configuration 1, the uplink-downlink configuration 2, and the EPDCCH subframe configuration. At this time, the mobile station device 1 monitors the PDCCH allocated to the PDCCH-SS1, by using the C-RNTI, the SPS C-RNTI, and the Temporary C-RNTI, and the mobile station device 1 performs the decoding processing. At this time, the mobile station device 1 monitors the EPDCCH allocated to the EPDCCH-SS2, by using the SI-RNTI, the RA-RNTI, the C-RNTI, and the TPC-PUCCH-RNTI, and the mobile station device 1 performs the decoding processing.

When configuring of a MBSFN subframe in the subframes 3, 4, 7, 8, and 9 is allowable, the decoding processing may be performed by using the M-RNTI for the PDCCH/EPDCCH allocated to the PDCCH-SS2 or the EPDCCH-SS2.

The decoding processing may be performed by using the D-RNTI for the PDCCH/EPDCCH allocated to the PDCCH-SS2 or the EPDCCH-SS2 in the subframes 0, 1, 3, 4, 5, 6, 8, and 9.

As an example of switching operations of the demodulation processing and/or the decoding processing based on the control channel, descriptions will be made using FIG. 27. FIG. 27 is a diagram illustrating an example of switching of the subframe configuration and the type of the monitored RNTI. The PDCCH-SS1 corresponds to a PDCCH-USS, the EPDCCH-SS1 corresponds to a second EPDCCH-USS, and the PDCCH-SS1 corresponds to a PDCCH-CSS. FIG. 27 illustrates an example in which both of the CSS and the USS are monitored in a subframe in which both of the uplink-downlink configuration 1 and the uplink-downlink configuration 2 are configured as D or S, and only USS is monitored in a subframe in which one of the uplink-downlink configuration 1 and the uplink-downlink configuration 2 is D or S and another is U.

When configuring of common information is impossible in all of the mobile station devices, configuring of the CSS may be impossible in a certain subframe. In this case, the control information transmitted in the CSS may be transmitted in the USS. At this time, it is necessary that the mobile station device 1 includes a function of performing monitoring of the control information which has a probability of being transmitted in the CSS, in the USS. That is, it is necessary that some of the types of the RNTIs used in the monitoring in the CSS are monitored in the USS.

For example, when the control information of the DCI format 1C and the like, which is transmitted in the CSS is transmitted in the USS, the number of times of performing blind decoding in the USS may be increased so as to be greater than the total number of times of performing the blind decoding in the CSS and the USS by using the method of the related art. At this time, the mobile station device 1 restricts the number of times of performing the blind decoding for only a DCI format corresponding to the size of the DCI format 1C. For example, the mobile station device 1 restricts an aggregation level of only the DCI format corresponding to the size of the DCI format 1C, so as to be 4 and 8, and the mobile station device 1 performs the blind decoding. For example, the mobile station device 1 restricts the total number of PDCCH/EPDCCH candidates of only the DCI format corresponding to the size of the DCI format 1C, so as to be equal to or less than 6, and the mobile station device 1 performs the blind decoding.

The mobile station device 1 monitors the control channel based on the subframe configuration from the base station device 3. As an example of the monitoring of the control channel, the mobile station device 1 determines monitoring of the PDCCH-SS1, monitoring of the EPDCCH-SS1, or monitoring of the PDCCH-SS2, for each subframe, and the type of the monitored RNTI is switched.

In the subframe 0, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the mobile station device 1 monitors the EPDCCH allocated to the EPDCCH-SS1, by using the C-RNTI and the SPS C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 1, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the mobile station device 1 monitors the PDCCH allocated to the PDCCH-SS1, by using the C-RNTI, the SPS C-RNTI, and the Temporary C-RNTI, and the mobile station device 1 performs the decoding processing. At this time, the mobile station device 1 monitors the PDCCH allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 2, the control channel is not monitored because the uplink-downlink configuration 1 and the uplink-downlink configuration 2 are Us together.

In the subframe 3, it is configured that the mobile station device 1 monitors the EPDCCH-SS1 based on the uplink-downlink configuration 1, the uplink-downlink configuration 2, and the EPDCCH subframe configuration. At this time, the mobile station device 1 monitors the control channel allocated to the EPDCCH-SS1, by using the SI-RNTI, the RA-RNTI, the C-RNTI, and the TPC-PUCCH-RNTI, and the mobile station device 1 performs the decoding processing.

In the subframe 4, it is configured that the mobile station device 1 monitors the EPDCCH-SS1 based on the uplink-downlink configuration 1, the uplink-downlink configuration 2, and the EPDCCH subframe configuration. At this time, the mobile station device 1 monitors the control channel allocated to the EPDCCH-SS1, by using the SI-RNTI, the RA-RNTI, the C-RNTI, and the TPC-PUCCH-RNTI, and the mobile station device 1 performs the decoding processing.

In the subframe 5, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the mobile station device 1 monitors the control channel allocated to the PDCCH-SS1, by using the C-RNTI, the SPS C-RNTI, and the Temporary C-RNTI, and the mobile station device 1 performs the decoding processing. At this time, the mobile station device 1 monitors the control channel allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 6, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the mobile station device 1 monitors the control channel allocated to the EPDCCH-SS1, by using the C-RNTI and the SPS C-RNTI, and the mobile station device 1 performs the decoding processing. At this time, the mobile station device 1 monitors the control channel allocated to the PDCCH-SS2, by using the SI-RNTI, the P-RNTI, the RA-RNTI, the C-RNTI, the SPS C-RNTI, the Temporary C-RNTI, the TPC-PUCCH-RNTI, and the TPC-PUSCH-RNTI, and the mobile station device 1 performs the decoding processing.

In the subframe 7, the control channel is not monitored because the uplink-downlink configuration 1 and the uplink-downlink configuration 2 are Us together.

In the subframe 8, it is configured that the mobile station device 1 monitors the EPDCCH-SS1 based on the uplink-downlink configuration 1, the uplink-downlink configuration 2, and the EPDCCH subframe configuration. At this time, the mobile station device 1 monitors the control channel allocated to the EPDCCH-SS1, by using the SI-RNTI, the RA-RNTI, the C-RNTI, and the TPC-PUCCH-RNTI, and the mobile station device 1 performs the decoding processing.

In the subframe 9, it is configured that the mobile station device 1 monitors the EPDCCH-SS1 based on the uplink-downlink configuration 1, the uplink-downlink configuration 2, and the EPDCCH subframe configuration. At this time, the mobile station device 1 monitors the control channel allocated to the EPDCCH-SS1, by using the SI-RNTI, the RA-RNTI, the C-RNTI, and the TPC-PUCCH-RNTI, and the mobile station device 1 performs the decoding processing.

Accordingly, even when configuring of the CSS is impossible, the mobile station device 1 can receive the control information transmitted in the CSS.

When configuring of the MBSFN subframe in the subframes 3, 4, 7, 8, and 9 is allowable, the decoding processing may be performed by using the M-RNTI for the PDCCH/EPDCCH allocated to the PDCCH-SS2 or the EPDCCH-SS2.

The decoding processing may be performed by using the D-RNTI for the PDCCH allocated to the PDCCH-SS2 in the subframes 0, 1, 5, and 6, or the EPDCCH allocated to the EPDCCH-SS1 in the subframes 3, 4, 8, and 9.

A case where both of the CSS and the USS are monitored and a case where only the USS is monitored are configured in the mobile station device 1 by the base station device 3. For example, when both of the EPDCCH set configuration information (EPDCCH-SetConfig) corresponding to the configuration of the EPDCCH-CSS, and the EPDCCH set configuration information corresponding to the configuration of the EPDCCH-USS are configured in the mobile station device 1, the mobile station device 1 monitors both of the EPDCCH-CSS or the PDCCH-CSS, and the EPDCCH-USS. In this case, the mobile station device 1 performs the decoding processing on the control channel based on the type of the RNTI of the subframe 8 or the subframe 9 in FIG. 26.

When only the EPDCCH set configuration information corresponding to the configuration of the EPDCCH-USS has been configured in the mobile station device 1 and the EPDCCH set configuration information corresponding to the configuration of the EPDCCH-CSS has not been configured in the mobile station device 1, and when the PDCCH has not been transmitted, the mobile station device 1 monitors only the EPDCCH-USS. In this case, the mobile station device 1 performs the decoding processing on the control channel based on the type of the RNTI of the subframes 3, 4, 8, and 9 in FIG. 27.

Hereinafter, an example of switching a scrambling sequence parameter used in the PDCCH, the EPDCCH, and the DMRS will be described in detail.

Figure 28:
FIG. 28 is a diagram illustrating an example of a parameter used in a subframe configuration and generation of a scrambling sequence.

As the example of switching the scrambling sequence parameter for the PDCCH, the EPDCCH, and the DMRS, based on the subframe configuration, descriptions will be described using FIG. 28. FIG. 28 is a diagram illustrating an example of the subframe configuration and a parameter used in generation of the scrambling sequence. The PDCCH-SS1 corresponds to a PDCCH-USS, and the EPDCCH-SS1 corresponds to a second EPDCCH-USS. The PDCCH-SS1 corresponds to a PDCCH-CSS, and the EPDCCH-SS1 corresponds to a second EPDCCH-CSS. FIG. 28 illustrates an example in which both of the CSS and the USS are monitored in a subframe in which either of the uplink-downlink configuration 1 and the uplink-downlink configuration 2 is configured as at least D or S. In FIG. 28, a "PCI" indicates the physical layer cell identifier of the base station device 3, a "first VCID" indicates a scrambling sequence parameter configured from the base station device 3. A "second VCID" indicates a scrambling sequence parameter from the base station device 3, which is separated from the "first VCID", and a "third VCID" indicates a scrambling sequence parameter from the base station device 3, which is separated from the "first VCID" and the "second VCID".

The mobile station device 1 monitors the control channel based on the subframe configuration from the base station device 3. As an example of the monitoring of the control channel, the mobile station device 1 determines monitoring of the PDCCH-SS1, monitoring of the EPDCCH-SS1, or monitoring of the PDCCH-SS2, for each subframe, and the scrambling sequence parameter which is referred in accordance with the determination is switched.

The mobile station device 1 receives an EPDCCH (EPDCCH including first scrambled information) including information scrambled with sequences which are generated based on a first parameter (first VCID and first scrambling sequence parameter) in a subframe (first subframe) which is determined based on at least the EPDCCH subframe configuration. The mobile station device 1 receives an EPDCCH (EPDCCH including second scrambled information) including information scrambled with sequences which are generated based on a second parameter (second VCID and second scrambling sequence parameter) in a second subframe which is determined based on at least the first uplink-downlink configuration and the second uplink-downlink configuration. The second subframe is for a terminal described in Claim 1, and is determined based on at least the EPDCCH subframe configuration. The second subframe may be the first subframe.

The mobile station device 1 receives a DMRS of sequences generated based on the first parameter, as a DMRS associated with the EPDCCH (EPDCCH including first scrambled information) including the information scrambled with the sequences which are generated based on the first parameter (first VCID and first scrambling sequence parameter), in a subframe (first subframe) which is determined based on at least the EPDCCH subframe configuration. The mobile station device 1 receives a DMRS of sequences generated based on the second parameter, as a DMRS associated with the EPDCCH (EPDCCH including first scrambled information) including the information scrambled with the sequences which are generated based on the second parameter (second VCID and second scrambling sequence parameter), in a second subframe which is determined based on at least the first uplink-downlink configuration and the second uplink-downlink configuration. The first parameter and the second parameter are parameters which are configured for the same EPDCCH set. The EPDCCH including the first scrambled information and the EPDCCH including the second scrambled information may be monitored in an EPDCCH resource block set which is configured for the same EPDCCH set.

In the subframe 0, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the first VCID, scrambles the EPDCCH by using the generated scrambling sequence, and then transmits the scrambled EPDCCH. The base station device 3 generates a scrambling sequence based on the PCI, scrambles the PDCCH by using the generated scrambling sequence, and transmits the scrambled PDCCH. At this time, the mobile station device 1 generates a scrambling sequence based on the first VCID. The mobile station device 1 receives the DMRS allocated to the EPDCCH-SS1 and descrambles the EPDCCH by using the generated scrambling sequence. The mobile station device 1 generates a scrambling sequence based on the PCI, and descrambles the PDCCH allocated to the PDCCH-SS2 by using the generated scrambling sequence.

In the subframe 1, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the PCI, scrambles the PDCCH by using the generated scrambling sequence, and transmits the scrambled PDCCH. At this time, the mobile station device 1 generates a scrambling sequence based on the PCI, and descrambles PDCCHs allocated to the PDCCH-SS1 and the PDCCH-SS2 by using the generated scrambling sequence.

In the subframe 2, the control channel is not monitored because the uplink-downlink configuration 1 and the uplink-downlink configuration 2 are Us together.

In the subframe 3, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. The base station device 3 generates a scrambling sequence based on a third VCID, scrambles the EPDCCH allocated to the EPDCCH-SS2, by using the generated scrambling sequence, and then transmits the scrambled EPDCCH. At this time, the mobile station device 1 generates a scrambling sequence based on the second VCID. The mobile station device 1 receives the DMRS allocated to the EPDCCH-SS1 and descrambles the EPDCCH by using the generated scrambling sequence. The mobile station device 1 generates a scrambling sequence based on the third VCID. The mobile station device 1 receives the DMRS allocated to the EPDCCH-SS2 and descrambles the EPDCCH by using the generated scrambling sequence.

In the subframe 4, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. The base station device 3 generates a scrambling sequence based on the third VCID, scrambles the EPDCCH allocated to the EPDCCH-SS2, by using the generated scrambling sequence, and then transmits the scrambled EPDCCH. At this time, the mobile station device 1 generates a scrambling sequence based on the second VCID. The mobile station device 1 receives the DMRS allocated to the EPDCCH-SS1 and descrambles the EPDCCH by using the generated scrambling sequence. The mobile station device 1 generates a scrambling sequence based on the third VCID. The mobile station device 1 receives the DMRS allocated to the EPDCCH-SS2 and descrambles the EPDCCH by using the generated scrambling sequence.

In the subframe 5, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the PCI, scrambles the PDCCH by using the generated scrambling sequence, and then transmits the scrambled PDCCH. At this time, the mobile station device 1 generates a scrambling sequence based on the PCI, and descrambles PDCCHs allocated to the PDCCH-SS1 and the PDCCH-SS2, by using the generated scrambling sequence.

In the subframe 6, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the first VCID, scrambles the EPDCCH by using the generated scrambling sequence, and then transmits the scrambled EPDCCH. The base station device 3 generates a scrambling sequence based on the PCI, scrambles the PDCCH by using the generated scrambling sequence, and then transmits the scrambled PDCCH. At this time, the mobile station device 1 generates a scrambling sequence based on the first VCID. The mobile station device 1 receives the DMRS allocated to the EPDCCH-SS 1 and descrambles the EPDCCH by using the generated scrambling sequence. The mobile station device 1 generates a scrambling sequence based on the PCI, and descrambles the PDCCH allocated to the PDCCH-SS2, by using the generated scrambling sequence.

In the subframe 7, the control channel is not monitored because the uplink-downlink configuration 1 and the uplink-downlink configuration 2 are Us together.

In the subframe 8, it is configured that the mobile station device 1 monitors the EPDCCH-SS1 and the EPDCCH-SS2 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. The base station device 3 generates a scrambling sequence based on the third VCID, scrambles the EPDCCH allocated to the EPDCCH-SS2, by using the generated scrambling sequence, and then transmits the scrambled EPDCCH. At this time, the mobile station device 1 generates a scrambling sequence based on the second VCID. The mobile station device 1 receives the DMRS allocated to the EPDCCH-SS1 and descrambles the EPDCCH by using the generated scrambling sequence. The mobile station device 1 generates a scrambling sequence based on the third VCID, and the mobile station device 1 receives the DMRS allocated to the EPDCCH-SS2 and descrambles the EPDCCH allocated to the PDCCH-SS2, by using the generated scrambling sequence.

In the subframe 9, it is configured that the mobile station device 1 monitors the PDCCH-SS1 and the EPDCCH-SS2 based on the uplink-downlink configuration 1, the uplink-downlink configuration 2, and the EPDCCH subframe configuration. At this time, the base station device 3 generates a scrambling sequence based on the PCI, scrambles the PDCCH allocated to the PDCCH-SS1, by using the generated scrambling sequence, and then transmits the scrambled PDCCH. The base station device 3 generates a scrambling sequence based on the third VCID, scrambles the EPDCCH allocated to the EPDCCH-SS2, by using the generated scrambling sequence, and then transmits the scrambled EPDCCH. At this time, the mobile station device 1 generates a scrambling sequence based on the PCI, and descrambles the PDCCH allocated to the PDCCH-SS1, by using the generated scrambling sequence. The mobile station device 1 generates a scrambling sequence based on the third VCID, and the mobile station device 1 receives the DMRS allocated to the EPDCCH-SS2 and descrambles the EPDCCH by using the generated scrambling sequence.

In this manner, the EPDCCH allocated to the EPDCCH-SS1 switches the scrambling sequence parameter used in scrambling, between the fixed subframe and the flexible subframe, and thus it is possible to switch the configuration of CoMP of the EPDCCH by the subframe.

Figure 29:
FIG. 29 is a diagram illustrating an example of the parameter used in the subframe configuration and generation of a scrambling sequence.

As an example of switching of the scrambling sequence parameter for the PDCCH, the EPDCCH, and the DMRS based on the subframe configuration, descriptions will be made using FIG. 29. FIG. 29 is a diagram illustrating an example of the subframe configuration and a parameter used in generation of the scrambling sequence. FIG. 29 is a diagram illustrating an example of the subframe configuration and switching of the type of the scrambling sequence parameter used in referring. The PDCCH-SS1 corresponds to a PDCCH-USS, and the EPDCCH-SS1 corresponds to a second EPDCCH-USS. The PDCCH-SS1 corresponds to a PDCCH-CSS and the EPDCCH-SS1. FIG. 29 illustrates an example in which both of the CSS and the USS are monitored in a subframe in which both of the uplink-downlink configuration 1 and the uplink-downlink configuration 2 are configured as D or S, and only the USS is monitored in a subframe in which one of the uplink-downlink configuration 1 and the uplink-downlink configuration 2 is D or S, and another is U. In FIG. 28, a "PCI" indicates the physical layer cell identifier of the base station device 3, a "first VCID" indicates a scrambling sequence parameter configured from the base station device 3. A "second VCID" indicates a scrambling sequence parameter from the base station device 3, which is separated from the "first VCID". The first VCID is referred to as the scrambling sequence parameter of the first EPDCCH, and the second VCID is referred to as the scrambling sequence parameter of the second EPDCCH.

The mobile station device 1 monitors the control channel based on the subframe configuration from the base station device 3. As an example of the monitoring of the control channel, the mobile station device 1 determines monitoring of the PDCCH-SS1, monitoring of the EPDCCH-SS1, or monitoring of the PDCCH-SS2, for each subframe, and the scrambling sequence parameter which is referred in accordance with the determination is switched.

In the subframe 0, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the first VCID, scrambles the EPDCCH by using the generated scrambling sequence, and then transmits the scrambled EPDCCH. The base station device 3 generates a scrambling sequence based on the PCI, scrambles the PDCCH by using the generated scrambling sequence, and transmits the scrambled PDCCH. At this time, the mobile station device 1 generates a scrambling sequence based on the first VCID. The mobile station device 1 receives the DMRS allocated to the EPDCCH-SS 1 and descrambles the EPDCCH by using the generated scrambling sequence. The mobile station device 1 generates a scrambling sequence based on the PCI, and descrambles the PDCCH allocated to the PDCCH-SS2 by using the generated scrambling sequence.

In the subframe 1, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the PCI, scrambles the PDCCH by using the generated scrambling sequence, and transmits the scrambled PDCCH. At this time, the mobile station device 1 generates a scrambling sequence based on the PCI, and descrambles PDCCHs allocated to the PDCCH-SS1 and the PDCCH-SS2 by using the generated scrambling sequence.

In the subframe 2, the control channel is not monitored because the uplink-downlink configuration 1 and the uplink-downlink configuration 2 are Us together.

In the subframe 3, it is configured that the mobile station device 1 monitors the EPDCCH-SS1 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. At this time, the mobile station device 1 generates a scrambling sequence based on the second VCID, and descrambles the EPDCCH allocated to the EPDCCH-SS1, by using the generated scrambling sequence.

In the subframe 4, it is configured that the mobile station device 1 monitors the EPDCCH-SS1 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. At this time, the mobile station device 1 generates a scrambling sequence based on the second VCID. The mobile station device 1 receives the DMRS allocated to the EPDCCH-SS1 and descrambles the EPDCCH by using the generated scrambling sequence.

In the subframe 5, it is configured that the mobile station device 1 monitors the PDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the PCI, scrambles the PDCCH by using the generated scrambling sequence, and then transmits the scrambled PDCCH. At this time, the mobile station device 1 generates a scrambling sequence based on the PCI, and descrambles PDCCHs allocated to the PDCCH-SS1 and the PDCCH-SS2, by using the generated scrambling sequence.

In the subframe 6, it is configured that the mobile station device 1 monitors the EPDCCH-SS1 and the PDCCH-SS2 based on the uplink-downlink configuration 1, the uplink-downlink configuration 2, and the EPDCCH subframe configuration. At this time, the base station device 3 generates a scrambling sequence based on the first VCID, scrambles the EPDCCH by using the generated scrambling sequence, and then transmits the scrambled EPDCCH. The base station device 3 generates a scrambling sequence based on the PCI, scrambles the PDCCH by using the generated scrambling sequence, and then transmits the scrambled PDCCH. At this time, the mobile station device 1 generates a scrambling sequence based on the first VCID, and descrambles the EPDCCH allocated to the EPDCCH-SS1, by using the generated scrambling sequence. The mobile station device 1 generates a scrambling sequence based on the PCI, and descrambles the PDCCH allocated to the PDCCH-SS2, by using the generated scrambling sequence.

In the subframe 8, it is configured that the mobile station device 1 monitors the EPDCCH-SS1 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled EPDCCH. At this time, the mobile station device 1 generates a scrambling sequence based on the second VCID. The mobile station device 1 receives the DMRS allocated to the EPDCCH-SS1 and descrambles the EPDCCH by using the generated scrambling sequence.

In the subframe 9, it is configured that the mobile station device 1 monitors the EPDCCH-SS1 based on the uplink-downlink configuration 1, the uplink-downlink configuration 2, and the EPDCCH subframe configuration. At this time, the base station device 3 generates a scrambling sequence based on the second VCID, scrambles the EPDCCH allocated to the EPDCCH-SS1, by using the generated scrambling sequence, and then transmits the scrambled PDCCH. At this time, the mobile station device 1 generates a scrambling sequence based on the second VCID, the mobile station device 1 receives the DMRS allocated to the EPDCCH-SS 1 and descrambles the EPDCCH by using the generated scrambling sequence.

In this manner, the EPDCCH allocated to the EPDCCH-SS1 switches the scrambling sequence parameter used in scrambling, between the fixed subframe and the flexible subframe, and thus it is possible to switch the group of the mobile station device, which is transmitted in the SS, by the subframe.

A method of switching of the scrambling sequence parameter between the same EPDCCH sets will be described in detail.

In one method, a configuration is performed so as to include the first VCID and the second VCID in an EPDCCH set configuration (EPDCCH-SetConfig) corresponding to the EPDCCH-SS1. The base station device 3 performs configuring in the mobile station device 1 through RRC signaling in a state where the first VCID and the second VCID are included in an EPDCCH set configuration (EPDCCH-SetConfig) corresponding to the EPDCCH-SS1. The mobile station device 1 receives the first VCID and the second VCID through RRC signaling. The mobile station device 1 uses the first VCID for the EPDCCH allocated to the EPDCCH-SS1 in the fixed subframe, and uses the second VCID for the EPDCCH allocated to the EPDCCH-SS1 in the flexible subframe.

In one method, the first VCID refers to scrambling sequence information in a notification of the EPDCCH set configuration (EPDCCH-SetConfig) corresponding to the EPDCCH-SS1. The base station device 3 performs configuring in the mobile station device 1 through RRC signaling in a state where the first VCID is included in the EPDCCH set configuration (EPDCCH-SetConfig) corresponding to the EPDCCH-SS1. The second VCID refers to scrambling sequence information in a notification which is received simultaneously with the uplink-downlink configuration 2. The base station device 3 configures the uplink-downlink configuration 2 through the PDCCH or RRC signaling, and simultaneously configures the second VCID through the PDCCH or RRC signaling, in the mobile station device 1. The mobile station device 1 receives the first VCID through RRC signaling and receives the second VCID through the PDCCH or RRC signaling. The mobile station device 1 uses the first VCID for the EPDCCH allocated to the EPDCCH-SS1 in the fixed subframe, and uses the second VCID for the EPDCCH allocated to the EPDCCH-SS1 in the flexible subframe.

The first VCID and the second VCID may be configured as the common parameter. The second VCID and the third VCID may be configured as the common parameter. The third VCID may be configured as the physical layer cell identifier.

The uplink-downlink configuration can be configured using the uplink reference UL-DL configuration, the downlink reference UL-DL configuration, and/or the transmission direction UL-DL configuration. Hereinafter, the uplink reference UL-DL configuration, the downlink reference UL-DL configuration, and the transmission direction UL-DL configuration will be described.

The uplink reference UL-DL configuration, the downlink reference UL-DL configuration, and the transmission direction UL-DL configuration are defined by the uplink-downlink configuration (UL-DL configuration).

That is, the uplink reference UL-DL configuration, the downlink reference UL-DL configuration, and the transmission direction UL-DL configuration are defined by the patterns of a downlink subframe, an uplink subframe, and a special subframe in a radio frame.

The uplink reference UL-DL configuration is referred to as a first parameter, a first configuration, or a serving cell uplink-downlink configuration. The downlink reference UL-DL configuration is referred to as a second parameter or a second configuration. The transmission direction UL-DL configuration is referred to as a third parameter or a third configuration.

When an uplink-downlink configuration i is configured as the uplink reference UL-DL configuration, this is referred to as that an uplink reference UL-DL configuration i is configured. When the uplink-downlink configuration i is configured as the downlink reference UL-DL configuration, this is referred to as that a downlink reference UL-DL configuration i is configured. When the uplink-downlink configuration i is configured as the transmission direction UL-DL configuration, this is referred to as that a transmission direction UL-DL configuration i is configured.

Hereinafter, a setting method of the uplink reference UL-DL configuration, the downlink reference UL-DL configuration, and the transmission direction UL-DL configuration will be described.

The base station device 3 configures the uplink reference UL-DL configuration, the downlink reference UL-DL configuration, and the transmission direction UL-DL configuration. The base station device 3 may transmit first information (TDD-Config) representing the uplink reference UL-DL configuration, second information representing the downlink reference UL-DL configuration, and third information representing the transmission direction UL-DL configuration included in at least one of a MIB, a system information block type 1 message, a system information message, an RRC message, a MAC CE (Control Element), and control information (for example, DCI format) of a physical layer. The base station device 3 may include the first information, the second information, and the third information in any of the MIB, the system information block type 1 message, the system information message, the RRC message, the MAC CE (Control Element), and the control information (for example, DCI format) of the physical layer.

The uplink reference UL-DL configuration, the downlink reference UL-DL configuration, and the transmission direction UL-DL configuration may be defined for each of a plurality of serving cells.

The base station device 3 transmits the first information, the second information, and the third information of each serving cell to the mobile station devices 1 in which a plurality of serving cells are configured. The first information, the second information, the third information may be defined for each serving cell.

The base station device 3 may transmit, to the mobile station devices 1 in which two serving cells of one primary cell and one secondary cell are configured, first information for the primary cell, second information for the primary cell, third information for the primary cell, first information for the secondary cell, second information for the secondary cell, and third information for the secondary cell.

The mobile station devices 1 in which a plurality of serving cells are configured may configure an uplink reference UL-DL configuration, a downlink reference UL-DL configuration, and a transmission direction DL-UL configuration based on the first information, the second information, and the third information for each serving cell.

The mobile station devices 1 in which two serving cells of one primary cell and one secondary cell are configured may configure the uplink reference UL-DL configuration for the primary cell, the downlink reference UL-DL configuration for the primary cell, the transmission direction DL-UL configuration for the primary cell, the uplink reference UL-DL configuration for the secondary cell, the downlink reference UL-DL configuration for the secondary cell, and the transmission direction DL-UL configuration for the secondary cell.

It is preferable that the first information for the primary cell is included in the system information block type 1 message or the RRC message. It is preferable that the first information for the secondary cell is included in the RRC message. It is preferable that the second information for the primary cell is included in the system information block type 1 message, the system information message, or the RRC message. It is preferable that the second information for the secondary cell is included in the RRC message. It is preferable that the third information is included in the control information (for example, DCI format) of the physical layer.

It is preferable that the first information is common to a plurality of mobile station devices 1 in a cell. The second information may be common to a plurality of mobile station devices 1 in a cell or may be dedicated for the mobile station device 1. The third information may be common to a plurality of mobile station devices 1 in a cell or may be dedicated for the mobile station device 1.

The system information block type 1 message is subjected to initial transmission through the PDSCH in a subframe 5 of a radio frame satisfying SFN mod 8=0 and retransmission (repetition) in a subframe 5 of other radio frames satisfying SFN mod 2=0. The system information block type 1 message includes information representing the configuration (the length of DwPTS, GP, and UpPTS) of the special subframe. The system information block type 1 message is information specific to a cell.

The system information message is transmitted through the PDSCH. The system information message is information specific to a cell. The system information message includes a system information block X other than a system information block type 1.

The RRC message is transmitted through the PDSCH. The RRC message is information/signal which is processed in an RRC layer. The RRC message may be common to a plurality of mobile station devices 1 in a cell or may be dedicated for a specific mobile station device 1.

The MAC CE is transmitted through the PDSCH. The MAC CE is information/signal which is processed in a MAC layer.

The mobile station devices 1 execute the setting method for each of a plurality of serving cells.

The mobile station devices 1 configure the uplink reference UL-DL configuration based on the first information for a certain serving cell. The mobile station devices 1 determine whether or not the second information for the certain serving cell is received. When the second information for the certain serving cell is received, the mobile station devices 1 configure, to the certain serving cell, the downlink reference UL-DL configuration based on the second information for the certain serving cell. When the second information of the certain serving cell is not received (else/otherwise), the mobile station devices 1 configure the downlink reference UL-DL configuration based on the first information of the certain serving cell for the certain serving cell.

A serving cell where the uplink reference UL-DL configuration and the downlink reference UL-DL configuration are configured based on the first information is referred to as a serving cell where dynamic TDD is not configured. A serving cell where the downlink reference UL-DL configuration is configured based on the second information is referred to as a serving cell where the dynamic TDD is configured.

The mobile station devices 1 receive the second information and determine a subframe where the transmission of the uplink signal is possible based on the second information. Next, the mobile station devices 1 monitor the third information. When the third information is received, the mobile station devices 1 determine a subframe where the transmission of the uplink signal is possible based on the third information.

Hereinafter, the uplink reference UL-DL configuration will be described.

The uplink reference UL-DL configuration is used at least for specifying a subframe where uplink transmission is possible or impossible in a serving cell.

The mobile station devices 1 do not perform the uplink transmission in a subframe which is indicated as a downlink subframe by the uplink reference UL-DL configuration. The mobile station devices 1 do not perform the uplink transmission in the DwPTS and the GP of a subframe which is indicated as a special subframe by the uplink reference UL-DL configuration.

Hereinafter, the downlink reference UL-DL configuration will be described.

The downlink reference UL-DL configuration is used at least for specifying a subframe where downlink transmission is possible or impossible in a serving cell.

The mobile station devices 1 do not perform the downlink reception in a subframe which is indicated as an uplink subframe by the downlink reference UL-DL configuration. The mobile station devices 1 do not perform the downlink reception in the UpPTS and the GP of a subframe which is indicated as a special subframe by the downlink reference UL-DL configuration.

The mobile station devices 1 in which the downlink reference UL-DL configuration is configured based on the first information may perform measurement (for example, measurement concerning channel state information) using the downlink signal in the DwPTS of the downlink subframe or the special subframe indicated by the uplink reference UL-DL configuration or the downlink reference UL-DL configuration.

The base station device 3 determines the downlink reference UL-DL configuration from a configuration set (set of configurations) restricted based on the uplink reference UL-DL configuration. That is, the downlink reference UL-DL configuration is an element in a configuration set restricted based on the uplink reference UL-DL configuration. In FIG. 11, D represents a downlink subframe, U represents an uplink subframe, and S represents a special subframe.

With this, in the dynamic TDD, since the DwPTS of the subframe indicated as a downlink subframe by the uplink reference UL-DL configuration and the special subframe are not used for the uplink transmission, the mobile station devices 1 in which the downlink reference UL-DL configuration is set based on the first information can appropriately perform measurement using the downlink signal.

The mobile station devices 1 in which the downlink reference UL-DL configuration is configured based on the second information may perform measurement (for example, measurement concerning channel state information) using the downlink signal in the DwPTS of the downlink subframe or the special subframe indicated by the uplink reference UL-DL configuration.

A subframe which is indicated as an uplink subframe by the uplink reference UL-DL configuration and is indicated as a downlink subframe by the downlink reference UL-DL configuration is referred to as a first flexible subframe. The first flexible subframe is a subframe which is reserved for the uplink and downlink transmission.

A subframe which is indicated as a special subframe by the uplink reference UL-DL configuration and is indicated as a downlink subframe by the downlink reference UL-DL configuration is referred to as a second flexible subframe. The second flexible subframe is a subframe which is reserved for the downlink transmission. The second flexible subframe is a subframe which is reserved for the downlink transmission in the DwPTS and the uplink transmission in the UpPTS.

Hereinafter, the transmission direction UL-DL configuration will be described in detail.

The mobile station devices 1 and the base station device 3 configure the transmission direction UL-DL configuration concerning the direction (upward/downward) of transmission in a subframe. The transmission direction UL-DL configuration is used to determine the direction of transmission in a subframe.

The mobile station devices 1 control transmission in the first flexible subframe and the second flexible subframe based on scheduling information (DCI format and/or HARQ-ACK) and the transmission direction UL-DL configuration.

The base station device 3 transmits the third information representing the transmission direction UL-DL configuration to the mobile station devices 1. The third information is information indicating a subframe where the uplink transmission is possible. The third information is information indicating a subframe where the downlink transmission is possible. The third information is information indicating a subframe where the uplink transmission is possible in the UpPTS and the downlink transmission is possible in the DwPTS.

For example, the transmission direction UL-DL configuration is used to specify the direction of transmission in a subframe which is indicated as an uplink subframe by the uplink reference UL-DL configuration and is indicated as a downlink subframe by the downlink reference UL-DL configuration and/or a subframe which is indicated as a special subframe by the uplink reference UL-DL configuration and is indicated as a downlink subframe by the downlink reference UL-DL configuration. That is, the transmission direction UL-DL configuration is used to specify the direction of transmission in a subframe which is indicated as different subframes in the uplink reference UL-DL configuration and the downlink reference UL-DL configuration.

Next, a case where the uplink-downlink configuration, the transmission direction UL-DL configuration, or the like is performed by using the PDCCH or the EPDCCH will be described in detail. As described above, the DCI used in these configurations can append a CRC scrambled by using the D-RNTI. The base station device 3 can configure the D-RNTI for the mobile station device 1 through dedicated RRC signaling and the like. At this time, the D-RNTI is configured for a primary cell (PCell) which is a serving cell which is configured at first in establishing of a connection. In addition, when carrier aggregation is performed, the D-RNTI can be configured for each secondary cell (SCell) which is a serving cell which is additionally configured. As an example, the PDCCH to which a CRC scrambled by using the D-RNTI is appended is transmitted in the CSS by the base station device 3. The mobile station device 1 decodes the PDCCH in the CSS. When the mobile station device 1 monitors the CSS only in the PCell, a PDCCH for TDD configuration of the SCell is transmitted and received through the CSS of the PCell, in addition to a PDCCH for TDD configuration of the PCell. At this time, the mobile station device 1 checks the CRCs after decoding of the PDCCHs and detects a serving cell in which the CRC is scrambled by using the D-RNTI. Thus, the mobile station device 1 can recognize a serving cell in which the PDCCH operates the TDD configuration. Thus, since it is unnecessary that the PDCCH for each serving cell is individually decoded, it is possible to reduce processing of the mobile station device 1.

When the carrier aggregation is performed, the D-RNTI of the PCell can be also used. At this time, a carrier indicator field (CIF) is included in the DCI which is transmitted and received on the PDCCH or the EPDCCH, and a serving cell in which the PDCCH operates the TDD configuration can be recognized by the CIF. As an example, the base station device 3 transmits and receives the PDCCH to which a CRC scrambled by using the D-RNTI is appended, by using cross-carrier scheduling. The mobile station device 1 can decode the PDCCH in a serving cell (for example, PCell) which is different from a serving cell which is a target of the TDD configuration. The DCI for performing the TDD configuration can continuously include the CIF. At this time, since the size of the DCI has a prescribed value regardless of whether or not the carrier aggregation is performed or whether or not the cross-carrier scheduling is performed, the mobile station device 1 can perform detection regardless of a change of configuration, and the plurality of mobile station devices can commonly use a result of the detection. The CIF can be included only when the cross-carrier scheduling is configured. In this case, if the cross-carrier scheduling is not used, it is possible to reduce the number of effective bits, and thus an effect of decreasing a coding rate is obtained.

When the carrier aggregation is performed, TDD configurations of plural serving cells can be transmitted and received on one PDCCH or one EPDCCH. At this time, the DCI format for the TDD configuration can have bit fields used for enabling notification of TDD configurations of serving cells of a fixed number (for example, 5 which is the maximum number of serving cells which can be configured for one mobile station device) regardless of the number of serving cells which are activated for the mobile station device 1. The DCI format continuously has the fixed number of bit fields, and thus the mobile station device 1 can detect the PDCCH or the EPDCCH regardless or a change of configuration and a plurality of mobile station device can commonly use the signaling.

A program operating in the base station device 3 and the mobile station device 1 of the invention is a program (a program for causing a computer to function) to control a CPU (Central Processing Unit) and the like so as to implement the functions of the foregoing embodiment of the invention. Information which is handled by the devices is temporarily accumulated in a RAM (Random Access Memory) while processed, and is then stored in various ROMs, such as a Flash ROM (Read Only Memory), or an HDD (Hard Disk Drive). Information is read by the CPU as necessary, and is modified and written.

Part of the mobile station device 1 and the base station device 3 in the foregoing embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the mobile station device 1 or the base station device 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station device 3 in the foregoing embodiment may be implemented as an aggregate (device group) of a plurality of devices. Each device in the device group may include part or all of the functions or the function blocks of the base station device 3 of the foregoing embodiment. As the device group, the general functions or functional blocks of the base station device 3 may be provided. The mobile station device 1 of the foregoing embodiment may communicate with the base station device as an aggregate.

The base station device 3 in the foregoing embodiment may be EUTRAN (Evolved Universal Terrestrial Radio Access Network). The base station device 3 in the foregoing embodiment may have part or all of the functions of a higher node to eNodeB.

Part or all of the mobile station device 1 and the base station device 3 of the foregoing embodiment may be typically implemented as an LSI, which is an integrated circuit, or may be implemented as a chipset. The functional blocks of the mobile station device 1 and the base station device 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the foregoing embodiment, a mobile station device has been described as a terminal device or a communication device, the invention is not limited thereto and may be applied to stationary or immovable electronic apparatuses indoors and outdoors, for example, terminal devices, such as an AV system, kitchen equipment, cleaning and washing equipment, air conditioning equipment, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

REFERENCE SIGNS LIST 1 (1A, 1B, 1C) mobile station device
3 base station device
101 higher layer processing unit
103 control unit
105 reception unit
107 transmission unit
301 higher layer processing unit
303 control unit
305 reception unit
307 transmission unit
1011 radio resource control unit
1013 subframe configuration unit
1015 scheduling information interpretation unit
1017 CSI report control unit
3011 radio resource control unit
3013 subframe configuration unit
3015 scheduling unit
3017 CSI report control unit

The invention claimed is:
1. A user equipment comprising:
a receiver that monitors a physical downlink control channel (PDCCH) with downlink control information

(DCI) format 1C with a cyclic redundancy check (CRC) scrambled by eIMTA-RNTI, wherein
a first subframe where the receiver monitors the PDCCH on one radio frame is configured by bitmap information by a higher layer.

2. The user equipment according to claim 1, wherein
in a case of a time division duplex (TDD) as a primary cell, the first subframe where the receiver monitors the PDCCH is indicated by a first uplink-downlink configuration in system information as a downlink subframe.

3. The user equipment according to claim 1, wherein
the eIMTA-RNTI is configured through a dedicated RRC signaling.

4. The user equipment according to claim 1, wherein
the receiver is configured to receive the PDCCH which indicates a subframe, which is indicated as an uplink subframe by a first uplink-downlink configuration in system information, as an uplink subframe or a downlink subframe by a second uplink-downlink configuration, and
the receiver is configured to not receive the PDCCH which indicates a subframe, which is indicated as a downlink subframe or a special subframe by the first uplink-downlink configuration in the system information, as an uplink subframe by the second uplink-downlink configuration.

5. The user equipment according to claim 1, wherein
the receiver is configured to receive the PDCCH which indicates a subframe, which is indicated as a downlink subframe by a downlink reference uplink-downlink configuration, as an uplink subframe or a downlink subframe by a second uplink-downlink configuration, and
the receiver is configured to not receive the PDCCH which indicates a subframe, which is indicated as an uplink subframe or a special subframe by the downlink reference uplink-downlink configuration, as a downlink subframe by the second uplink-downlink configuration.

6. The user equipment according to claim 5, wherein
the downlink reference uplink-downlink configuration is configured among a set of uplink-downlink configurations restricted based on an uplink reference uplink-downlink configuration.

7. The user equipment according to claim 5, wherein
the downlink reference uplink-downlink configuration is configured to a serving cell through dedicated RRC signaling.

8. A base station apparatus comprising:
a transmitter that transmits a physical downlink control channel (PDCCH) with downlink control information (DCI) format 1C with a cyclic redundancy check (CRC) scrambled by eIMTA-RNTI, wherein
a first subframe where the transmitter transmits the PDCCH on one radio frame is configured by bitmap information by a higher layer.

9. The base station apparatus according to claim 8, wherein
in a case of a time division duplex (TDD) as a primary cell, the first subframe where the transmitter transmits the PDCCH is indicated by a first uplink-downlink configuration in system information as a downlink subframe.

10. The base station apparatus according to claim 8, wherein
the eIMTA-RNTI is configured through a dedicated RRC signaling.

11. The base station apparatus according to claim 8, wherein
the transmitter is configured to transmit the PDCCH which indicates a subframe, which is indicated as an uplink subframe by a first uplink-downlink configuration in a system information, as an uplink subframe or a downlink subframe by a second uplink-downlink configuration, and
the transmitter is configured to not transmit the PDCCH which indicates a subframe, which is indicated as a downlink subframe or a special subframe by the first uplink-downlink configuration, as an uplink subframe by the second uplink-downlink configuration.

12. The base station apparatus according to claim 8, wherein
the transmitter is configured to transmit the PDCCH which indicates a subframe, which is indicated as a downlink subframe by a downlink reference uplink-downlink configuration, as an uplink subframe or a downlink subframe by a second uplink-downlink configuration, and
the transmitter is configured to not transmit the PDCCH which indicates a subframe, which is indicated as an uplink subframe or a special subframe by the downlink reference uplink-downlink configuration, as a downlink subframe by the second uplink-downlink configuration.

13. The base station apparatus according to claim 12, wherein
the downlink reference uplink-downlink configuration is configured among a set of uplink-downlink configurations restricted based on an uplink reference uplink-downlink configuration.

14. The base station apparatus according to claim 12, wherein
the downlink reference uplink-downlink configuration is configured to a serving cell through dedicated RRC signaling.

15. A communication method of a user equipment, comprising:
monitoring a physical downlink control channel (PDCCH) with downlink control information (DCI) format 1C with a cyclic redundancy check (CRC) scrambled by eIMTA-RNTI, wherein
a first subframe for monitoring the PDCCH on one radio frame is configured by bitmap information by a higher layer.

16. A communication method of a base station apparatus, comprising:
transmitting a physical downlink control channel (PDCCH) with downlink control information (DCI) format 1C with a cyclic redundancy check (CRC) scrambled by eIMTA-RNTI, wherein
a first subframe for transmitting the PDCCH on one radio frame is configured by bitmap information by a higher layer.

* * * * *